(12) United States Patent
Lee et al.

(10) Patent No.: US 12,169,676 B2
(45) Date of Patent: *Dec. 17, 2024

(54) PUF CELL ARRAY, SYSTEM AND METHOD OF MANUFACTURING SAME

(71) Applicant: TAIWAN SEMICONDUCTOR MANUFACTURING COMPANY LTD., Hsinchu (TW)

(72) Inventors: Cheng-En Lee, Hsinchu (TW); Shih-Lien Linus Lu, Hsinchu (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/362,912

(22) Filed: Jul. 31, 2023

(65) Prior Publication Data
US 2023/0376669 A1 Nov. 23, 2023

Related U.S. Application Data

(63) Continuation of application No. 17/816,104, filed on Jul. 29, 2022, now Pat. No. 11,727,182, which is a (Continued)

(51) Int. Cl.
*G06F 30/392* (2020.01)
*G06F 30/39* (2020.01)
(Continued)

(52) U.S. Cl.
CPC ............ *G06F 30/392* (2020.01); *G06F 30/39* (2020.01); *H01L 27/0207* (2013.01); *G06F 2119/18* (2020.01)

(58) Field of Classification Search
None
See application file for complete search history.

(56) References Cited

U.S. PATENT DOCUMENTS 7,260,442 B2  8/2007  Hwang et al.
8,848,477 B2  9/2014  Schrijen et al.
(Continued)

FOREIGN PATENT DOCUMENTS

CN   108242471    7/2018
JP   2013545340   12/2013
(Continued)

OTHER PUBLICATIONS

Office Action dated Jul. 30, 2021 from corresponding application No. DE 10 2019 128 723.5 (pp. 1-12).
(Continued)

*Primary Examiner* — Leigh M Garbowski
(74) *Attorney, Agent, or Firm* — Hauptman Ham, LLP

(57) ABSTRACT

A physically unclonable function (PUF) cell array includes a first PUF cell in a first column in a first direction, a second PUF cell in a second column, and a first power rail. The first PUF cell includes a first set of conductive structures that include a first conductive structure extending in the second direction and a second conductive structure extending in the first direction. The second PUF cell includes a second set of conductive structures that include a third conductive structure extending in the second direction and a fourth conductive structure extending in the first direction. The first power rail overlapping a first boundary of the first and second PUF cell. At least the first and third conductive structure, or the second and the fourth conductive structure are symmetric to each other with respect to a central line of at least the first or second PUF cell.

20 Claims, 43 Drawing Sheets

Related U.S. Application Data continuation of application No. 16/661,971, filed on Oct. 23, 2019, now Pat. No. 11,461,525.

(60) Provisional application No. 62/753,281, filed on Oct. 31, 2018.

(51) Int. Cl.
*H01L 27/02* (2006.01)
*G06F 119/18* (2020.01)

(56) References Cited

U.S. PATENT DOCUMENTS

| | | | |
|---|---|---|---|
| 9,256,709 B2 | 2/2016 | Yu et al. | |
| 9,966,954 B1* | 5/2018 | Yang | H03K 3/84 |
| 10,387,500 B2 | 8/2019 | Hong et al. | |
| 11,461,525 B2 | 10/2022 | Lee et al. | |
| 11,727,182 B2* | 8/2023 | Lee | H04L 9/0866 |
| | | | 713/189 |
| 2014/0040838 A1 | 2/2014 | Liu et al. | |
| 2015/0278429 A1 | 10/2015 | Chang | |
| 2018/0091293 A1 | 3/2018 | Suresh et al. | |
| 2018/0150589 A1* | 5/2018 | Yang | G06F 30/394 |
| 2018/0159685 A1 | 6/2018 | Kwak | |
| 2018/0233461 A1 | 8/2018 | Okagaki | |

FOREIGN PATENT DOCUMENTS

| | | |
|---|---|---|
| KR | 20180075017 | 7/2018 |
| WO | 2012045627 | 4/2012 |

OTHER PUBLICATIONS

Office Action dated Oct. 23, 2020 from corresponding application No. KR 10-2019-0136541.

Office Action dated Dec. 24, 2020 from corresponding application No. TW 10921251340 (pp. 1-9).

* cited by examiner

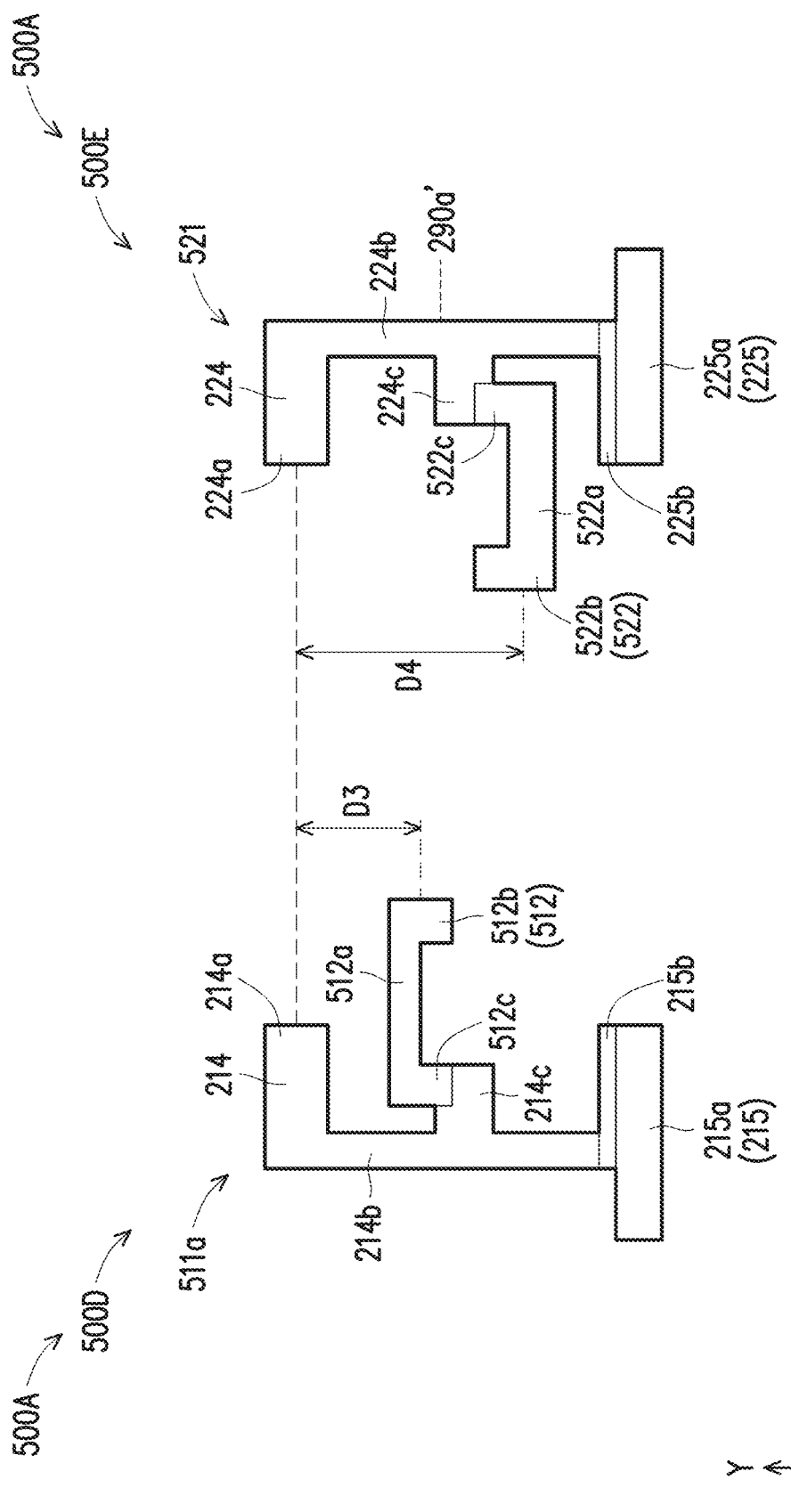

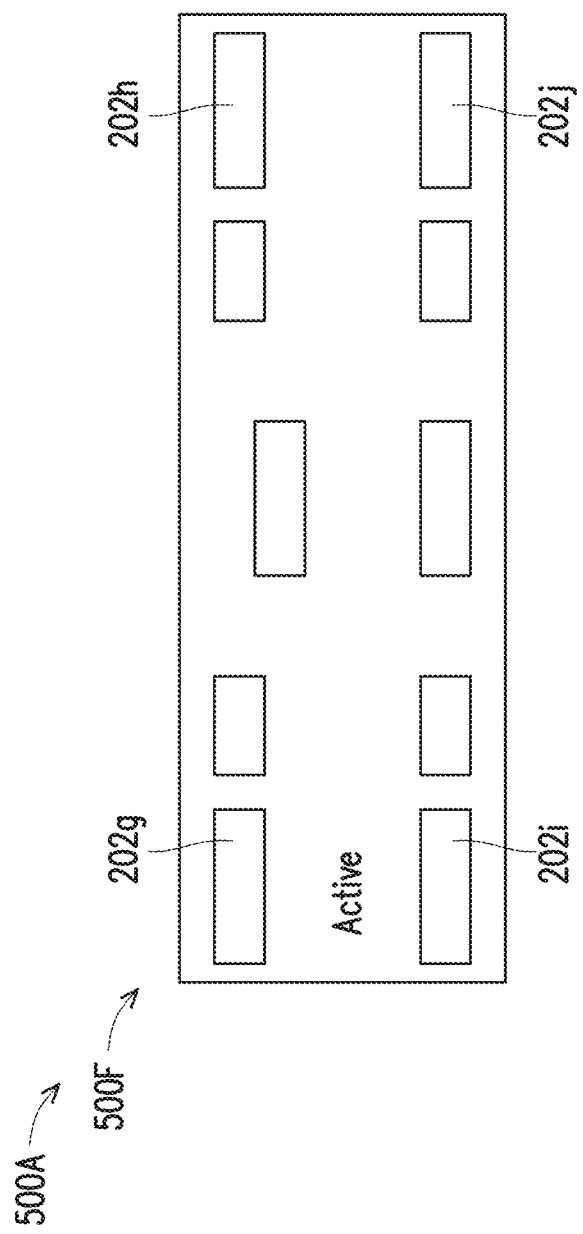

PUF CELL ARRAY, SYSTEM AND METHOD OF MANUFACTURING SAME

PRIORITY CLAIM

The present application is a continuation of U.S. application Ser. No. 17/816,104, filed Jul. 29, 2022, now U.S. Pat. No. 11,727,182, issued Aug. 15, 2023, which is a continuation of U.S. application Ser. No. 16/661,971, filed Oct. 23, 2019, now U.S. Pat. No. 11,461,525, issued Oct. 4, 2022, which claims the benefit of U.S. Provisional Application No. 62/753,281, filed Oct. 31, 2018, which are herein incorporated by reference in their entireties.

BACKGROUND

Although integrated circuits are designed and manufactured with the same materials and processes, each integrated circuit may have inherent variations from one another that make each integrated circuit unique. Recently, security researchers have proposed a Physically Unclonable Function (PUF) to utilize the inherent variations between integrated circuits as a unique identification similar to DNA in human beings. A PUF is a physical object that can be used to generate a unique identification or unique key in cryptography, secure computing or secure communications. Due to the random nature of a PUF output, the output of a PUF object is very difficult to predict and adds a layer of security. However, systematic biases of regions of the PUF can impact performance and may affect the desired randomness of the PUF output thereby affecting security.

BRIEF DESCRIPTION OF THE DRAWINGS

The patent or application file contains drawings/photographs executed in color. Copies of this patent with color drawing(s)/photograph(s) will be provided by the Office upon request and payment of the necessary fee.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A-2K is a diagram of a layout design, in accordance with some embodiments.

FIG. 5A-5K is a diagram of a layout design, in accordance with some embodiments.

DETAILED DESCRIPTION

Figure 1A:
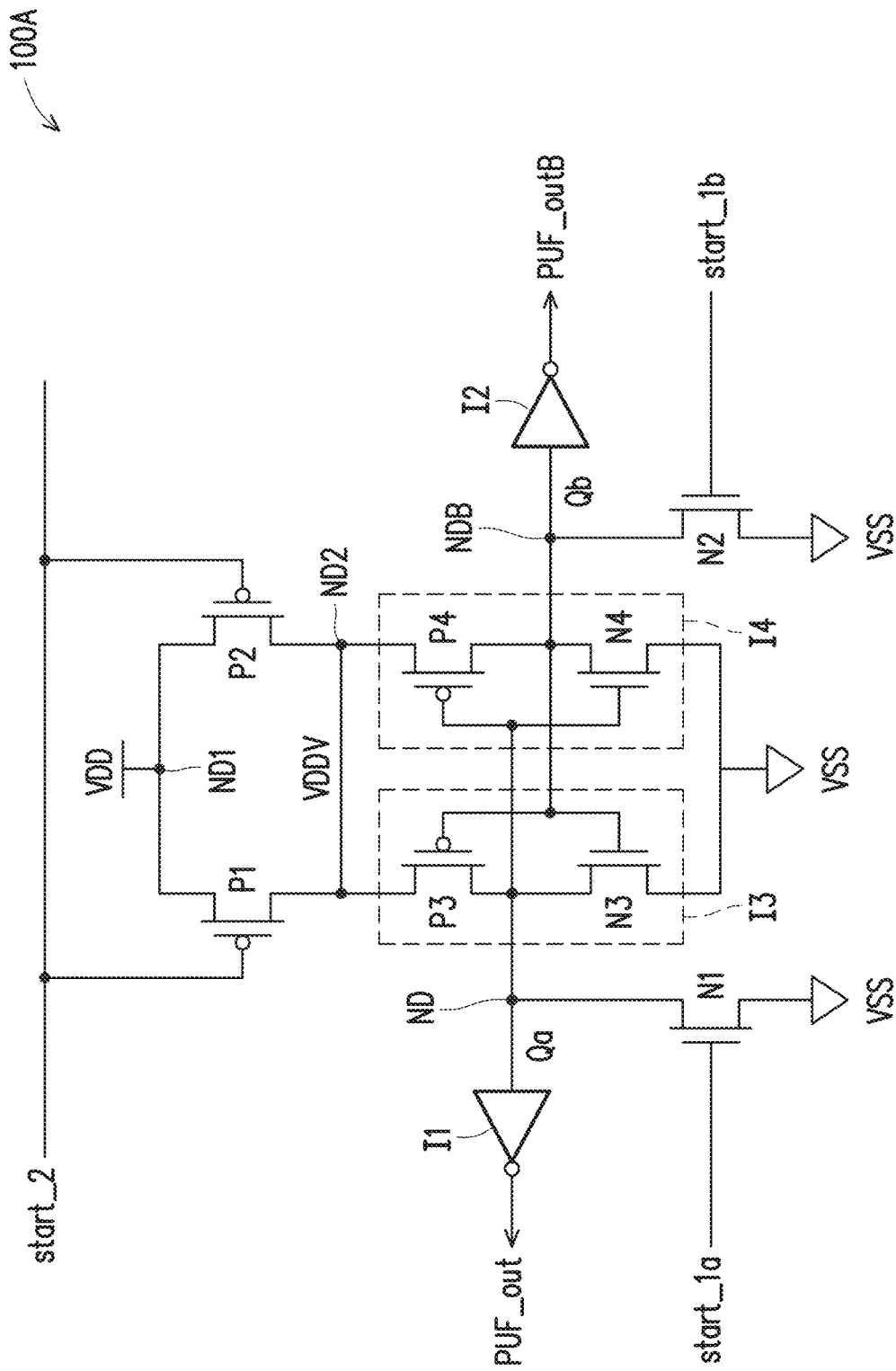
FIG. 1A is a circuit diagram of a PUF cell, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, a PUF cell array includes a first PUF cell arranged in a first column in a first direction and a second PUF cell arranged in a second column in the first direction. The first PUF cell includes a first set of conductive structures extending in a first direction and a second direction different from the first direction. The first set of conductive structures is on a first metal layer. The second PUF cell includes a second set of conductive structures extending in the first direction and the second direction and being on the first metal layer.

In some embodiments, the first set of conductive structures include a first conductive structure extending in at least the second direction and a second conductive structure extending in at least the second direction and being separated from the first conductive structure in the first direction. In some embodiments, the second set of conductive structures include a third conductive structure extending in at least the second direction and a fourth conductive structure extending in at least the second direction and being separated from the third conductive structure in the first direction.

In some embodiments, if one or more signals at corresponding nodes in the PUF cell array are varied, then the operation and output of the first or second PUF cell are also varied by systematic bias.

In some embodiments, at least the first conductive structure and the third conductive structure, or the second conductive structure and the fourth conductive structure are symmetric to each other with respect to a central line of at least the first PUF cell or the second PUF cell extending in the second direction. In some embodiments, by having at least the first conductive structure and the third conductive structure, or the second conductive structure and the fourth conductive structure be symmetric to each other with respect to the central line of at least the first PUF cell or the second PUF cell in the second direction, the PUF cell array has a balanced architecture with less systematic bias and better performance than other approaches.

In some embodiments, the first PUF cell is part of a first set of PUF cells, and the second PUF cell is part of a second set of PUF cells. In some embodiments, the first set of PUF cells have a first number of PUF cells, and the second set of PUF cells have a second number of PUF cells equal to the first number of PUF cells. In some embodiments, by having a same number of PUF cells in the first and second set of PUF cells, the PUF cell array has less systematic bias and better performance than other approaches.

In some embodiments, each PUF cell of the first set of PUF cells and the second set of PUF cells has a corresponding output pin having a corresponding address. In some embodiments, each address of each corresponding output pin of each PUF cell in the first set of PUF cells and the second set of PUF cells is randomly arranged. In some embodiments, by randomly arranging the address of each PUF cell in the first and second set of PUF cells, the PUF cell array has less systematic bias and better performance than other approaches.

FIG. 1A is a circuit diagram of a PUF cell 100A, in accordance with some embodiments.

PUF cell 100A is configured to receive a signal start_1a, a signal start_1b and a signal start_2. PUF cell 100A is configured to generate an output data signal PUF_out. In some embodiments, PUF cell 100A is further configured to generate an inverted output data signal PUF_outB. In some embodiments, inverted output data signal PUF_outB is inverted from output data signal PUF_out. In some embodiments, a value of the output data signal PUF_out is a logical high or a logical low. In some embodiments, a value of the output data signal PUF_out is determined based on a deterministic random state of the PUF cell 100A from the inherent variations of the manufacturing process. In some embodiments, PUF cell 100A corresponds to a PUF object configured to generate a unique identification or a unique key based on the inherent variations of the manufacturing process.

PUF cell 100A comprises inverters I2 and I1, four P-type metal oxide semiconductor (PMOS) transistors P1, P2, P3 and P4, and four N-type metal oxide semiconductor (NMOS) transistors N1, N2, N3 and N4. In some embodiments, PUF cell 100A employs a number of transistors other than eight. In some embodiments, one or more transistors in NMOS transistor N1, N2, N3 or N4, PMOS transistor P1, P2, P3 or P4 or inverter I2 or I1 is a planar transistor or a fin field-effect transistor (FinFET) having one or more fins or fingers. In some embodiments, a fin is referred to as a finger. Other types of transistors are within the scope of various embodiments.

PMOS Transistors P3 and P4 and NMOS transistors N3 and N4 form a cross-latch or a pair of cross-coupled inverters similar to a sense amplifier of a static random access memory (SRAM). For example, PMOS transistor P3 and NMOS transistor N3 form an inverter I3 while PMOS transistor P4 and NMOS transistor N4 form an inverter I4. In some embodiments, PUF cell 100A enters a stable state based on a strength of the internal cross-coupled inverters I3 and I4.

A source terminal of each of PMOS transistors P1 and P2 are configured as a voltage supply node ND1. Each voltage supply node ND1 is coupled to a voltage supply VDD. A gate terminal of PMOS transistor P1 is configured to receive signal start_2. A gate terminal of PMOS transistor P2 is configured to receive signal start_2. In some embodiments, PMOS transistors P1 and P2 are referred to as a "header switch." In some embodiments, PMOS transistors P1 and P2 are configured to enable or disable the PUF circuit 100 responsive to signal start_2. In some embodiments, PMOS transistors P1 and P2 are a single PMOS transistor.

Each of a drain terminal of PMOS transistor P1, a drain terminal of PMOS transistor P2, a source terminal of PMOS transistor P3, a source terminal of PMOS transistor P4 are coupled together at a node ND2. In some embodiments, node ND2 has a signal VDDV.

Each of a drain terminal of PMOS transistor P3, a drain terminal of NMOS transistor N3, a gate terminal of PMOS transistor P4, a gate terminal of NMOS transistor N4, a drain terminal of NMOS transistor N1 and an input terminal of inverter I1 are coupled together, and configured as a node ND. In some embodiments, node ND has a signal Qa. In some embodiments, node ND is configured as a storage node.

An input terminal of inverter I1 is configured to receive signal Qa from node ND. An output terminal of inverter I1 is configured to output the output data signal PUF_out. In some embodiments, output data signal PUF_out is inverted from signal Qa or output data signal PUF_outB. Other configurations of inverter I1 are within the scope of the present disclosure. For example, in some embodiments, inverter I1 is an output buffer circuit.

Each of a drain terminal of PMOS transistor P4, a drain terminal of NMOS transistor N4, a gate terminal of PMOS transistor P3, a gate terminal of NMOS transistor N3, a drain terminal of NMOS transistor N2 and an input terminal of inverter I2 are coupled together, and configured as a node NDB. In some embodiments, node NDB has a signal Qb. In some embodiments, node NDB is configured as a storage node.

An input terminal of inverter I2 is configured to receive signal Qb from node NDB. An output terminal of inverter I2 is configured to output the output data signal PUF_outB. In some embodiments, output data signal PUF_outB is inverted from signal Qb. Other configurations of inverter I2 are within the scope of the present disclosure. For example, in some embodiments, inverter I2 is an output buffer circuit.

A source terminal of each of NMOS transistors N3 and N4 is configured as a supply reference voltage node (not labelled) having a supply reference voltage VSS. The source terminal of each of NMOS transistors N3 and N4 is also coupled to reference voltage supply VSS.

A source terminal of each of NMOS transistors N1 and N2 is configured as a supply reference voltage node (not labelled) having supply reference voltage VSS. The source terminal of each of NMOS transistors N1 and N2 is also coupled to reference voltage supply VSS. A gate terminal of NMOS transistor N1 is configured to receive a signal start_1a. A gate terminal of NMOS transistor N2 is configured to receive a signal start_1b. In some embodiments, NMOS transistors N1 and N2 are configured to initialize corresponding signals Qa and Qb at corresponding nodes ND and NDB of PUF circuit 100 to a voltage of the reference voltage supply VSS responsive to corresponding signals start_1a and start_1b.

Other configurations or number of elements within PUF circuit 100 are within the scope of the present disclosure.

Figure 1B:
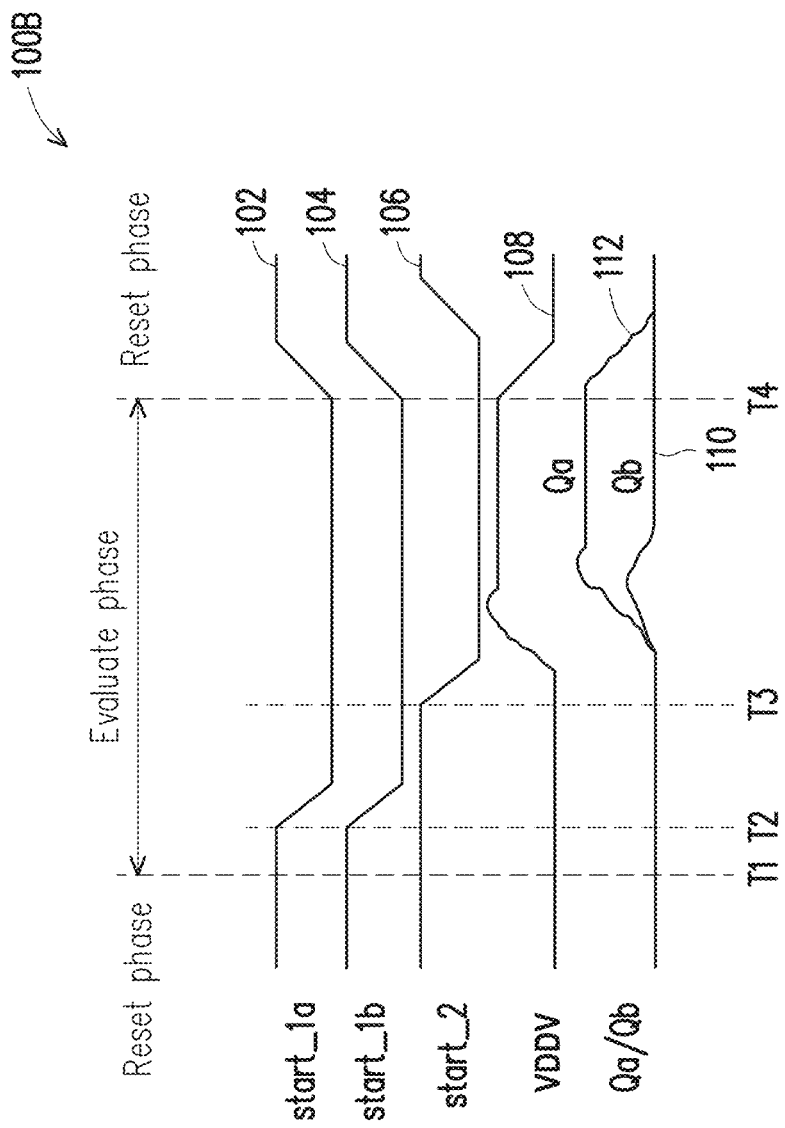
FIG. 1B is a graph of waveforms, in accordance with some embodiments.

FIG. 1B is a graph of waveforms 100B, in accordance with some embodiments. Waveforms 100B include waveforms of signals in a reset phase and an evaluate phase of PUF cell 100A.

In some embodiments, curve 102 represents signal start_1a of FIG. 1A; curve 104 represents signal start_1b of FIG. 1A; curve 106 represents signal start_2 of FIG. 1A; curve 108 represents signal VDDV at node ND2 of FIG. 1A; curve 110 represents signal Qb at node NDB of FIG. 1A; and curve 112 represents signal Qa at node ND of FIG. 1A.

At time T1, PUF cell 100A is in the reset phase. In some embodiments, the reset phase includes resetting the PUF cell 100A to the voltage of the reference voltage supply VSS.

At time T1, curve 102 and 104 are at a high logical value and NMOS transistors N1 and N2 are turned on causing nodes ND and NDB to be grounded (e.g., voltage of the reference voltage supply VSS), and curve 106 is at a high logical value and PMOS transistors P1 and P2 are turned off thereby disabling the bi-stable element (e.g., PMOS transistors P3 and P4).

At time T2, curve 102 and 104 transition from a high logical value to a low logical value causing NMOS transistors N1 and N2 to be turned off thereby causing nodes ND and NDB to be floating.

At time T3, PUF cell 100A enters the evaluate phase. In some embodiments, the evaluate phase includes evaluating the PUF cell 100A. In some embodiments, the evaluate phase includes evaluating the deterministic random state of the PUF cell 100A inherited from the manufacturing process. In some embodiments, the evaluate phase includes enabling the bi-stable element (e.g., inverters I3 and I4) through a header circuit (e.g., PMOS transistors P1 and P2).

In some embodiments, the evaluate phase includes the PUF cell 100A entering a stable state based on a strength of the internal cross-coupled inverters I3 and I4. Each inverter I1 and I2 and corresponding nodes ND and NDB will arrive at a corresponding stable state. In some embodiments, the stable states of nodes ND and NDB depends on the strength of PMOS transistors P3 and P4, which have more static variations than NMOS transistors N3 and N4. In some embodiments, PMOS transistors P3 and P4 in PUF cell 100A have a minimum allowed size, including width and length, such that the static variation has the highest percentage difference.

At time T3, curve 106 transitions from a high logical value to a low logical value causing PMOS transistors P1 and P2 to be turned on and thereby causing node ND2 (e.g., curve 108) to transition towards a high logical value. In some embodiments, by causing node ND2 (e.g., curve 108) to transition towards a high logical value, inverters I3 and I4 and corresponding nodes ND and NDB will reach a corresponding state according to inverters I3 and I4 inherent static variations.

In some embodiments, one or more differences between PMOS transistors P3 and P4 will determine the states to which nodes ND and NDB will transition. In some embodiments, a strength of PMOS transistors P3 and P4 will determine the states to which nodes ND and NDB will transition. In some embodiments, PMOS transistor P3 is stronger than PMOS transistor P4 if PMOS transistor P3 has at least a lower Vt, a smaller channel length or a larger channel width than PMOS transistor P4. In some embodiments, PMOS transistor P3 is weaker than PMOS transistor P4 if PMOS transistor P3 has at least a larger Vt, a larger channel length or a smaller channel width than PMOS transistor P4.

For example, if PMOS transistor P3 is stronger than PMOS transistors P4, then eventually signal Qa of node ND will reach voltage VDD and node NDB of signal Qb will reach VSS in a stable state, and the output data signal PUF_out is a logical 0. For example, if PMOS transistor P3 is weaker than PMOS transistors P4, then eventually signal Qb of node NDB will reach voltage VDD and node ND of signal Qa will reach VSS in a stable state, and the output data signal PUF_out is a logical 1.

As shown in FIG. 1B, after time T3, curve 110 transitions to a logical low level, and curve 112 transitions to a logical high level. In some embodiments, in this example, PMOS transistor P3 is stronger than PMOS transistors P4 and the output data signal PUF_out is a logical 0. Other configurations of the strength of PMOS transistors P3 and P4 are within the scope of the present disclosure.

At time T4, PUF cell 100A returns to the reset phase.

In some embodiments, as shown in FIGS. 1A-1B, signals Qa, Qb and VDDV at corresponding nodes ND, NDB and ND2 affect the proper operation of PUF cell 100A. For example, if one or more signals Qa, Qb and VDDV at corresponding nodes ND, NDB and ND2 are varied, then the operation and output of PUF cell 100A are also varied by what is known as systematic bias. In other words, in some embodiments, signals Qa, Qb and VDDV at corresponding nodes ND, NDB and ND2 affect the bias of PUF cell 100A. One or more embodiments of the present disclosure include symmetrical and balanced layout designs 200A, 200L, 500A and 500L to overcome systematic bias resulting in better performance compared with other approaches.

In some embodiments, the timing and paths of one or more of signals start_1a, start_1b and start_2 also affect the operation and output of PUF cell 100A resulting in systematic bias. In other words, in some embodiments, signals start_1a, start_1b and start_2 affect the bias of PUF cell 100A. In some embodiments, signals start_1a and start_1b arrive at NMOS transistors N1 and N2 at the same time in order to reduce systematic bias. In some embodiments, signal start2 is activated after signals start_1a and start_1b have been de-activated in order to reduce systematic bias. One or more embodiments of the present disclosure include symmetrical and balanced architectures, and PUF cell array 800A-800B, 900A-900D overcome systematic bias resulting in better performance compared with other approaches.

FIGS. 2A-2K are diagrams of a layout design 200A, in accordance with some embodiments. Layout design 200A corresponds to a layout diagram of a PUF cell 100A of FIG. 1A. Layout design 200A is usable to manufacture PUF cell 100A (FIG. 1A) or an integrated circuit similar to integrated circuit 300A of FIGS. 3A-3C.

Figure 2A:
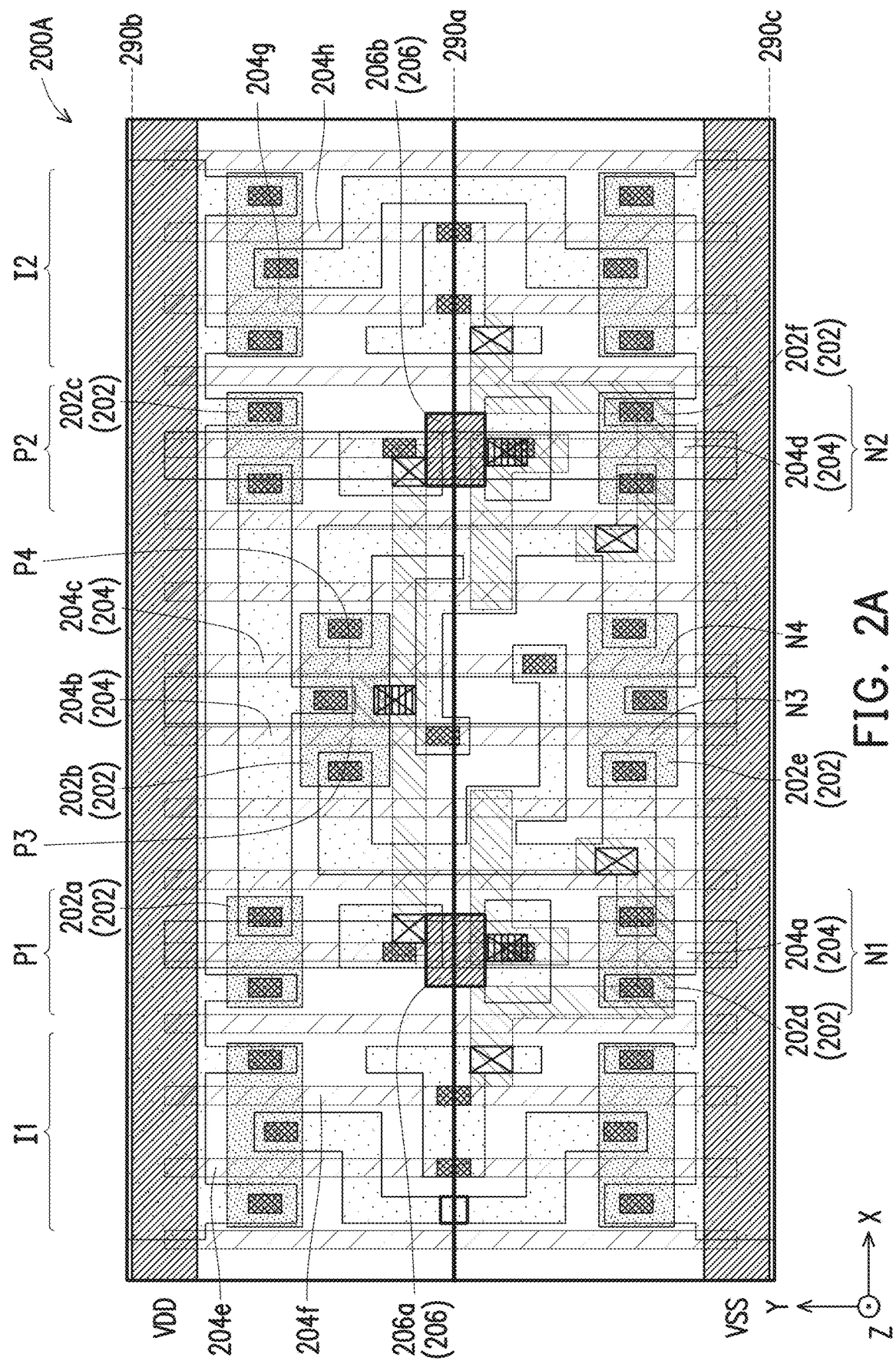
Figure 2B:
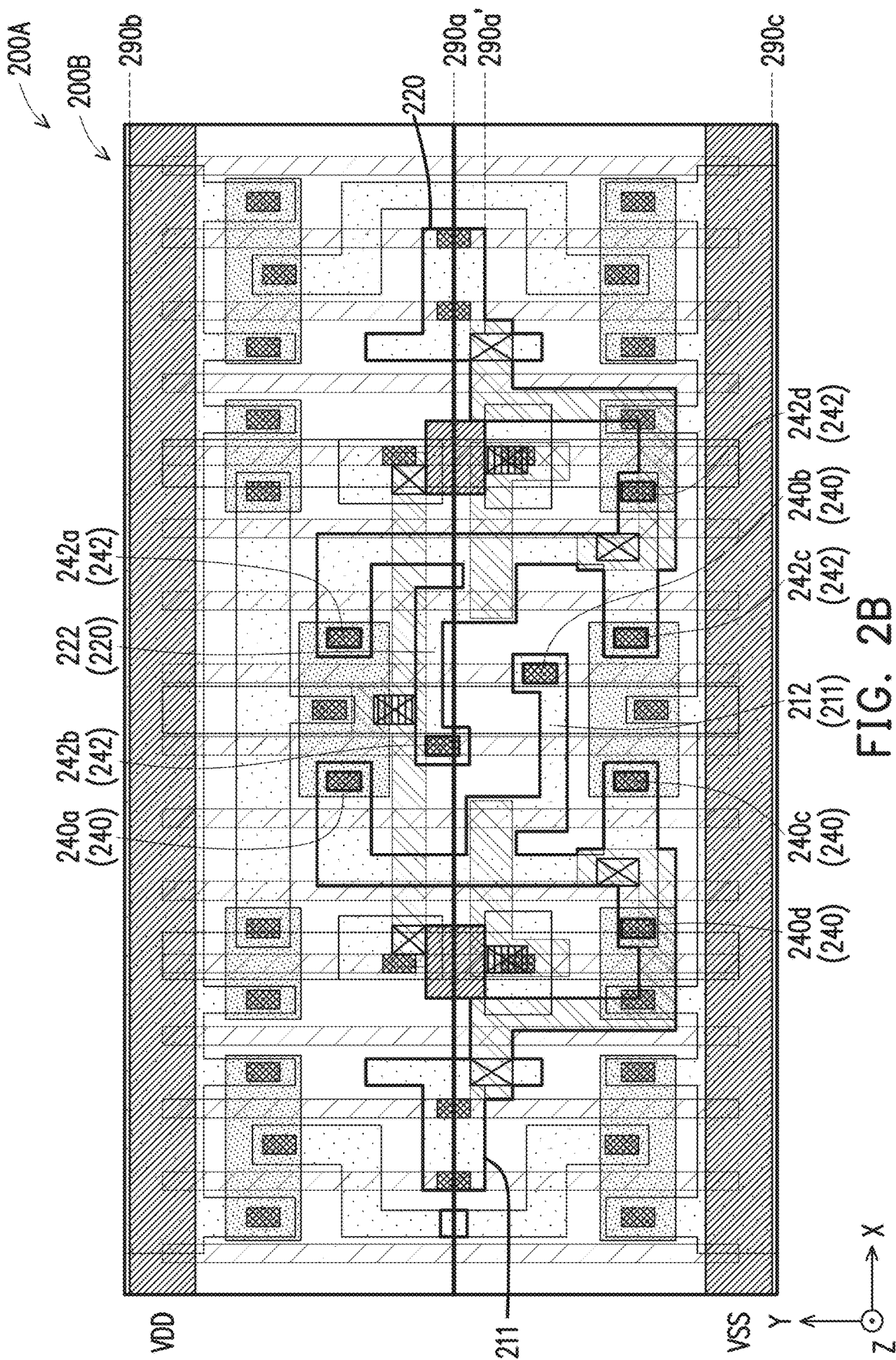
Figure 2C:
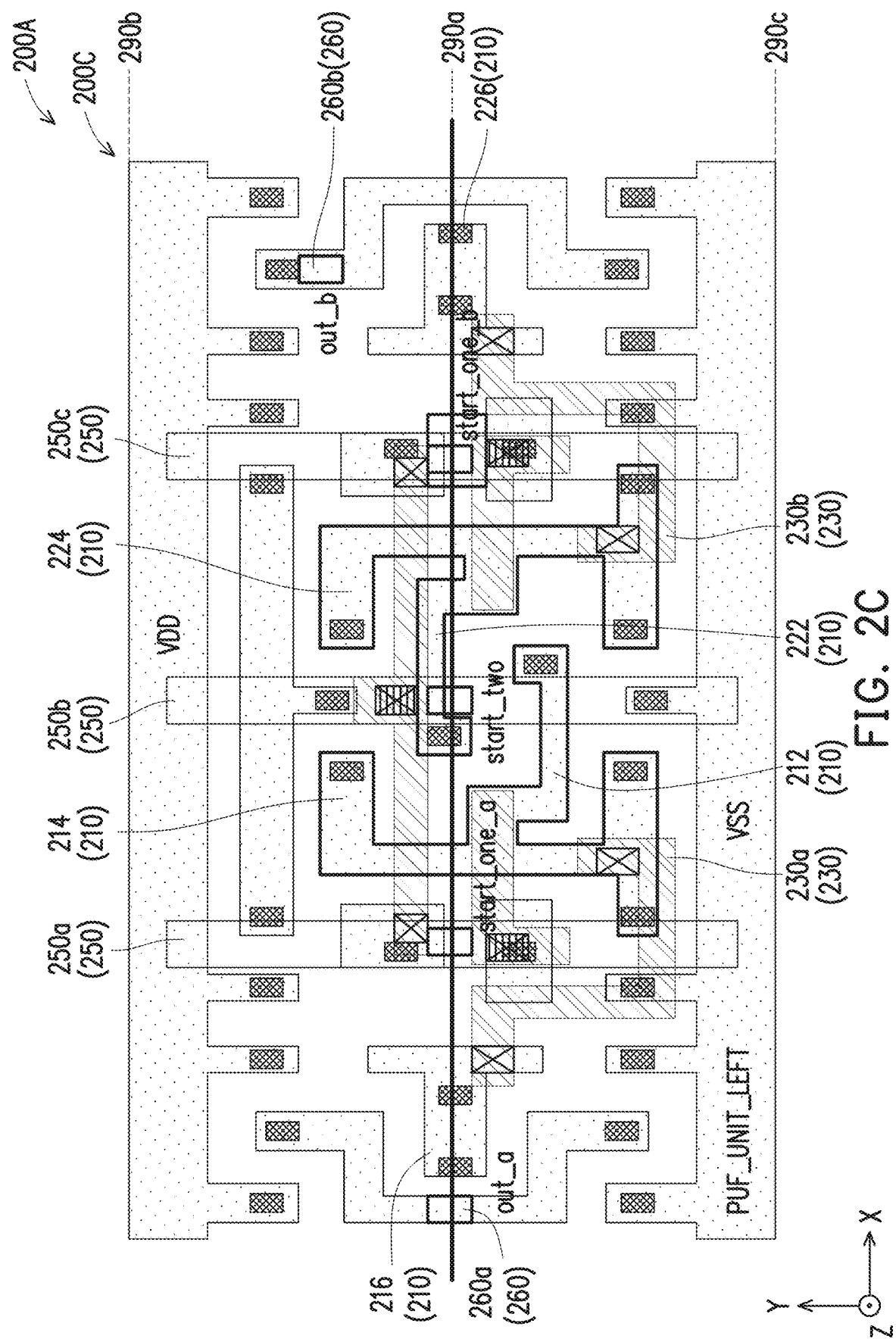

FIG. 2A is a diagram of a layout design 200A, in accordance with some embodiments.

Components that are the same or similar to those in one or more of FIGS. 2A-2L, 3A-3C, 4A-4B, 5A-5L, 6A-6C, 7A-7B, 8A-8B, 9A-9D and 10 (shown below) are given the same reference numbers, and detailed description thereof is thus omitted.

For ease of illustration, some of the elements of layout design 200A, 200L, 500A or 500L are not labelled in FIG. 2A-2L or 5A-5L. In some embodiments, layout design 200A, 200L, 500A or 500L includes additional elements not shown in FIG. 2A-2L or 5A-5L.

Structural relationships including alignment, lengths and widths, as well as configurations of layout design 500A or 500L (FIGS. 5A-5L) are similar to the structural relationships and configurations of layout design 200A or 200L of FIGS. 2A-2L, and will not be described in FIGS. 5A-5L for brevity.

FIGS. 2B-2K are diagrams of a corresponding portion 200B-200K of layout design 200A of FIG. 2A, simplified for ease of illustration.

Portion 200B is layout design 200A of FIG. 2A, but further highlights the set of conductive feature layout patterns 211 and 220, for ease of illustration.

Portion 200C includes one or more features of layout design 200A of FIG. 2A from the via over diffusion (VD) level, the via over gate (VG) level, the via one (V1) level, the via two (V2) level, the metal one (M1) level, the metal two (M2) level and the metal three (M3) level of layout design 200A.

Figures 2D, 2E:
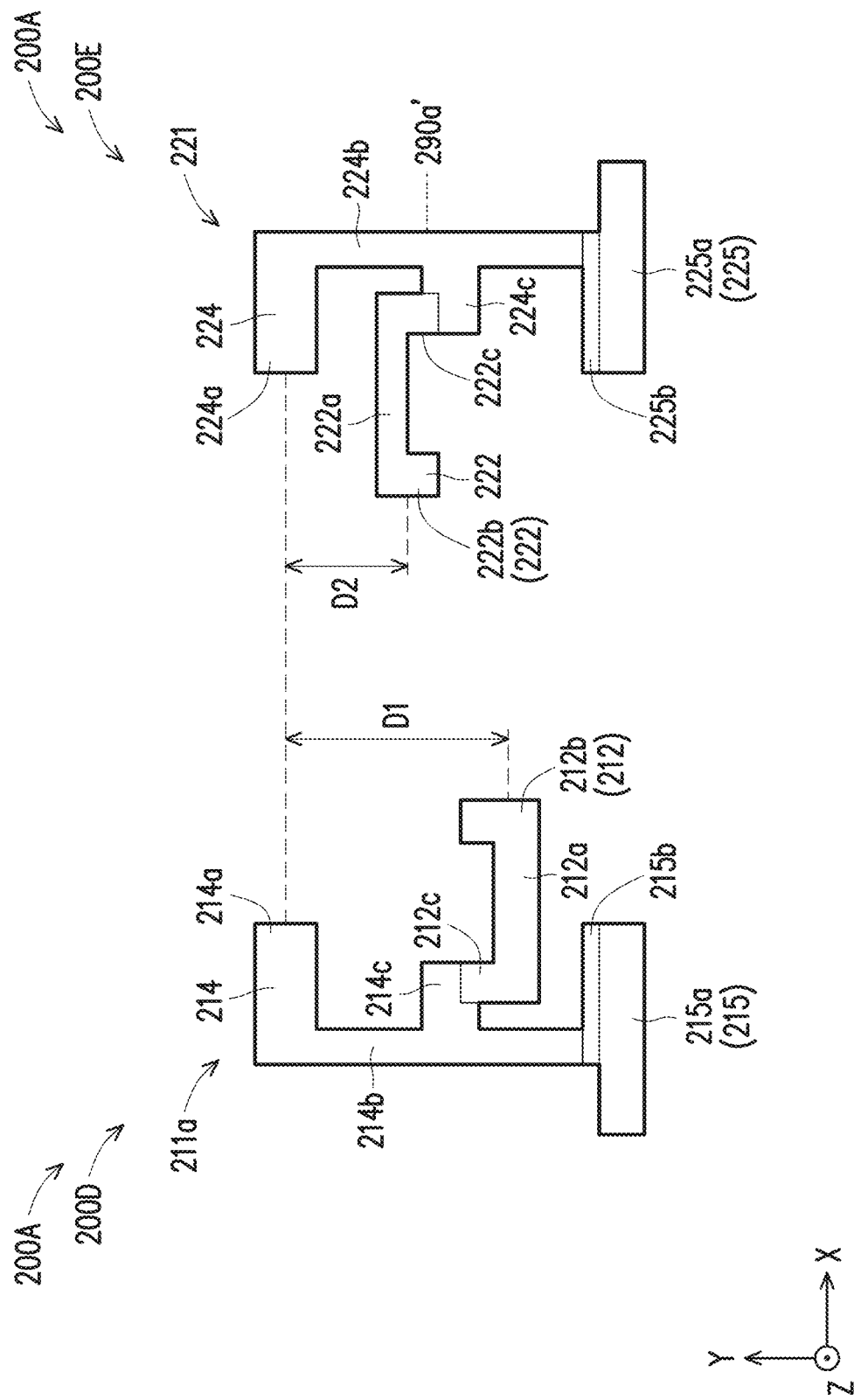
Figure 2F:
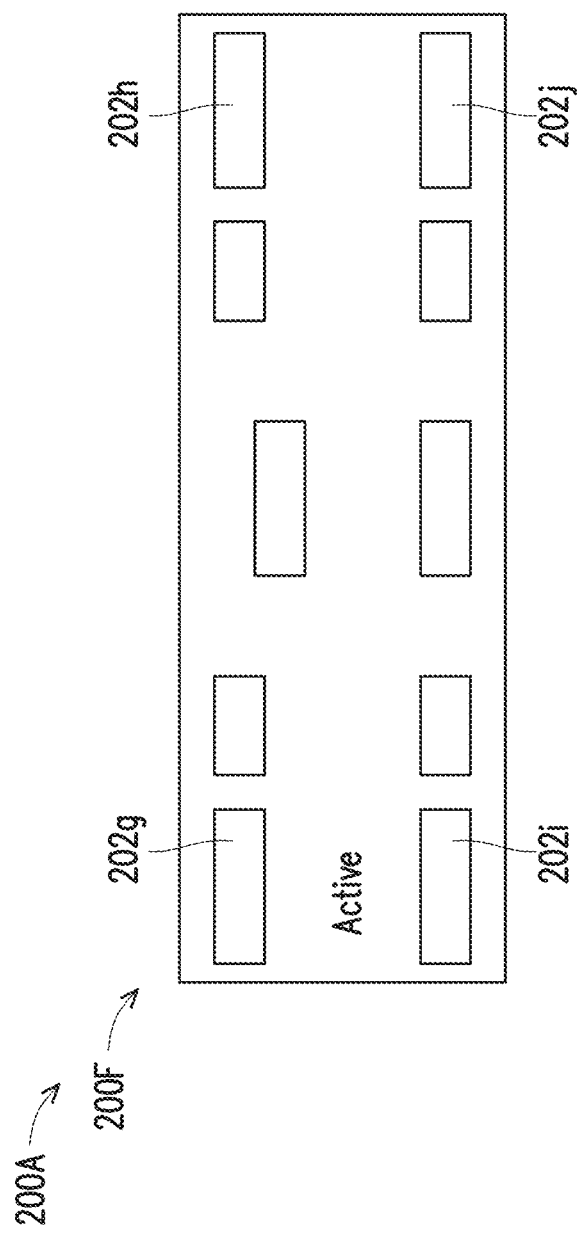
Figure 2G:
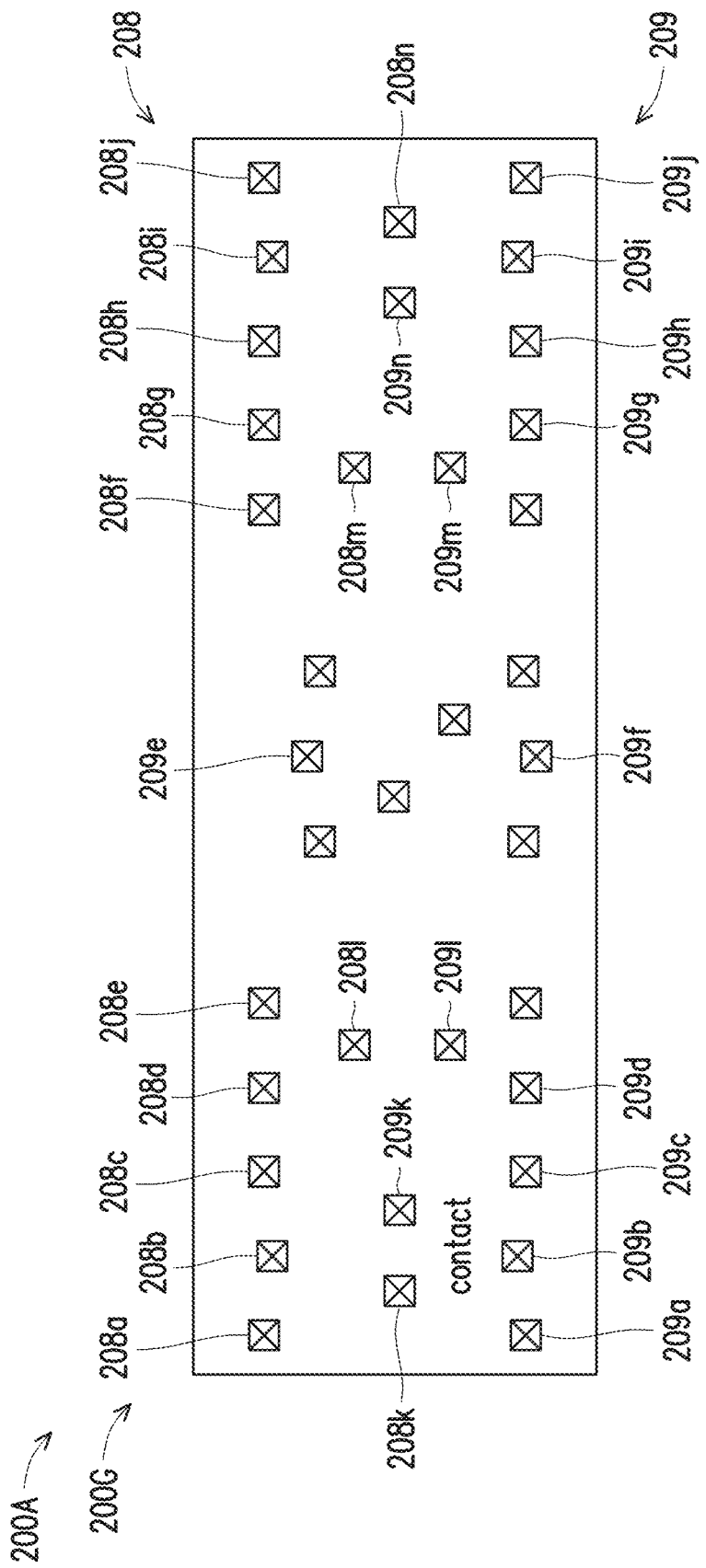
Figure 2H:
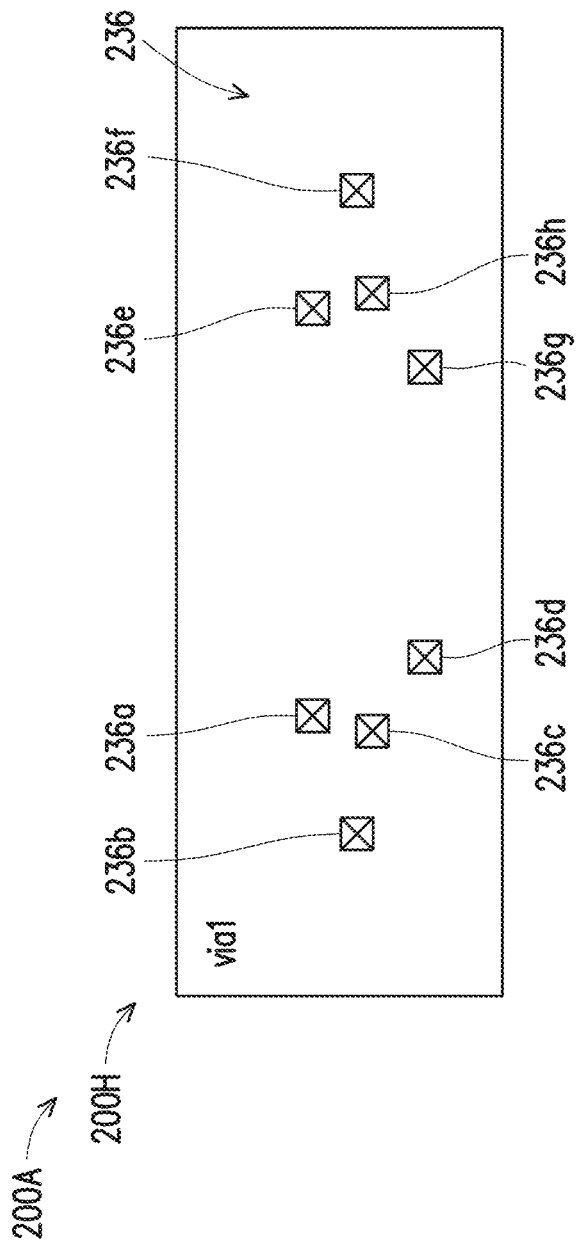
Figure 21:
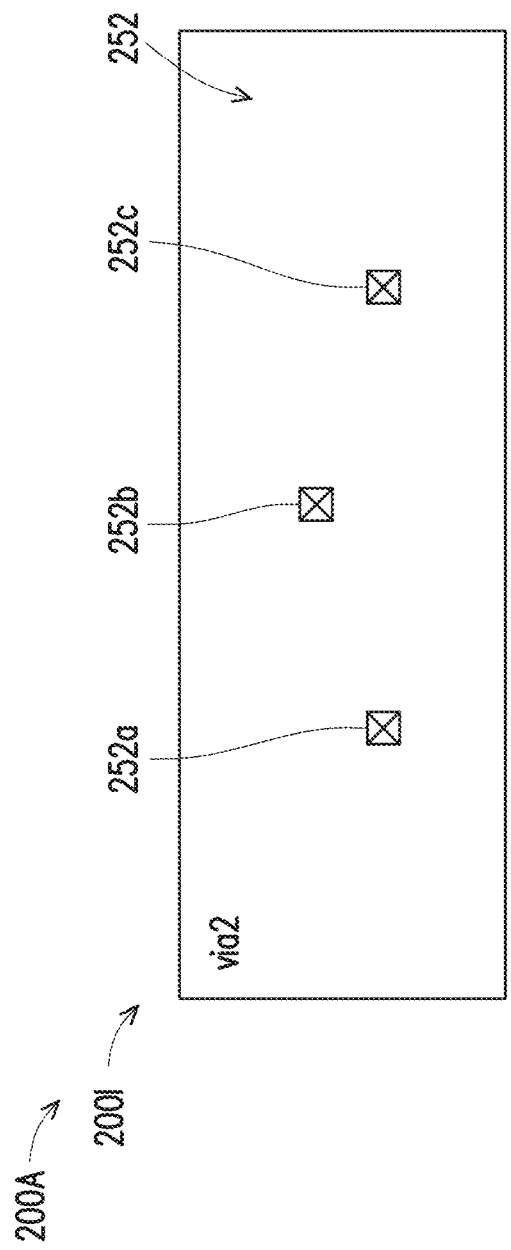
Figure 2J:
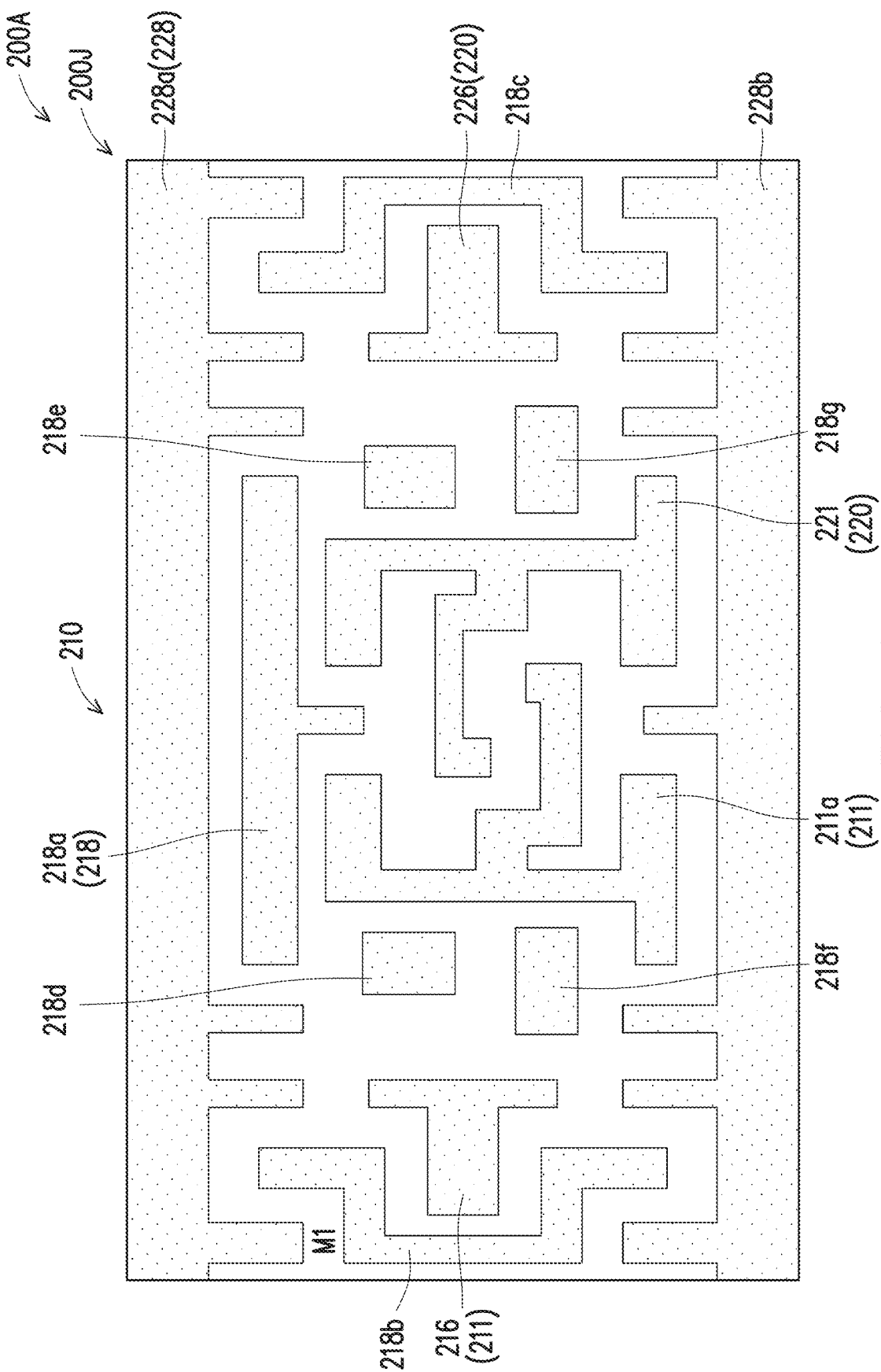
Figure 2K:
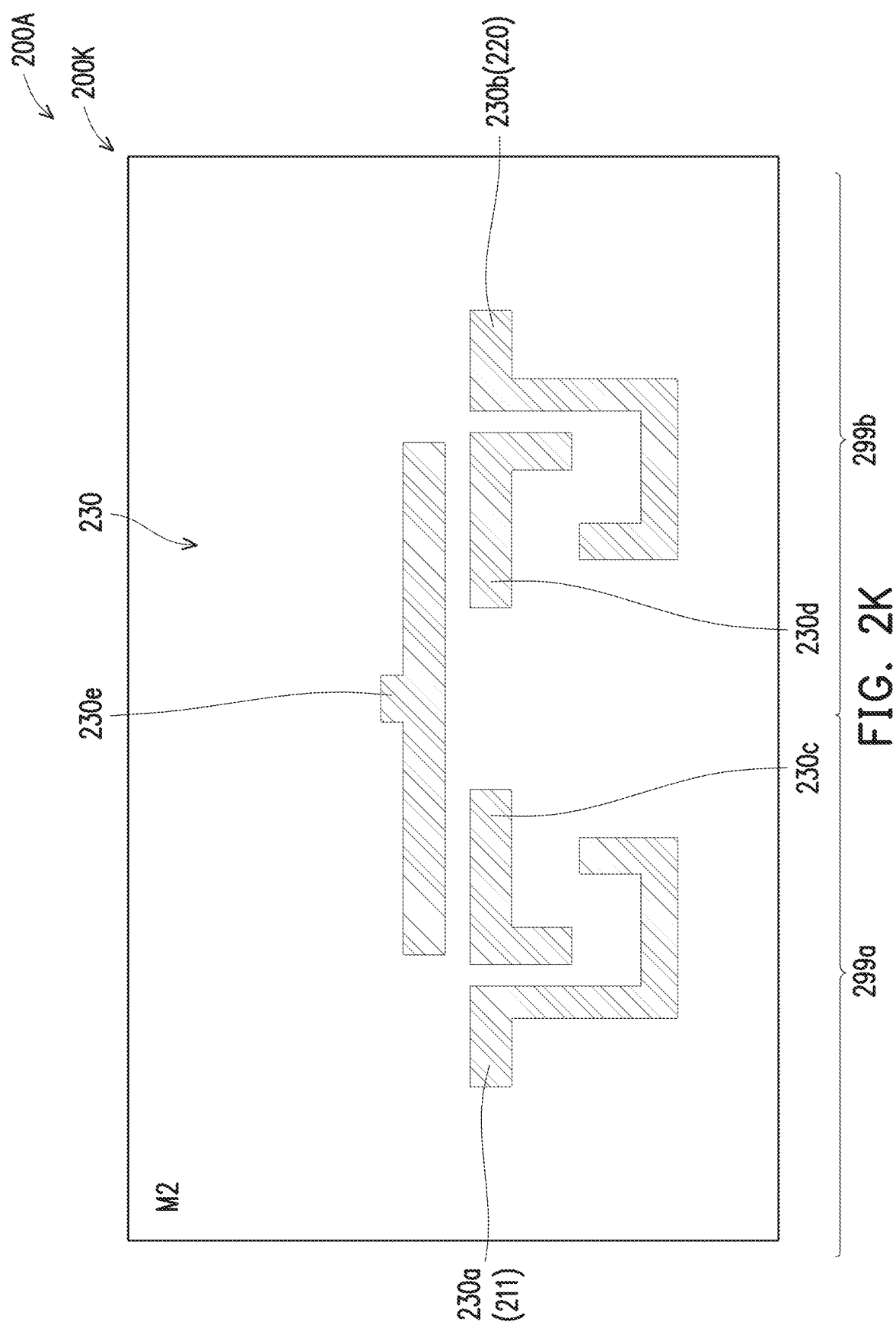

FIGS. 2D-2E are diagrams of a corresponding zoomed in portion 200D and 200E of conductive feature layout pattern 211a and 220 of layout design 200A, in accordance with some embodiments.

Portion 200F includes one or more features of layout design 200A of FIG. 2A from the active level or the oxide diffusion (OD) level of layout design 200A. Portion 200G includes one or more features of layout design 200A of FIG. 2A from the VD level and the VG level of layout design 200A. Portion 200H includes one or more features of layout design 200A of FIG. 2A from the V1 level of layout design 200A. Portion 200I includes one or more features of layout design 200A of FIG. 2A from the V2 level of layout design 200A. Portion 200J includes one or more features of layout design 200A of FIG. 2A from the M1 level of layout design 200A. Portion 200K includes one or more features of layout design 200A of FIG. 2A from the M2 level of layout design 200A.

Layout design 200A is usable to manufacture PUF cell 100A (FIG. 1A).

Layout design 200A includes one or more of active region layout patterns 202a, 202b, 202c, 202d, 202e, 202f, 202g, 202h, 202i and 202j (collectively referred to as a "set of active region layout patterns 202") extending in a first direction X. Each of the active region layout patterns of the set of active region layout patterns 202 are separated from one another in a second direction Y different from the first direction X. The set of active region layout patterns 202 is usable to manufacture a corresponding set of active regions 302 (FIGS. 3A-3C) of integrated circuit 300A.

In some embodiments, active region layout patterns 202a, 202b, 202c, 202d, 202e, 202f, 202g, 202h, 202i, 202j of the set of active region layout patterns 202 is usable to manufacture corresponding active regions 302a, 302b, 302c, 302d, 302e, 302f, 302g, 302h, 302i and 302j of the set of active regions 302 (FIGS. 3A-3B) of integrated circuit 300A. For ease of illustration, active regions 302g, 302h, 302i and 302j are not labelled. In some embodiments, the set of active region layout patterns 202 is referred to as an oxide diffusion (OD) region which defines the source or drain diffusion regions of integrated circuit 300A.

In some embodiments, active region layout pattern 202a is usable to manufacture source and drain regions of PMOS transistor P1, active region layout pattern 202b is usable to manufacture source and drain regions of PMOS transistors P3 and P4, active region layout pattern 202c is usable to manufacture source and drain regions of PMOS transistor P2, active region layout pattern 202d is usable to manufacture source and drain regions of NMOS transistor N1, active region layout pattern 202e is usable to manufacture source and drain regions of NMOS transistors N3 and N4, active region layout pattern 202f is usable to manufacture source and drain regions of NMOS transistor N2, active region layout pattern 202g is usable to manufacture source and drain regions of PMOS transistors of inverter I1, active region layout pattern 202h is usable to manufacture source and drain regions of PMOS transistors of inverter I2, active region layout pattern 202i is usable to manufacture source and drain regions of NMOS transistors of inverter I1, active region layout pattern 202j is usable to manufacture source and drain regions of NMOS transistors of inverter I2, of PUF cell 100A (FIG. 1A).

In some embodiments, the set of active region layout patterns 202 is located on a first level. In some embodiments, the first level corresponds to an active level or an OD level of one or more of layout designs 200A, 200L, 500A, 500L (FIGS. 5A-5L), integrated circuit 300A or 600A (FIG. 3A-3C or 6A-6C).

Other configurations or quantities of patterns in the set of active region layout patterns 202 are within the scope of the present disclosure.

Layout design 200A further includes at least gate layout pattern 204a, 204b, 204c, 204d, 204e, 204f, 204g, 204h, . . . , 204o or 204p (collectively referred to as a "set of gate layout patterns 204") extending in the second direction Y.

Each of the gate layout patterns of the set of gate layout patterns 204 is separated from an adjacent gate layout pattern of the set of gate layout patterns 204 in the first direction X by a first pitch (not labelled). The set of gate layout patterns 204 is usable to manufacture a corresponding set of gates 304 (FIG. 3) of integrated circuit 300. In some embodiments, gate layout pattern 204a, 204b, 204c, 204d, 204e, 204f, 204g, 204h, . . . , 204o or 204p of the set of gate layout patterns 204 is usable to manufacture corresponding gate 304a, 304b, 304c, 304d, 304e, 304f, 304g, 304h, . . . , 304o or 304p of the set of gates 304 (FIG. 3) of integrated circuit 300. In some embodiments, at least gate layout pattern 204i, 204j, . . . or 204p is a dummy gate layout pattern and are not labelled for ease of illustration. In some embodiments, a dummy gate layout pattern is usable to manufacture a corresponding dummy gate. In some embodiments, at least gate 304i, 304j, . . . or 304p is a dummy gate. In some embodiments, a dummy gate is a gate structure of a non-functional transistor device.

The set of gate layout patterns 204 are positioned on a second level. In some embodiments, the second level is different from the first level. In some embodiments, the second level corresponds to a POLY layer of one or more of layout designs 200A, 200L, 500A, 500L (FIGS. 5A-5L), integrated circuit 300A or 600A (FIG. 3A-3C or 6A-6C).

The set of active region layout patterns 202 is below the set of gate layout patterns 204.

Gate layout pattern 204a is usable to manufacture the gate terminal of NMOS transistor N1 and PMOS transistor P1, gate layout pattern 204b is usable to manufacture the gate terminal of PMOS transistor P3 and the gate terminal of NMOS transistor N3, gate layout pattern 204c is usable to manufacture the gate terminal of PMOS transistor P4 and the gate terminal of NMOS transistor N4, and gate layout pattern 204d is usable to manufacture the gate terminal of PMOS transistor P2 and the gate terminal of NMOS transistor N2 of FIG. 1.

In some embodiments, gate layout pattern 204e and 204f are usable to manufacture the gate terminals of the PMOS transistors and the gate terminals of the NMOS transistors of inverter I1 of FIG. 1. In some embodiments, gate layout pattern 204g and 204h are usable to manufacture the gate terminals of the PMOS transistors and the gate terminals of the NMOS transistors of inverter I2 of FIG. 1.

Other configurations, arrangements on other levels or quantities of patterns in the set of gate layout patterns 204 are within the scope of the present disclosure.

Layout design 200A further includes at least contact layout pattern 208a, 208b, . . . , 208m or 208n (collectively referred to as a "set of contact layout patterns 208"), contact layout pattern 209a, 209b, . . . , 209m or 209n (collectively referred to as a "set of contact layout patterns 209"), contact layout pattern 240a, 240b, 240c or 240d (collectively referred to as a "set of contact layout patterns 240") or contact layout pattern 242a, 242b, 242c or 242d (collectively referred to as a "set of contact layout patterns 242"). At least the set of contact layout patterns 208, 209, 240 or 242 extends in the first direction X or the second direction Y.

At least layout pattern 208a, . . . , 208j of the set of contact layout patterns 208 or at least layout pattern 209a, . . . , 209j of the set of contact layout patterns 209 is over at least the set of active region layout patterns 202. At least layout pattern 240a of the set of contact layout patterns 240 or layout pattern 242a of the set of contact layout patterns 242 is over active region layout pattern 202b of the set of active region layout patterns 202. At least layout pattern 240c of the set of contact layout patterns 240 or layout pattern 242c of the set of contact layout patterns 242 is over active region layout pattern 202e of the set of active region layout patterns 202. At least layout pattern 240d of the set of contact layout patterns 240 or layout pattern 242d of the set of contact layout patterns 242 is over corresponding active region layout pattern 202d or 202f of the set of active region layout patterns 202.

At least layout pattern 208k, 208n of the set of contact layout patterns 208 is over corresponding gate layout pattern 204e, 204h of the set of gate layout patterns 204. At least layout pattern 209k, 209n of the set of contact layout patterns 209 is over corresponding gate layout pattern 204f, 204g of the set of gate layout patterns 204. At least layout pattern 208l of the set of contact layout patterns 208 and layout pattern 209l of the set of contact layout patterns 209 is over gate layout pattern 204a of the set of gate layout patterns 204. At least layout pattern 208m of the set of contact layout patterns 208 and layout pattern 209m of the set of contact layout patterns 209 is over gate layout pattern 204d of the set of gate layout patterns 204. At least layout pattern 240b of the set of contact layout patterns 240 is over gate layout pattern 204c of the set of gate layout patterns 204. At least layout pattern 242b of the set of contact layout patterns 242 is over gate layout pattern 204b of the set of gate layout patterns 204.

At least the set of contact layout patterns 208, 209, 240 or 242 is located on a third level. In some embodiments, the third level is different from the first level and the second level. In some embodiments, the third level is different from the second level and the first level.

In some embodiments, the third level corresponds to a contact level of one or more of layout designs 200A, 200L, 500A, 500L (FIGS. 5A-5L), integrated circuit 300A or 600A (FIG. 3A-3C or 6A-6C). In some embodiments, the third level corresponds to a via over diffusion (VD) level or a via over gate (VG) level of one or more of layout designs 200 or 500 (FIG. 2 or 5) or integrated circuit 300A or 600A (FIG. 3A-3C or 6A-6C). Other levels are within the scope of the present disclosure.

The set of contact layout patterns 208, 209, 240 or 242 is usable to manufacture a corresponding set of contacts 308, 309, 340 or 342 (FIG. 3) of integrated circuit 300A. In some embodiments, at least contact layout pattern 208a, 208b, . . . , 208n of the set of contact layout patterns 208, contact layout pattern 209a, 209b, . . . , 209n of the set of contact layout patterns 209, contact layout pattern 240a, 240b, 240c, 240d of the set of contact layout patterns 240 or contact layout pattern 242a, 242b, 242c or 242d of the set of contact layout patterns 242 is usable to manufacture at least corresponding contact 308a, 308b, . . . , 308n of the set of contacts 308, contact 309a, 309b, . . . , 309n of the set of contacts 309, contact 340a, 340b, 340c, 340d of the set of contacts 340 or contact 342a, 342b, 342c or 342d of the set of contacts 342.

Other configurations, arrangements on other levels, shapes or quantities of patterns in the set of contact layout patterns 208, 209, 240 or 242 are within the scope of the present disclosure.

Layout design 200A further includes a set of conductive feature layout patterns 210 extending in at least the first direction X or the second direction Y. The set of conductive feature layout patterns 210 is usable to manufacture a corresponding set of conductive structures 310 (FIG. 3) of integrated circuit 300A.

In some embodiments, the set of conductive feature layout patterns 210 includes at least a conductive feature layout pattern 211a, a conductive feature layout pattern 216, a set of conductive feature layout patterns 218, a conductive feature layout pattern 221 or a conductive feature layout pattern 226.

In some embodiments, conductive feature layout pattern 211a, conductive feature layout pattern 216, set of conductive feature layout patterns 218, conductive feature layout pattern 221 and conductive feature layout pattern 226 are usable to manufacture a corresponding conductive structure 311a, a corresponding conductive structure 316, a corresponding set of conductive structures 318, a corresponding conductive structure 321 or a corresponding conductive structure 326 (FIGS. 3A-3C) of integrated circuit 300A.

In some embodiments, at least conductive feature layout pattern 211a, conductive feature layout pattern 216 or conductive feature layout pattern 230a (discussed below) are part of a set of conductive feature layout patterns 211. In some embodiments, at least conductive feature layout pattern 221, conductive feature layout pattern 226 or conductive feature layout pattern 230b (discussed below) are part of a set of conductive feature layout patterns 220. In some embodiments, a portion (e.g., conductive feature layout patterns 214, 215, 216 and 230a) of the set of conductive feature layout patterns 211 in region 299a and a corresponding portion (e.g., corresponding conductive feature layout patterns 224, 225, 226 and 230b) of the set of conductive feature layout patterns 221 in region 299b are symmetric to each other with respect to a central line extending in the second direction Y of layout design 200A.

In some embodiments, the set of conductive feature layout patterns 211 or 220 is usable to manufacture corresponding a set of conductive structures 311 or 320 (FIGS. 3A-3C) of integrated circuit 300A.

Conductive feature layout pattern 211a includes at least a set of conductive feature layout patterns 212, a conductive feature layout pattern 214 or a conductive feature layout pattern 215.

In some embodiments, set of conductive feature layout patterns 212 and conductive feature layout patterns 214 and 215 are portions of a same continuous layout pattern (e.g., conductive feature layout pattern 211a).

In some embodiments, the set of conductive feature layout patterns 212, the conductive feature layout pattern 214 or the conductive feature layout pattern 215 are usable to manufacture a corresponding set of conductive structures 312, a corresponding conductive structure 314 and a corresponding conductive structure 315 (FIGS. 3A-3C) of integrated circuit 300A.

Conductive feature layout pattern 211a overlaps contact layout patterns 240a, 240b, 240c and 240d. Conductive feature layout pattern 211a overlaps active region layout patterns 202b, 202d and 202e. Conductive feature layout pattern 211a overlaps gate layout patterns 204b and 204c.

The set of conductive feature layout patterns 212 includes at least a conductive feature layout pattern 212a, a conductive feature layout pattern 212b, or a conductive feature layout pattern 212c. In some embodiments, conductive feature layout patterns 212a, 212b and 212c are portions of a same continuous layout pattern (e.g., set of conductive feature layout patterns). In some embodiments, the set of conductive feature layout patterns 212 has a C-shape. In some embodiments, other shapes or configurations of the set of conductive feature layout patterns 212 are within the scope of the present disclosure. Conductive feature layout pattern 212 overlaps gate layout patterns 204b and 204c.

In some embodiments, the conductive feature layout pattern 212a, the conductive feature layout pattern 212b, or the conductive feature layout pattern 212c is usable to manufacture a corresponding conductive structure 312a, a corresponding conductive structure 312b, or a corresponding conductive structure 312c (FIGS. 3A-3C) of integrated circuit 300A.

Conductive feature layout pattern 214 includes at least a conductive feature layout pattern 214a, a conductive feature layout pattern 214b, or a conductive feature layout pattern 214c. In some embodiments, conductive feature layout patterns 214a, 214b and 214c are portions of a same continuous layout pattern (e.g., conductive feature layout pattern 214). In some embodiments, conductive feature layout pattern 214 has an F-shape. In some embodiments, other shapes or configurations of conductive feature layout pattern 214 are within the scope of the present disclosure. Conductive feature layout pattern 214a overlaps contact layout pattern 240a. Conductive feature layout pattern 214a overlaps active region layout pattern 202b.

In some embodiments, the conductive feature layout pattern 214a, the conductive feature layout pattern 214b, or the conductive feature layout pattern 214c is usable to manufacture a corresponding conductive structure 314a, a corresponding conductive structure 314b, or a corresponding conductive structure 314c (FIGS. 3A-3C) of integrated circuit 300A.

Conductive feature layout pattern 215 includes at least a conductive feature layout pattern 215a or a conductive feature layout pattern 215b. In some embodiments, conductive feature layout patterns 215a and 215b are portions of a same continuous layout pattern (e.g., conductive feature layout pattern 215). In some embodiments, conductive feature layout pattern 215 has a staircase shape. In some embodiments, other shapes or configurations of conductive feature layout pattern 215 are within the scope of the present disclosure. Conductive feature layout pattern 215 overlaps contact layout patterns 240c and 240d. Conductive feature layout pattern 215 overlaps active region layout patterns 202d and 202e.

In some embodiments, the conductive feature layout pattern 215a or the conductive feature layout pattern 215b is usable to manufacture a corresponding conductive structure 315a or a corresponding conductive structure 315b (FIGS. 3A-3C) of integrated circuit 300A.

Conductive feature layout pattern 216 overlaps contact layout patterns 208k and 209k. Conductive feature layout pattern 216 is over gate layout patterns 204e and 204f. In some embodiments, conductive feature layout pattern 216 has a T-shape. In some embodiments, other shapes or configurations of conductive feature layout pattern 216 are within the scope of the present disclosure.

The set of conductive feature layout patterns 218 includes at least a conductive feature layout pattern 218a, 218b, 218c, 218d, 218e, 218f or 218g. In some embodiments, conductive feature layout patterns 218a, 218b, 218c, 218d, 218e, 218f, 218g of the set of conductive feature layout patterns 218 is usable to manufacture a corresponding conductive structure 318a, 318b, 318c, 318d, 318e, 318f, 318g of the set of conductive structures 318 (FIGS. 3A-3C) of integrated circuit 300A.

The set of conductive feature layout patterns 218 overlap at least one pattern of the set of contact layout patterns 208, 209, 240 or 242, at least one pattern of the set of active region layout patterns 202, or at least one pattern of the set of gate layout patterns 204.

Conductive feature layout pattern 218a overlaps contact layout pattern 209e. Conductive feature layout pattern 218a is over active region layout pattern 202b. In some embodiments, conductive feature layout pattern 218a has a T-shape. In some embodiments, other shapes or configurations of conductive feature layout pattern 218a are within the scope of the present disclosure.

Conductive feature layout pattern 218b overlaps contact layout patterns 208b and 209b. Conductive feature layout pattern 218a is over active region layout patterns 202g and 202i. Conductive feature layout pattern 218c overlaps contact layout patterns 208i and 209i. Conductive feature layout pattern 218a is over active region layout patterns 202h and 202j. Conductive feature layout pattern 218d overlaps contact layout pattern 208l. Conductive feature layout pattern 218d is over gate layout pattern 204a. Conductive feature layout pattern 218e overlaps contact layout pattern 208m. Conductive feature layout pattern 218e is over gate layout pattern 204d. Conductive feature layout pattern 218f overlaps contact layout pattern 209l. Conductive feature layout pattern 218f is over gate layout pattern 204a. Conductive feature layout pattern 218g overlaps contact layout pattern 209m. Conductive feature layout pattern 218g is over gate layout pattern 204d.

Conductive feature layout pattern 221 includes at least a set of conductive feature layout patterns 222, a conductive feature layout pattern 224 or a conductive feature layout pattern 225. In some embodiments, set of conductive feature layout patterns 222 and conductive feature layout patterns 224 and 225 are portions of a same continuous layout pattern (e.g., conductive feature layout pattern 221).

In some embodiments, the set of conductive feature layout patterns 222, the conductive feature layout pattern 224 or the conductive feature layout pattern 225 are usable to manufacture a corresponding set of conductive structures 322, a corresponding conductive structure 324 and a corresponding conductive structure 325 (FIGS. 3A-3C) of integrated circuit 300A.

Conductive feature layout pattern 221 overlaps contact layout patterns 242a, 242b, 242c and 242d. Conductive feature layout pattern 221 overlaps active region layout patterns 202b, 202e and 202f. Conductive feature layout pattern 221 overlaps gate layout patterns 204b and 204c.

The set of conductive feature layout patterns 222 includes at least a conductive feature layout pattern 222a, a conductive feature layout pattern 222b, or a conductive feature layout pattern 222c. In some embodiments, conductive feature layout patterns 222a, 222b and 222c are portions of a same continuous layout pattern (e.g., the set of conductive feature layout patterns 222). In some embodiments, the set of conductive feature layout patterns 222 has a C-shape. In some embodiments, other shapes or configurations of the set of conductive feature layout patterns 222 are within the scope of the present disclosure. Conductive feature layout pattern 222 overlaps gate layout patterns 204b and 204c.

In some embodiments, the conductive feature layout pattern 222a, the conductive feature layout pattern 222b, or the conductive feature layout pattern 222c is usable to manufacture a corresponding conductive structure 322a, a corresponding conductive structure 322b, or a corresponding conductive structure 322c (FIGS. 3A-3C) of integrated circuit 300A.

In some embodiments, the set of conductive feature layout patterns 222 and the set of conductive feature layout patterns 212 are symmetric to each other with respect to at least a line 290a or 290a' of layout design 200A extending in the first direction X. In some embodiments, at least conductive feature layout pattern 222a, conductive feature layout pattern 222b or conductive feature layout pattern 222c is symmetric to at least corresponding conductive feature layout pattern 212a, conductive feature layout pattern 212b, or conductive feature layout pattern 212c with respect to at least line 290a or 290a' of layout design 200A extending in the first direction X.

In some embodiments, conductive feature layout pattern 214a and conductive feature layout pattern 224a are separated from each other in the first direction X. In some embodiments, conductive feature layout pattern 212a is separated from at least conductive feature layout pattern 214a or 224a in the second direction by a distance D1. In some embodiments, conductive feature layout pattern 222a is separated from at least conductive feature layout pattern 214a or 224a in the second direction by a distance D2. In some embodiments, the distance D2 is different from the distance D1.

In some embodiments, distance D1 extends from where conductive feature layout pattern 214 overlaps contact layout pattern 240a or active region layout pattern 202a and where conductive feature layout pattern 212 overlaps contact layout pattern 240b or gate layout pattern 204c. In some embodiments, distance D2 extends from where conductive feature layout pattern 224 overlaps contact layout pattern 242a or active region layout pattern 202a and where conductive feature layout pattern 222 overlaps contact layout pattern 242b or gate layout pattern 204b.

Conductive feature layout pattern 224 includes at least a conductive feature layout pattern 224a, a conductive feature layout pattern 224b, or a conductive feature layout pattern 224c. In some embodiments, conductive feature layout patterns 224a, 224b and 224c are portions of a same continuous layout pattern (e.g., conductive feature layout pattern 224). In some embodiments, conductive feature layout pattern 224 has a F-shape. In some embodiments, other shapes or configurations of conductive feature layout pattern 224 are within the scope of the present disclosure. Conductive feature layout pattern 224a overlaps contact layout pattern 242a. Conductive feature layout pattern 224a overlaps active region layout pattern 202b.

In some embodiments, the conductive feature layout pattern 224a, the conductive feature layout pattern 224b, or the conductive feature layout pattern 224c is usable to manufacture a corresponding conductive structure 324a, a corresponding conductive structure 324b, or a corresponding conductive structure 324c (FIGS. 3A-3C) of integrated circuit 300A.

Conductive feature layout pattern 225 includes at least a conductive feature layout pattern 225a or a conductive feature layout pattern 225b. In some embodiments, conductive feature layout patterns 225a and 225b are portions of a same continuous layout pattern (e.g., conductive feature layout pattern 225). In some embodiments, conductive feature layout pattern 225 has a staircase shape. In some embodiments, other shapes or configurations of conductive feature layout pattern 224 are within the scope of the present disclosure. Conductive feature layout pattern 215 overlaps contact layout patterns 242c and 242d. Conductive feature layout pattern 215 overlaps active region layout patterns 202f and 202e.

In some embodiments, the conductive feature layout pattern 225a or the conductive feature layout pattern 225b is usable to manufacture a corresponding conductive structure 325a or a corresponding conductive structure 325b (FIGS. 3A-3C) of integrated circuit 300A.

Conductive feature layout pattern 226 overlaps contact layout patterns 208n and 209n. Conductive feature layout pattern 226 is over gate layout patterns 204g and 204h. In some embodiments, conductive feature layout pattern 226 has a T-shape. In some embodiments, other shapes or configurations of conductive feature layout pattern 226 are within the scope of the present disclosure.

The set of conductive feature layout patterns 210 is located on a fourth level. In some embodiments, the fourth level is different from at least the first level, the second level or the third level. In some embodiments, the fourth level corresponds to a metal one (M1) layer of one or more of layout designs 200A, 200L, 500A, 500L (FIGS. 5A-5L), integrated circuit 300A or 600A (FIG. 3A-3C or 6A-6C). Other levels are within the scope of the present disclosure.

Other configurations, arrangements on other levels or quantities of patterns in the set of conductive feature layout patterns 210 are within the scope of the present disclosure.

Figure 6A:
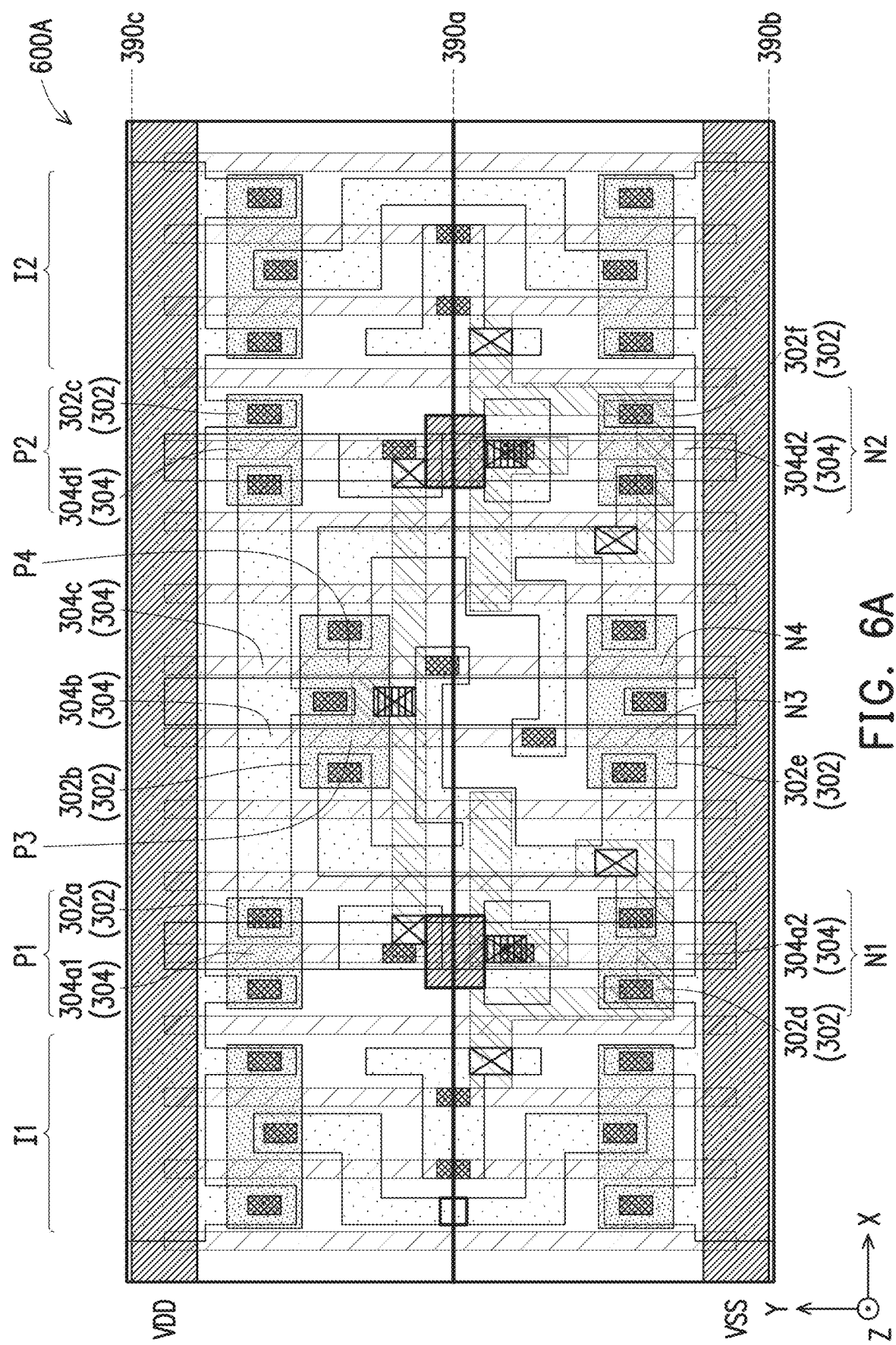
FIGS. 6A, 6B and 6C are diagrams of an integrated circuit, in accordance with some embodiments.
Figure 6B:
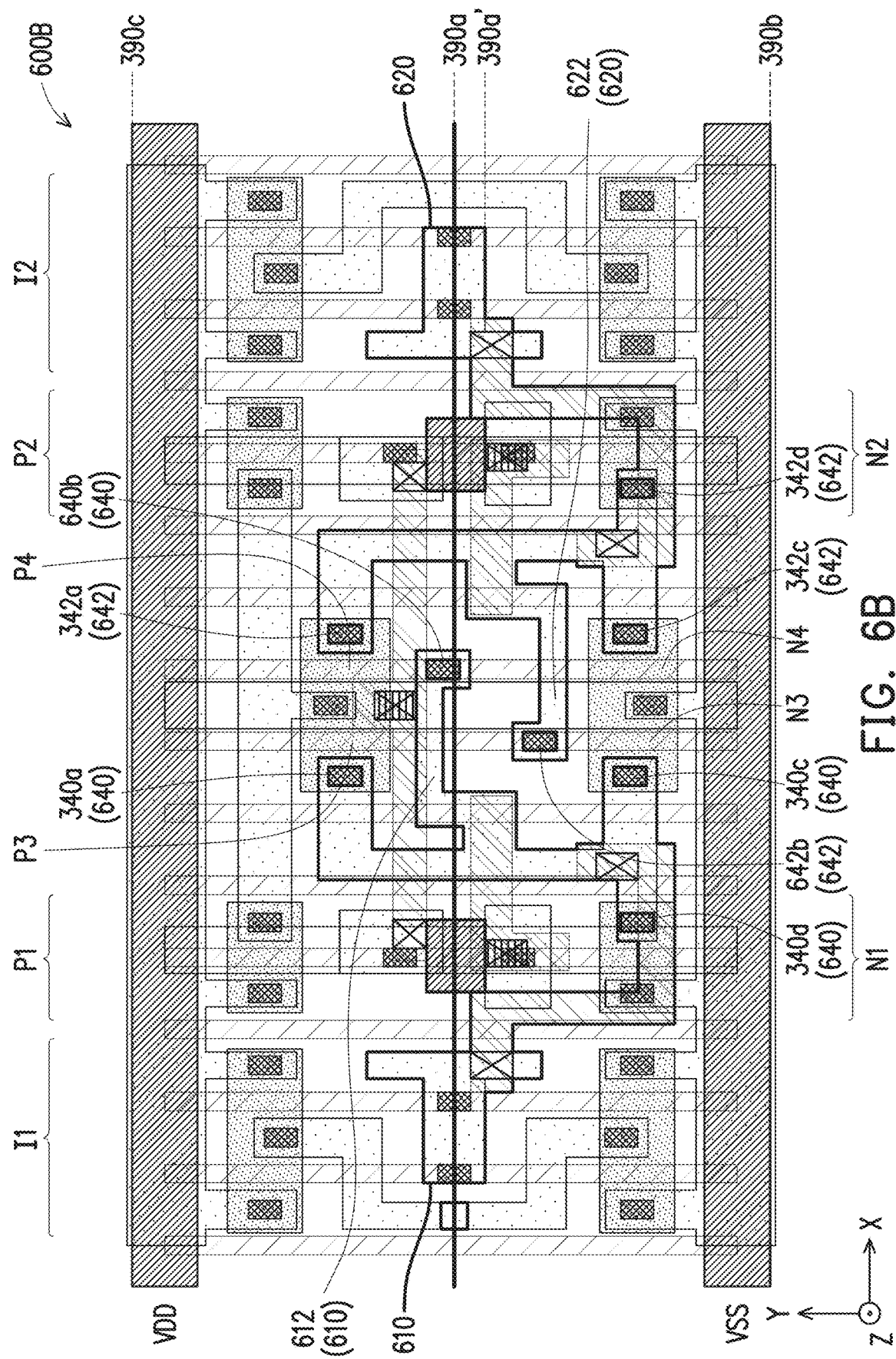
Figure 6C:
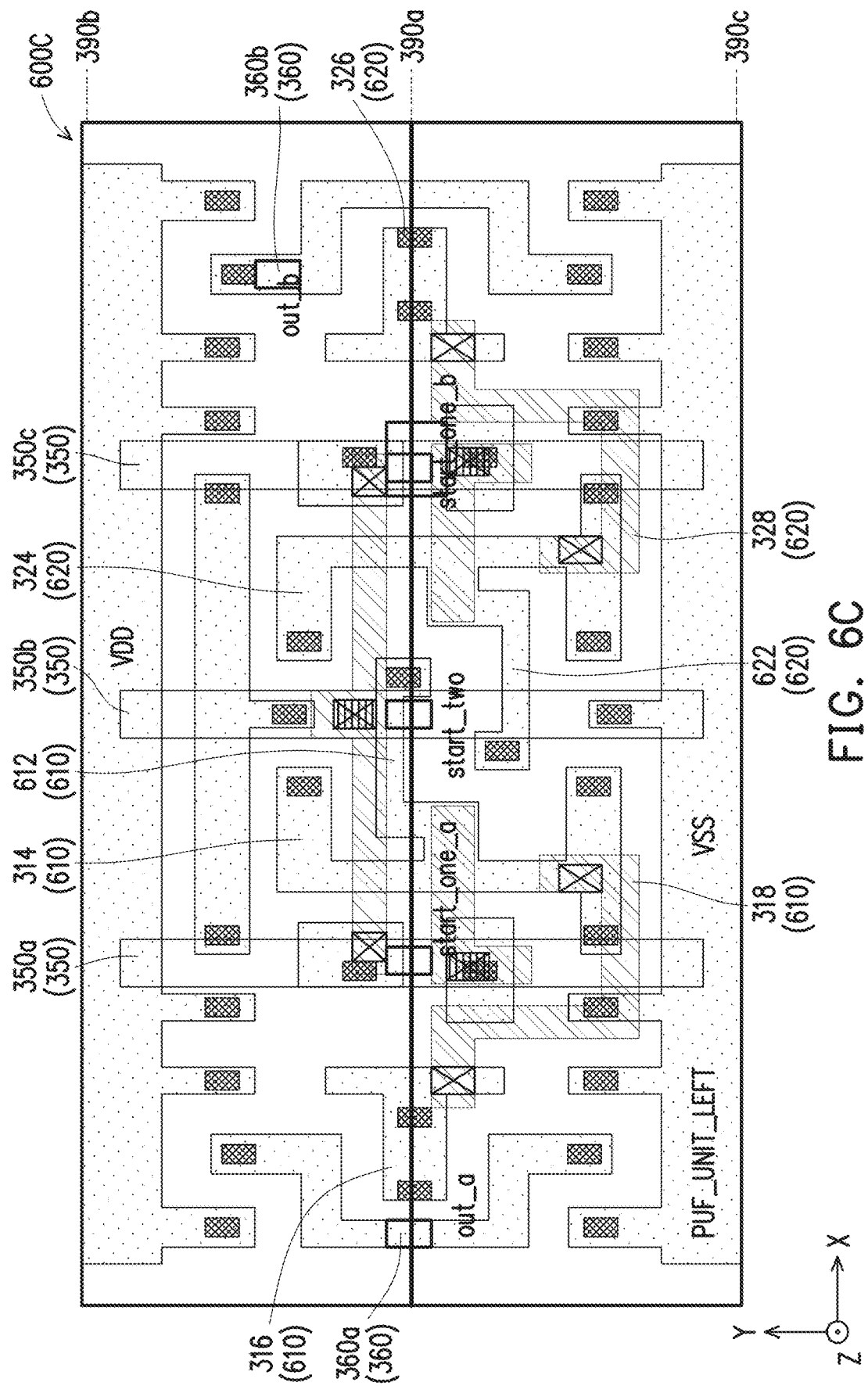

Layout design 200A further includes one or more power rail layout patterns 228a or 228b (collectively referred to as a "set of power rail layout patterns 228") extending in the first direction X, and being located on the fourth level. The set of power rail layout patterns 228 is usable to manufacture a set of power rails 328 of integrated circuit 300A (FIG. 3A-3C) or integrated circuit 600A (FIGS. 6A-6C). In some embodiments, power rail layout patterns 228a, 228b of the set of power rail layout patterns 228 is usable to manufacture corresponding power rails 328a, 328b of the set of power rails 328 (FIGS. 3A-3C) of integrated circuit 300A or 600A (FIGS. 6A-6C).

In some embodiments, power rail 228a is configured to provide a first supply voltage of a voltage supply VDD to the integrated circuit, such as integrated circuit 300A or 600A, and power rail 228b is configured to provide a second supply voltage of a reference voltage supply VSS to the integrated circuit, such as integrated circuit 300A or 600A. In some embodiments, power rail 228b is configured to provide a first supply voltage of a voltage supply VDD to the integrated circuit, such as integrated circuit 300A or 600A, and power rail 228a is configured to provide a second supply voltage of a reference voltage supply VSS to the integrated circuit, such as integrated circuit 300A or 600A.

In some embodiments, each power rail layout pattern 228a, 228b of the set of power rail layout patterns 228 is located along a corresponding edge 290b, 290c of a cell of layout design 200A. In some embodiments, layout design 200A corresponds to a standard cell.

The set of power rail layout patterns 228 overlaps one or more layout patterns of the set of contact layout patterns 208, 209, 240 or 242. In some embodiments, power rail layout pattern 228a overlaps at least contact layout pattern 208a, 208c, 208d, 208g, 208h or 208j. In some embodiments, power rail layout pattern 228b overlaps at least contact layout pattern 209a, 209c, 209d, 209f, 209g, 209h or 209j.

Other configurations, arrangements on other levels or quantities of patterns in the set of power rail layout patterns 228 are within the scope of the present disclosure.

Layout design 200A further includes at least conductive feature layout pattern 230a, 230b, 230c, 230d or 230e (collectively referred to as a "set of conductive feature layout patterns 230") extending in at least the first direction X or the second direction Y. The set of conductive feature layout patterns 230 is usable to manufacture a corresponding set of conductive structures 330 (FIGS. 3A-3C) of integrated circuit 300A or 600A (FIGS. 6A-6C). In some embodiments, conductive feature layout patterns 230a, 230b, 230c, 230d, 230e of the set of conductive feature layout patterns 230 is usable to manufacture corresponding conductive structures 330a, 330b, 330c, 330d, 330e of the set of conductive structures 330 (FIGS. 3A-3C) of integrated circuit 300A or 600A (FIGS. 6A-6C).

The set of conductive feature layout patterns 230 overlap at least the set of contact layout patterns 208, 209, 240 or 242, at least the set of gate layout patterns 204 or the set of conductive feature layout patterns 210 or at least the set of active region layout patterns 202.

Conductive feature layout pattern 230a overlaps conductive feature layout patterns 216, 218f and 211a, via layout patterns 236d (discussed below), contact layout patterns 209d and 240d, and active region 202d.

Conductive feature layout pattern 230b overlaps conductive feature layout patterns 226, 218g and 221, via layout patterns 236g (discussed below), contact layout patterns 209g and 242d, and active region 202f.

Conductive feature layout pattern 230c overlaps conductive feature layout patterns 216 and 218f, and via layout patterns 236b and 236c (discussed below). Conductive feature layout pattern 230d overlaps conductive feature layout patterns 226 and 218g, and via layout patterns 236h and 236f (discussed below). Conductive feature layout pattern 230e overlaps conductive feature layout patterns 218d and 218e and via layout patterns 236a and 236e (discussed below).

In some embodiments, a portion of the set of conductive feature layout patterns 230 in region 299a and a portion of the set of conductive feature layout patterns 230 in region 299b are symmetric to each other with respect to a central line extending in the second direction Y of layout design 200A.

The set of conductive feature layout patterns 230 is located on a fifth level. In some embodiments, the fifth level is different from at least the first level, the second level, the third level or the fourth level. In some embodiments, the fifth level corresponds to a metal two (M2) layer of one or more of layout designs 200A, 200L, 500A, 500L (FIGS. 5A-5L), integrated circuit 300A or 600A (FIG. 3A-3C or 6A-6C). Other levels are within the scope of the present disclosure.

Other configurations, arrangements on other levels or quantities of patterns in the set of conductive feature layout patterns 230 are within the scope of the present disclosure.

Figure 3A:
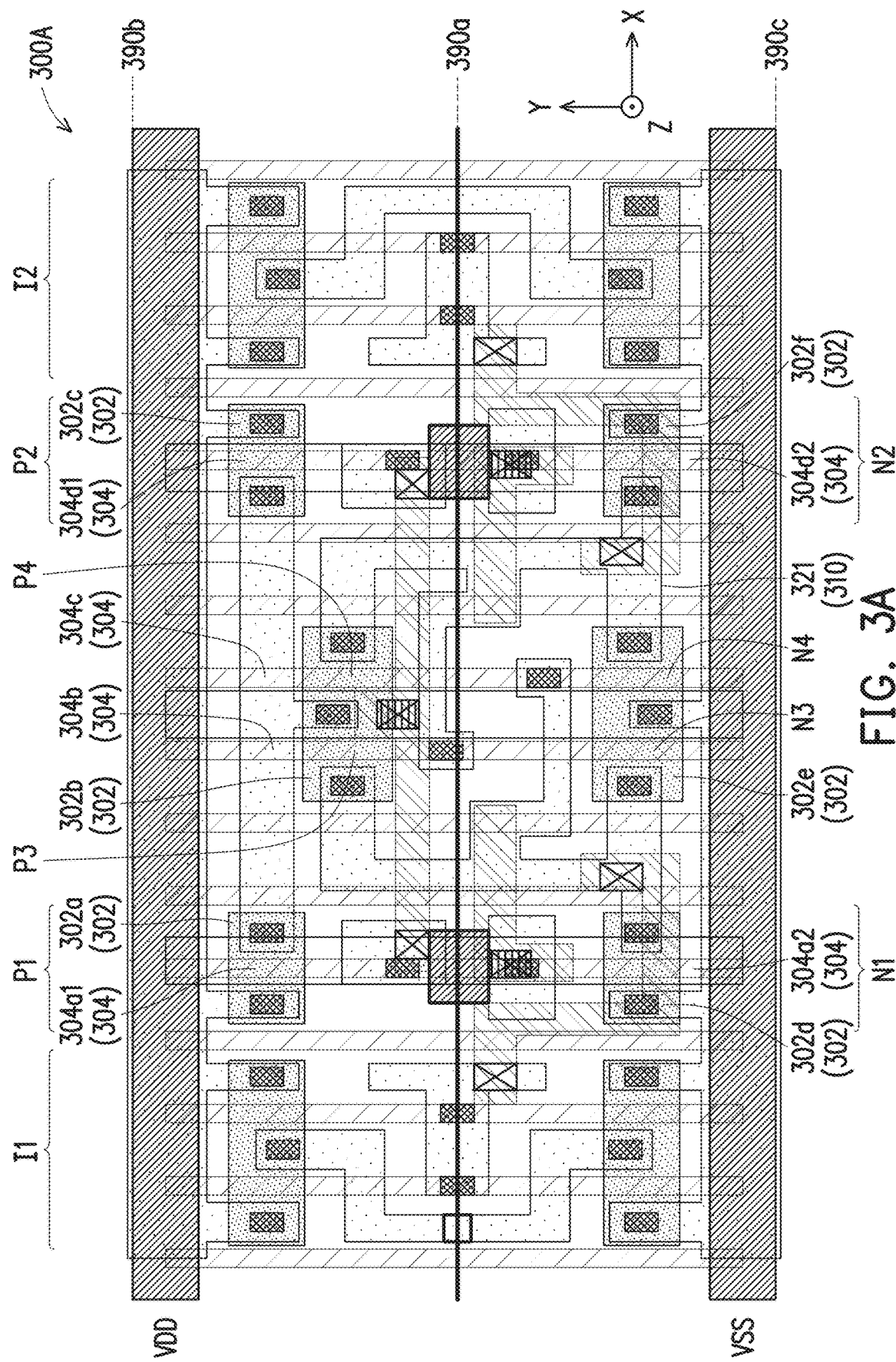
FIGS. 3A, 3B and 3C are diagrams of an integrated circuit, in accordance with some embodiments.
Figure 3B:
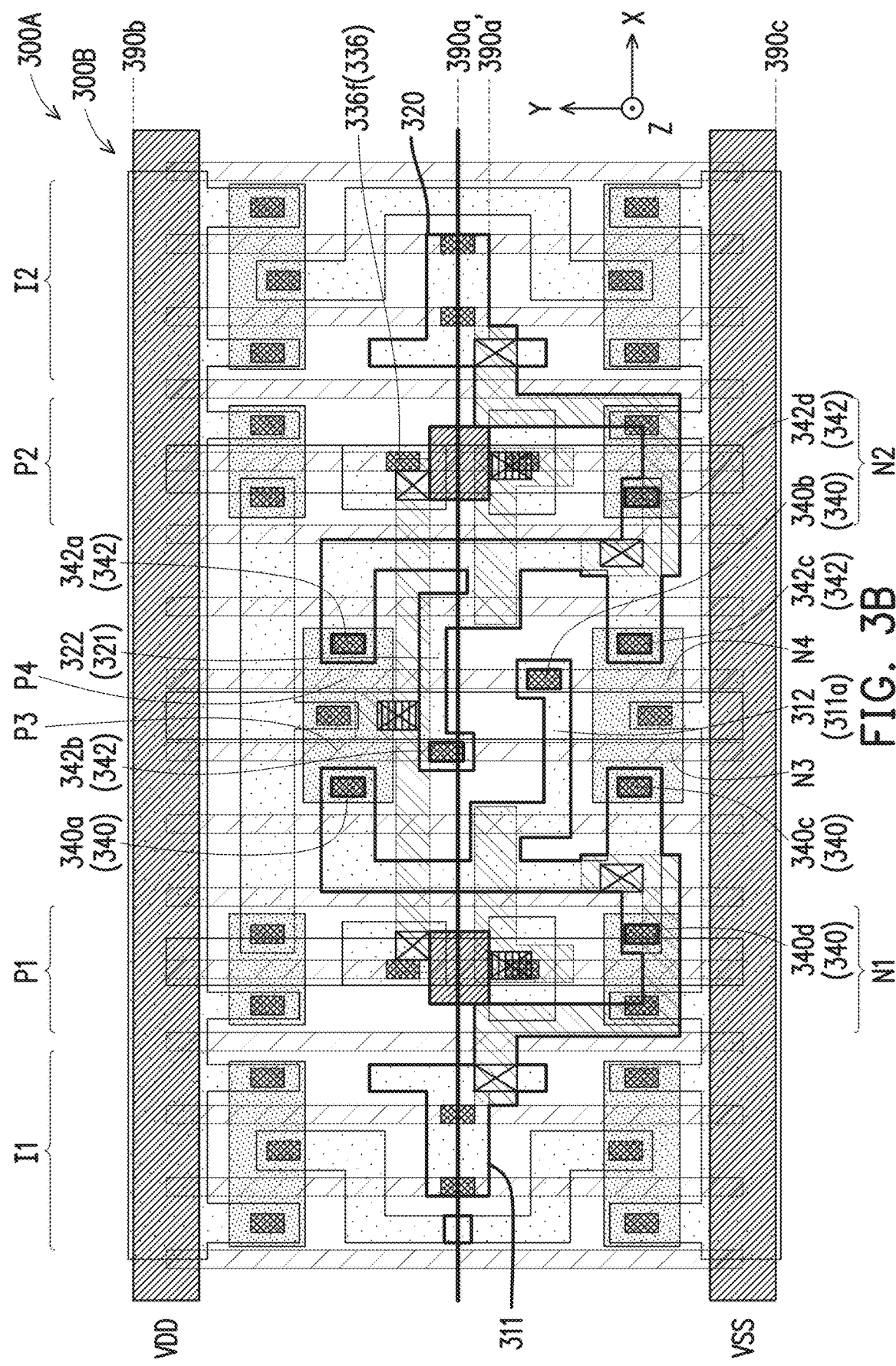
Figure 3C:
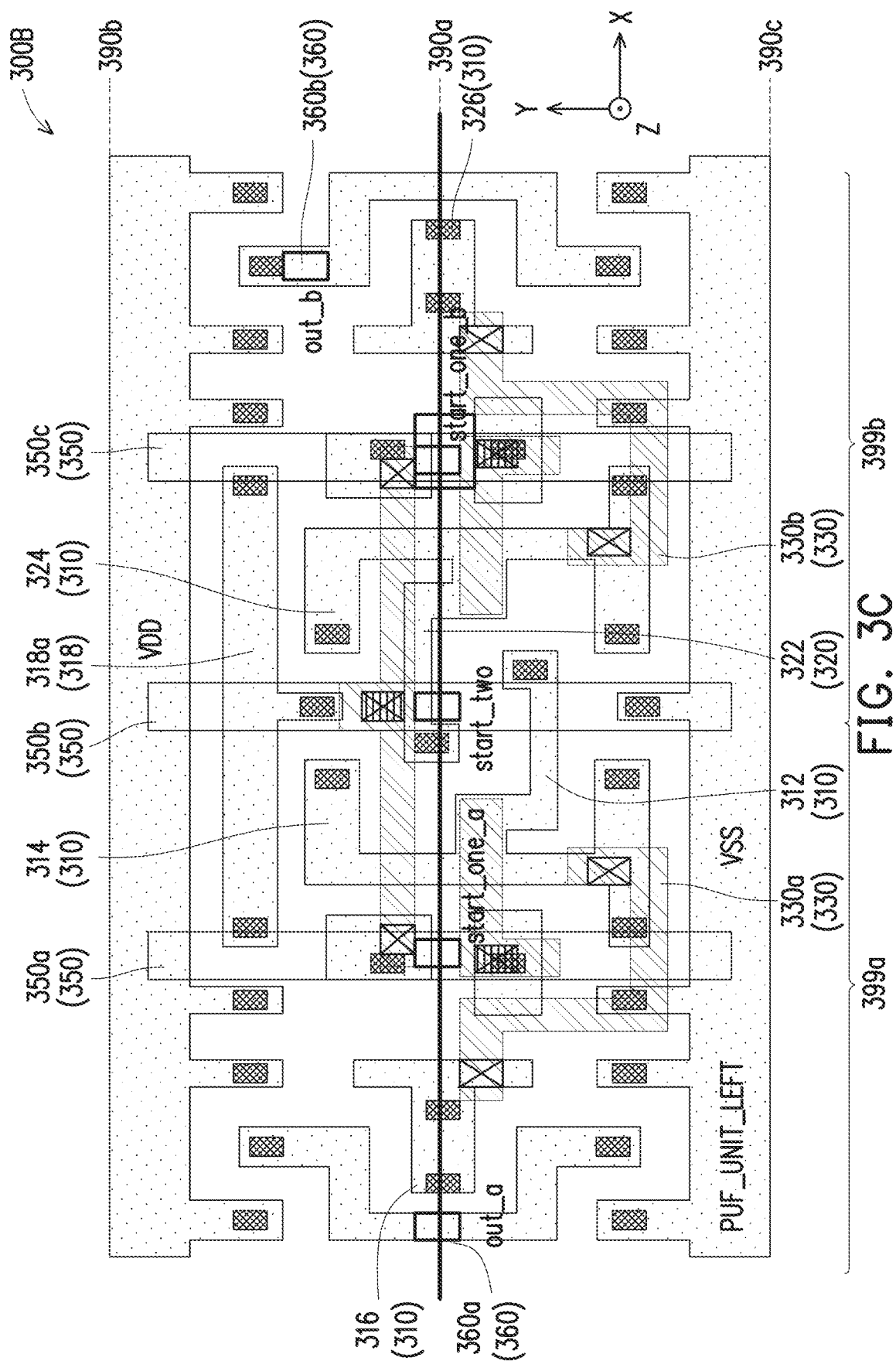

Layout design 200A further includes at least via layout pattern 236a, 236b, 236c, 236d, 236e, 236f, 236g or 236h (collectively referred to as a "set of via layout patterns 236"). The set of via layout patterns 236 is usable to manufacture a corresponding set of vias 336 (FIGS. 3A-3C).

In some embodiments, via layout patterns 236a, 236b, 236c, 236d, 236e, 236f, 236g, 236h of the set of via layout patterns 236 is usable to manufacture corresponding vias 336a, 336b, 336c, 336d, 336e, 336f, 336g, 336h (not labelled) of the set of vias 336 (FIGS. 3A-3C) of integrated circuit 300A or 600A (FIGS. 6A-6C).

In some embodiments, the set of via layout patterns 236 are between at least the set of conductive feature layout patterns 230 or the set of power rail layout patterns 228 and at least the set of conductive feature layout patterns 210.

Via layout patterns 236a and 236e are between conductive feature layout pattern 230e and corresponding conductive feature layout patterns 218d and 218e. Via layout patterns 236b and 236d are between conductive feature layout pattern 230a and corresponding conductive feature layout patterns 216 and 211a. Via layout patterns 236f and 236g are between conductive feature layout pattern 230b and corresponding conductive feature layout patterns 226 and 221. Via layout patterns 236c and 236h are between corresponding conductive feature layout pattern 230c and 230d and corresponding conductive feature layout patterns 218f and 218g.

Set of via layout patterns 236 are positioned at a via one (V1) level of one or more of layout designs 200A, 200L, 500A, 500L (FIGS. 5A-5L), integrated circuit 300A or 600A (FIG. 3A-3C or 6A-6C). Other levels are within the scope of the present disclosure.

In some embodiments, the V1 level is between the M1 level and the M2 level. In some embodiments, the V1 level is between the fifth level and the fourth level. Other levels are within the scope of the present disclosure.

Other configurations, arrangements on other levels or quantities of patterns in the set of via layout patterns 236 are within the scope of the present disclosure.

Layout design 200A further includes at least conductive feature layout pattern 250a, 250b or 250c (collectively referred to as a "set of conductive feature layout patterns 250") extending in the second direction Y. The set of conductive feature layout patterns 250 is usable to manufacture a corresponding set of conductive structures 350 (FIGS. 3A-3C) of integrated circuit 300A or 600A (FIGS.

6A-6C). In some embodiments, conductive feature layout patterns 250a, 250b, 250c of the set of conductive feature layout patterns 250 is usable to manufacture corresponding conductive structures 350a, 350b, 350c of the set of conductive structures 350 (FIGS. 3A-3C) of integrated circuit 300A or 600A (FIGS. 6A-6C).

The set of conductive feature layout patterns 250 overlap at least the set of conductive feature layout patterns 230, the set of power rail layout patterns 228, the set of contact layout patterns 208, 209, 210, 240 or 242, at least the set of gate layout patterns 204 or the set of conductive feature layout patterns 210 or at least the set of active region layout patterns 202.

Conductive feature layout pattern 250a overlaps at least conductive feature layout patterns 230a, 230c, 230e, 216, 218d, 218f and 211a, via layout patterns 236a, 236c and 252a (discussed below), gate layout pattern 204a, contact layout patterns 208l and 209l, and active regions 202a and 202d.

Conductive feature layout pattern 250b overlaps at least conductive feature layout patterns 230e, 218a, 211a and 221, via layout patterns 252b (discussed below), gate layout patterns 204b and 204c, contact layout patterns 240b and 242b, and active regions 202b and 202e.

Conductive feature layout pattern 250c overlaps at least conductive feature layout patterns 230b, 230d, 230e, 226, 218e, 218g and 221, via layout patterns 236e, 236h and 252c (discussed below), gate layout pattern 204d, contact layout patterns 208m and 209m, and active regions 202c and 202f.

The set of conductive feature layout patterns 250 is located on a sixth level. In some embodiments, the sixth level is different from at least the first level, the second level, the third level, the fourth level or the fifth level. In some embodiments, the sixth level corresponds to a metal three (M3) layer of one or more of layout designs 200A, 200L, 500A, 500L (FIGS. 5A-5L), integrated circuit 300A or 600A (FIG. 3A-3C or 6A-6C). Other levels are within the scope of the present disclosure.

Other configurations, arrangements on other levels or quantities of patterns in the set of conductive feature layout patterns 250 are within the scope of the present disclosure.

Layout design 200A further includes at least via layout pattern 252a, 252b or 252c (collectively referred to as a "set of via layout patterns 252"). The set of via layout patterns 252 is usable to manufacture a corresponding set of vias 352 (FIGS. 3A-3C). In some embodiments, via layout patterns 252a, 252b, 252c of the set of via layout patterns 252 is usable to manufacture corresponding vias 352a, 352b, 352c of the set of vias 352 (FIGS. 3A-3C) of integrated circuit 300A or 600A (FIGS. 6A-6C).

In some embodiments, the set of via layout patterns 252 are between at least the set of conductive feature layout patterns 230 and the set of conductive feature layout patterns 250.

Via layout patterns 252a, 252b and 252c are between corresponding conductive feature layout pattern 230c, 230d and 230e and corresponding conductive feature layout patterns 250a, 250b and 250c.

Set of via layout patterns 252 are positioned at a via two (V2) level of one or more of layout designs 200A, 200L, 500A, 500L (FIGS. 5A-5L), integrated circuit 300A or 600A (FIG. 3A-3C or 6A-6C). Other levels are within the scope of the present disclosure. In some embodiments, the V2 level is between the M2 level and the M3 level. In some embodiments, the V2 level is between the sixth level and the fifth level. Other levels are within the scope of the present disclosure.

Other configurations, arrangements on other levels or quantities of patterns in the set of via layout patterns 252 are within the scope of the present disclosure.

Layout design 200A further includes at least output pin layout pattern 260a or 260b (collectively referred to as a "set of output pin layout patterns 260"). The set of output pin layout patterns 260 is usable to manufacture a corresponding set of output pins 360 (FIGS. 3A-3C). In some embodiments, output pin layout patterns 260a or 260b of the set of output pin layout patterns 260 is usable to manufacture corresponding output pins 360a or 360b of the set of output pins 360 (FIGS. 3A-3C) of integrated circuit 300A or 600A (FIGS. 6A-6C).

Figure 2L:
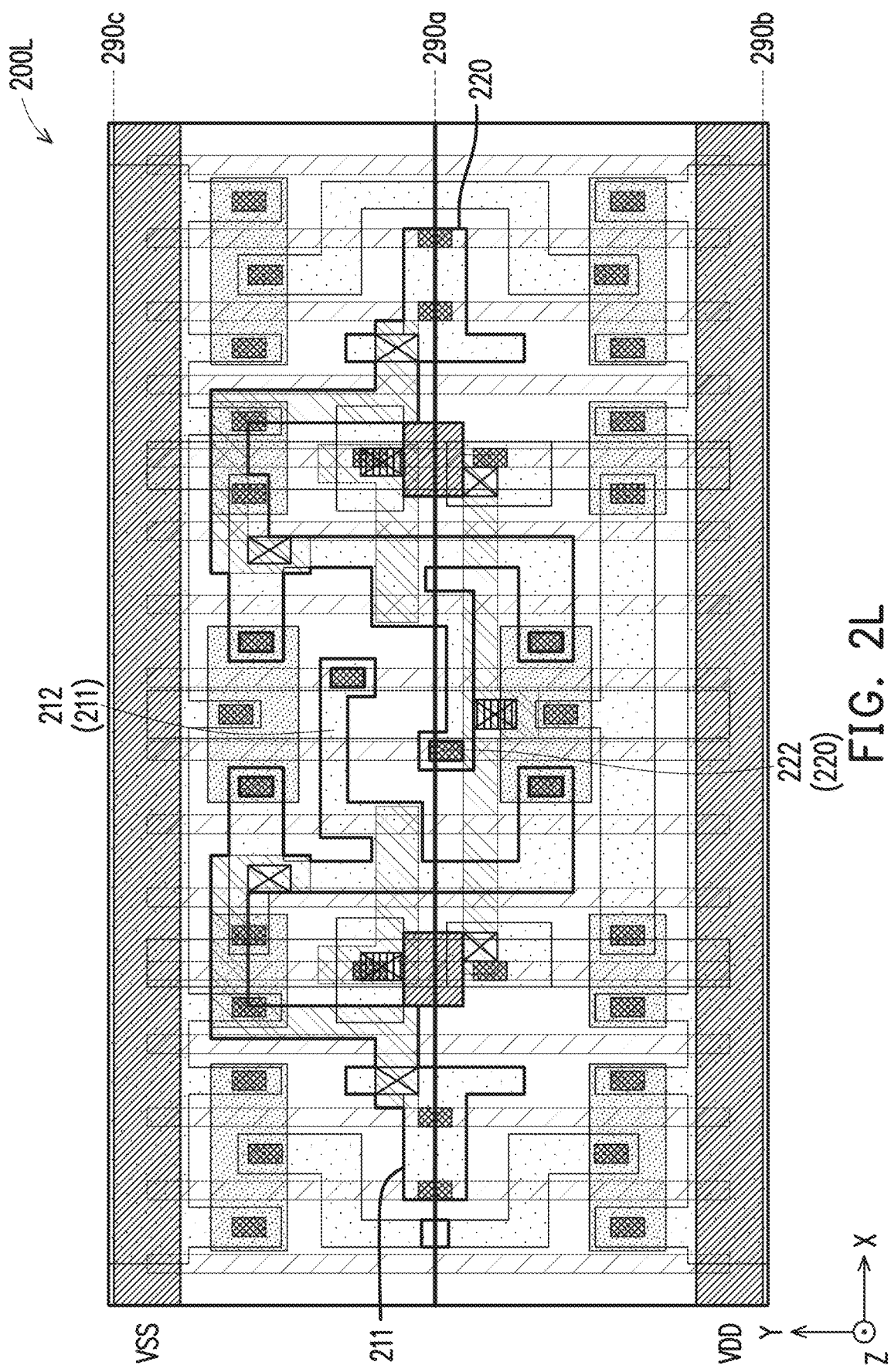
FIG. 2L is a diagram of a layout design, in accordance with some embodiments.

FIG. 2L is a diagram of a layout design 200L, in accordance with some embodiments.

Layout design 200L is a variation of layout design 200A. In comparison with layout design 200A of FIGS. 2A-2K, layout design 200L is symmetric to layout design 200A with respect to the edge 290c in the first direction X. Layout design 200L is usable to manufacture PUF cell 100A (FIG. 1A).

In some embodiments, layout design 200L is usable to manufacture an integrated circuit (not shown for brevity) symmetric to integrated circuit 300A with respect to the edge 390c of integrated circuit 300A in the first direction X (e.g., x-axis). In some embodiments, the integrated circuit (not shown for brevity) symmetric to integrated circuit 300A is similar to layout design 200L, but is not shown for brevity.

FIGS. 3A, 3B and 3C are diagrams of an integrated circuit 300A, in accordance with some embodiments.

FIG. 3A is a top view of an integrated circuit 300A corresponding to layout design 200A, in accordance with some embodiments. FIG. 3B is a top view of a portion 300B of integrated circuit 300A corresponding to portion 200B of layout design 200A, in accordance with some embodiments. FIG. 3C is a top view of a portion 300C of an integrated circuit 300A corresponding to a portion 200C of layout design 200A, in accordance with some embodiments.

FIGS. 3B-3C are diagrams of a corresponding portion 300B-300C of integrated circuit 300A of FIG. 3A, simplified for ease of illustration.

Portion 300B is integrated circuit 300A of FIG. 3A, but further highlights the set of conductive structures 311 and 320 for ease of illustration.

Portion 300C includes one or more features of integrated circuit 300A of FIG. 3A from the VD level, the VG level, the V1 level, the V2 level, the M1 level, the M2 level and the M3 level of integrated circuit 300A.

Integrated circuit 300A is manufactured by layout design 200A or 200L. Integrated circuit 300A is an embodiment of PUF cell 100A of FIG. 1A. In some embodiments, integrated circuit 300A is modified to form an integrated circuit (not shown for brevity) symmetric to integrated circuit 300A with respect to the edge 390c of integrated circuit 300A in the first direction X (e.g., x-axis). In some embodiments, the integrated circuit (not shown for brevity) symmetric to integrated circuit 300A is similar to layout design 200L, but is not shown for brevity.

Structural relationships including alignment, lengths and widths, as well as configurations of integrated circuit 300A are similar to the structural relationships and configurations of layout design 200A or 200L of FIGS. 2A-2L, and similar detailed description will not be described in FIGS. 3A-3C for brevity.

For ease of illustration, some of the elements of integrated circuit 300A or 600A are not labelled in FIG. 3A-3C or 6A-6C. In some embodiments, integrated circuit 300A or 600A includes additional elements not shown in FIG. 3A-3C or 6A-6C.

Integrated circuit 300A includes one or more of active regions 302a, 302b, 302c, 302d, 302e, 302f, 302g, 302h, 302i or 302j (collectively referred to as a "set of active regions 302") extending in a first direction X.

In some embodiments, active region 302a is the source and drain regions of PMOS transistor P1, active region 302b is the source and drain regions of PMOS transistors P3 and P4, active region 302c is the source and drain regions of PMOS transistor P2, active region 302d is the source and drain regions of NMOS transistor N1, active region 302e is the source and drain regions of NMOS transistors N3 and N4, active region 302f is the source and drain regions of NMOS transistor N2, active region 302g is the source and drain regions of PMOS transistors of inverter I1, active region 302h is the source and drain regions of PMOS transistors of inverter I2, active region 302i is the source and drain regions of NMOS transistors of inverter I1, active region 302j is the source and drain regions of NMOS transistors of inverter I2, of PUF cell 100A (FIG. 1A).

In some embodiments, the set of active regions 302 is located on the first level. Other configurations or quantities of patterns in the set of active regions 302 are within the scope of the present disclosure.

Integrated circuit 300A further includes at least gate 304a, 304b, 304c, 304d, 304e, 304f, 304g, 304h, . . . , 304o or 304p (collectively referred to as a "set of gates 304") extending in the second direction Y, and are positioned on the second level.

In some embodiments, gate 304a includes at least gate 304a1 or gate 304a2. In some embodiments, gate 304d includes at least gate 304d1 or gate 304d2.

In some embodiments, at least gates 304i, 304j, . . . or 304p is a dummy gate and are not labelled for ease of illustration. In some embodiments, a dummy gate is a gate structure of a non-functional transistor device.

In some embodiments, gate 304a1 is the gate terminal of PMOS transistor P1, gate 304a2 is the gate terminal of NMOS transistor N1, gate 304b is the gate terminal of PMOS transistor P3 and the gate terminal of NMOS transistor N3, gate 304c is the gate terminal of PMOS transistor P4 and the gate terminal of NMOS transistor N4, gate 304d1 is the gate terminal of PMOS transistor P2 and gate 304d2 is the gate terminal of NMOS transistor N2 of FIG. 1A.

In some embodiments, gate 304e and 304f are the gate terminals of the PMOS transistors and the gate terminals of the NMOS transistors of inverter I1 of FIG. 1A. In some embodiments, gate 304g and 304h are the gate terminals of the PMOS transistors and the gate terminals of the NMOS transistors of inverter I2 of FIG. 1A.

Other configurations, arrangements on other levels or quantities of patterns in the set of gates 304 are within the scope of the present disclosure.

Integrated circuit 300A further includes at least contact 308a, 308b, . . . , 308m or 308n (collectively referred to as a "set of contacts 308"), contact 309a, 309b, . . . , 309m or 309n (collectively referred to as a "set of contacts 309"), contact 340a, 340b, 340c or 340d (collectively referred to as a "set of contacts 340") or contact 342a, 342b, 342c or 342d (collectively referred to as a "set of contacts 342").

At least contact 308a, . . . , 308j of the set of contacts 308 or at least contact 309a, . . . , 309j of the set of contacts 309 is coupled to at least the set of active region 302.

At least contact 308k, 308n is electrically coupled to corresponding gate 304e, 308h. At least contact 309k, 309n is electrically coupled to corresponding gate 304f, 308g. At least contact 308l and contact 309l are electrically coupled to corresponding gates 304a1 and 304a2. At least contact 308m and contact 309m are electrically coupled to corresponding gates 304d1 and 304d2. At least contact 340b is electrically coupled to gate 304c. At least contact 342b is electrically coupled to gate 304b.

At least contact 309e, contact 340a or contact 342a is electrically coupled to active region 302b. At least contact 309f, contact 340c or contact 342c is electrically coupled to active region 302e. At least contact 340d or contact 342d is electrically coupled to corresponding active region 302d or 302f.

At least contact 308a, 308b or 308c is electrically coupled to active region 302g. At least contact 309a, 309b or 309c is electrically coupled to active region 302i. At least contact 308h, 308i or 308j is electrically coupled to active region 302h. At least contact 309h, 309i or 309j is electrically coupled to active region 302j.

In some embodiments, contact 309e or 340a is electrically coupled to the corresponding drain or source regions of PMOS transistor P3. In some embodiments, contact 309e or 342a is electrically coupled to the corresponding drain or source regions of PMOS transistor P4. In some embodiments, contact 308e or 308d is electrically coupled to the corresponding drain or source regions of PMOS transistor P1. In some embodiments, contact 308f or 308g is electrically coupled to the corresponding drain or source regions of PMOS transistor P2.

In some embodiments, contact 309f or 340c is electrically coupled to the corresponding source or drain regions of NMOS transistor N3. In some embodiments, contact 309f or 342c is electrically coupled to the corresponding or source or drain regions of NMOS transistor N4. In some embodiments, contact 340d or 309d is electrically coupled to the corresponding drain or source regions of NMOS transistor N1. In some embodiments, contact 342d or 309g is electrically coupled to the corresponding drain or source regions of NMOS transistor N2.

At least the set of contacts 308, 309, 340 or 342 is located on the third level. Other configurations, arrangements on other levels, shapes or quantities of patterns in the set of contacts 308, 309, 340 or 342 are within the scope of the present disclosure.

Integrated circuit 300A further includes a set of conductive structures 310 extending in at least the first direction X or the second direction Y.

In some embodiments, the set of conductive structures 310 includes at least a conductive structure 311a, a conductive structure 316, a set of conductive structures 318, a conductive structure 321 or a conductive structure 326.

In some embodiments, at least conductive structure 311a, conductive structure 316 or conductive structure 330a (discussed below) are part of a set of conductive structures 311. In some embodiments, at least conductive structure 321, conductive structure 326 or conductive structure 230b (discussed below) are part of a set of conductive structures 320. In some embodiments, a portion (e.g., conductive structures 314, 315, 316 and 330a) of the set of conductive structures 311 in region 399a and a corresponding portion (e.g., corresponding conductive structures 324, 325, 326 and 330b) of the set of conductive structures 321 in region 399b are symmetric to each other with respect to a central line extending in the second direction Y of integrated circuit 300.

Conductive structure 311a is electrically coupled to active region 302b by contact 340a, to gate 304c by contact 340b, to active region 302e by contact 340c and to active region 302d by contact 340d. In some embodiments, conductive structure 311a is configured to provide an electrical connection between a drain of PMOS transistor P3, a gate of PMOS transistor P4 and NMOS transistor N4, a drain of NMOS transistor N3 and a drain of transistor N1.

Conductive structure 311a includes at least a set of conductive structures 312, a conductive structure 314 or a conductive structure 315. In some embodiments, set of conductive structures 312 and conductive structures 314 and 315 are portions of a same continuous structure (e.g., conductive structure 311a).

The set of conductive structures 312 includes at least a conductive structure 312a, a conductive structure 312b, or a conductive structure 312c. In some embodiments, conductive structures 312a, 212b and 212c are portions of a same continuous structure (e.g., set of conductive structures). In some embodiments, the set of conductive structures 312 has a C-shape. In some embodiments, other shapes or configurations of the set of conductive structures 312 are within the scope of the present disclosure.

Conductive structure 314 includes at least a conductive structure 314a, a conductive structure 314b, or a conductive structure 314c. In some embodiments, conductive structures 314a, 314b and 314c are portions of a same continuous structure (e.g., conductive structure 314). In some embodiments, conductive structure 314 has a F-shape. In some embodiments, other shapes or configurations of conductive structure 314 are within the scope of the present disclosure.

Conductive structure 315 includes at least a conductive structure 315a or a conductive structure 315b. In some embodiments, conductive structures 315a and 315b are portions of a same continuous structure (e.g., conductive structure 315). In some embodiments, conductive structure 315 has a staircase shape. In some embodiments, other shapes or configurations of conductive structure 315 are within the scope of the present disclosure.

Conductive structure 316 is electrically coupled to gates 304e and 304f by corresponding contacts 308k and 309k. In some embodiments, conductive structure 316 has a T-shape. In some embodiments, other shapes or configurations of conductive structure 316 are within the scope of the present disclosure.

The set of conductive structures 318 includes at least a conductive structure 318a, 318b, 318c, 318d, 318e, 318f or 318g.

The set of conductive structures 318 overlap at least one contact of the set of contacts 308, 309, 340 or 342, at least one region of the set of active regions 302, or at least one gate of the set of gates 304.

Conductive structure 318a is electrically coupled to active region 302b by contact 309e. In some embodiments, conductive structure 318a is electrically coupled to the drain region of active region 302b or PMOS transistor P4 by contact 309e. In some embodiments, conductive structure 318a is configured to provide an electrical connection between the drain region of PMOS transistor P4 by contact 309e, the drain region of PMOS transistor P1 by contact 308e, and the drain region of PMOS transistor P2 by contact 308f. In some embodiments, conductive structure 318a has a T-shape. In some embodiments, other shapes or configurations of conductive structure 318a are within the scope of the present disclosure.

Conductive structure 318b is electrically coupled to contacts 308b and 309b. Conductive structure 318a is configured to electrically couple active regions 302g and 302i by corresponding contacts 308b and 309b.

Conductive structure 318c is electrically coupled to contacts 308i and 309i. Conductive structure 318a is configured to electrically couple active regions 302h and 302j by corresponding contacts 308i and 309i.

Conductive structure 318d is electrically coupled to contact 308l. Conductive structure 318d is configured to electrically couple gate 304a by contact 308l. Conductive structure 318e is electrically coupled to contact 308m. Conductive structure 318e is configured to electrically couple gate 304d by contact 308m. Conductive structure 318f is electrically coupled to contact 309l. Conductive structure 318f is configured to electrically couple gate 304a by contact 309l. Conductive structure 318g is electrically coupled to contact 309m. Conductive structure 318g is configured to electrically couple gate 304d by contact 309m.

Conductive structure 321 includes at least a set of conductive structures 322, a conductive structure 324 or a conductive structure 325. In some embodiments, set of conductive structures 322 and conductive structures 324 and 325 are portions of a same continuous structure (e.g., conductive structure 321).

Conductive structure 321 is electrically coupled to active region 302b by contact 342a, to gate 304b by contact 342b, to active region 302e by contact 342c and to active region 302f by contact 342d. In some embodiments, conductive structure 321 is configured to provide an electrical connection between a drain of PMOS transistor P4, a gate of PMOS transistor P3 and NMOS transistor N3, a drain of NMOS transistor N4 and a drain of transistor N2.

The set of conductive structures 322 includes at least a conductive structure 322a, a conductive structure 322b, or a conductive structure 322c. In some embodiments, conductive structures 322a, 322b and 322c are portions of a same continuous structure (e.g., the set of conductive structures 322). In some embodiments, the set of conductive structures 322 has a C-shape. In some embodiments, other shapes or configurations of the set of conductive structures 322 are within the scope of the present disclosure.

In some embodiments, the set of conductive structures 322 and the set of conductive structures 312 are symmetric to each other with respect to at least line 390a or 390a' of integrated circuit 300A extending in the first direction X. In some embodiments, at least conductive structure 322a, conductive structure 322b or conductive structure 322c is symmetric to at least corresponding conductive structure 312a, conductive structure 312b, or conductive structure 312c with respect to at least line 390a or 390a' of integrated circuit 300A extending in the first direction X.

In some embodiments, conductive structure 314a and conductive structure 324a are separated from each other in the first direction X. In some embodiments, conductive structure 312a is separated from at least conductive structure 314a or 324a in the second direction by the distance D1. In some embodiments, conductive structure 322a is separated from at least conductive structure 314a or 324a in the second direction by the distance D2. In some embodiments, the distance D2 is different from the distance D1.

In some embodiments, distance D1 extends from where conductive structure 314 overlaps contact 340a or active region 302a and where conductive structure 312 overlaps contact 340b or gate 304c. In some embodiments, distance D2 extends from where conductive structure 324 overlaps contact 342a or active region 302a and where conductive structure 322 overlaps contact 342b or gate 304b.

Conductive structure 324 includes at least a conductive structure 324a, a conductive structure 324b, or a conductive structure 324c. In some embodiments, conductive structures 324*a*, 324*b* and 324*c* are portions of a same structure (e.g., conductive structure 324). In some embodiments, conductive structure 324 has a F-shape. In some embodiments, other shapes or configurations of conductive structure 324 are within the scope of the present disclosure.

Conductive structure 325 includes at least a conductive structure 325*a* or a conductive structure 325*b*. In some embodiments, conductive structures 325*a* and 325*b* are portions of a same continuous structure (e.g., conductive structure 325). In some embodiments, conductive structure 325 has a staircase shape. In some embodiments, other shapes or configurations of conductive structure 324 are within the scope of the present disclosure.

Conductive structure 326 is electrically coupled to gates 304*g* and 304*h* by corresponding contacts 309*n* and 308*n*. In some embodiments, conductive structure 326 has a T-shape. In some embodiments, other shapes or configurations of conductive structure 326 are within the scope of the present disclosure.

The set of conductive structures 310 is located on the fourth level. Other configurations, arrangements on other levels or quantities of patterns in the set of conductive structures 310 are within the scope of the present disclosure.

Integrated circuit 300A further includes one or more power rails 328*a* or 328*b* (collectively referred to as a "set of power rails 328") extending in the first direction X, and being located on the fourth level. In some embodiments, power rail 328*a* is configured to provide the first supply voltage of a voltage supply VDD to integrated circuit 300A or 600A, and power rail 328*b* is configured to provide the second supply voltage of the reference voltage supply VSS to integrated circuit 300A or 600A. In some embodiments, power rail 328*b* is configured to provide the first supply voltage of the voltage supply VDD to integrated circuit 300A or 600A, and power rail 328*a* is configured to provide the second supply voltage of the reference voltage supply VSS to integrated circuit 300A or 600A.

In some embodiments, each power rail 328*a*, 328*b* of the set of power rails 328 is located along a corresponding edge 390*b*, 390*c* of a cell of integrated circuit 300A or 600A.

Other configurations, arrangements on other levels or quantities of patterns in the set of power rails 328 are within the scope of the present disclosure.

Integrated circuit 300A further includes at least conductive structure 330*a*, 330*b*, 330*c*, 330*d* or 330*e* (collectively referred to as a "set of conductive structures 330") extending in at least the first direction X or the second direction Y.

In some embodiments, conductive structure 330*a* is configured to provide an electrical coupling between at least conductive structure 316 and conductive structure 311*a*. Conductive structure 330*a* is electrically coupled to conductive structure 316 by via 336*b*. Conductive structure 330*a* is electrically coupled to conductive structure 311*a* by via 336*d*.

In some embodiments, conductive structure 330*b* is configured to provide an electrical coupling between at least conductive structure 326 and conductive structure 321. Conductive structure 330*b* is electrically coupled to conductive structure 326 by via 336*f*. Conductive structure 330*b* is electrically coupled to conductive structure 321 by via 336*g*.

In some embodiments, conductive structure 330*c* is configured to provide an electrical coupling between at least conductive structure 350*a* and conductive structure 318*f*. Conductive structure 330*c* is electrically coupled to conductive structure 350*a* by via 352*a*. Conductive structure 330*c* is electrically coupled to conductive structures 318*f* by via 336*c*.

In some embodiments, conductive structure 330*d* is configured to provide an electrical coupling between at least conductive structure 350*c* and conductive structure 318*g*. Conductive structure 330*d* is electrically coupled to conductive structure 350*c* by via 352*c*. Conductive structure 330*d* is electrically coupled to conductive structure 318*g* by via 336*h*.

In some embodiments, conductive structure 330*e* is configured to provide an electrical coupling between at least conductive structure 350*b* and conductive structures 318*d* and 318*e*. Conductive structure 330*e* is electrically coupled to conductive structure 350*b* by via 352*b*. Conductive structure 330*e* is electrically coupled to conductive structures 318*d* and 318*e* by corresponding vias 336*a* and 336*e*.

In some embodiments, a portion of the set of conductive structures 330 in region 399*a* and a portion of the set of conductive structures 330 in region 399*b* are symmetric to each other with respect to a central line extending in the second direction Y of integrated circuit 300.

The set of conductive structures 330 is located on the fifth level. Other configurations, arrangements on other levels or quantities of patterns in the set of conductive structures 330 are within the scope of the present disclosure.

Integrated circuit 300A further includes at least via 336*a*, 336*b*, 336*c*, 336*d*, 336*e*, 336*f*, 336*g*, 336*h* (collectively referred to as a "set of vias 336").

Vias 336*a* and 336*e* are configured to provide an electrical connection between conductive structure 330*e* and corresponding conductive structures 318*d* and 318*e*. Vias 336*b* and 336*d* are configured to provide an electrical connection between conductive structure 330*a* and corresponding conductive structures 316 and 311*a*. Vias 336*f* and 336*g* are configured to provide an electrical connection between conductive structure 330*b* and corresponding conductive structures 326 and 321. Vias 336*c* and 336*h* are configured to provide an electrical connection between corresponding conductive structure 330*c* and 330*d* and corresponding conductive structures 318*f* and 318*g*.

Set of vias 336 are positioned at the V1 level of one or more integrated circuit 300A or 600A (FIG. 3A-3C or 6A-6C). Other levels are within the scope of the present disclosure.

Other configurations, arrangements on other levels or quantities of patterns in the set of vias 336 are within the scope of the present disclosure.

Integrated circuit 300A further includes at least conductive structure 350*a*, 350*b* or 350*c* (collectively referred to as a "set of conductive structures 350") extending in the second direction Y.

In some embodiments, conductive structures 350*a* and 350*c* are configured to receive corresponding signals start_1*a* and start1_*b* from edge 390*c* in the second direction Y. In some embodiments, conductive structures 350*a* and 350*c* are configured to receive corresponding signals start_1*a* and start1_*b* from edge 390*a* in a negative second direction (e.g., −Y).

In some embodiments, conductive structure 350*b* is configured to receive signal start_2 from edge 390*c* in the second direction Y. In some embodiments, conductive structure 350*b* is configured to receive corresponding signal start_2 from edge 390*a* in a negative second direction (e.g., −Y).

The set of conductive structures 350 is located on the sixth level. Other configurations, arrangements on other levels or quantities of patterns in the set of conductive structures 350 are within the scope of the present disclosure.

Integrated circuit 300A further includes at least via 352*a*, 352*b* or 352*c* (collectively referred to as a "set of vias 352"). Set of vias 352 are positioned at the V2 level of one or more of integrated circuit 300A or 600A (FIG. 3A-3C or 6A-6C). Other configurations, arrangements on other levels or quantities of patterns in the set of vias 352 are within the scope of the present disclosure.

Integrated circuit 300A further includes at least output pin 360*a* or 360*b* (collectively referred to as a "set of output pins 360"). The set of output pins 360 are configured to output at least output signal out_a or out_b. In some embodiments, output pin 360*a* is configured to output the output signal out_a. In some embodiments, output pin 360*b* is configured to output the output signal out_b.

Figure 4A:
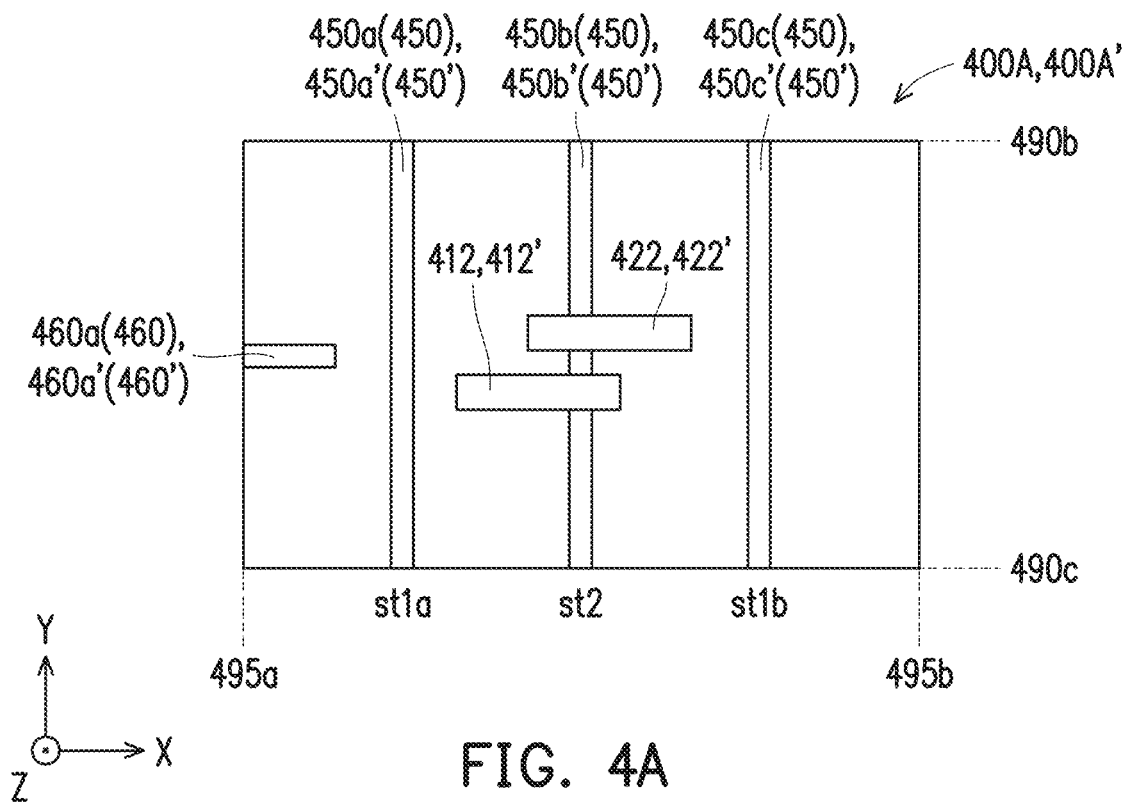
FIG. 4A is a schematic diagram of an abstract view of a PUF cell, in accordance with some embodiments.

FIG. 4A is a schematic diagram of an abstract view of a PUF cell 400A or 400A', in accordance with some embodiments.

Figure 8A:
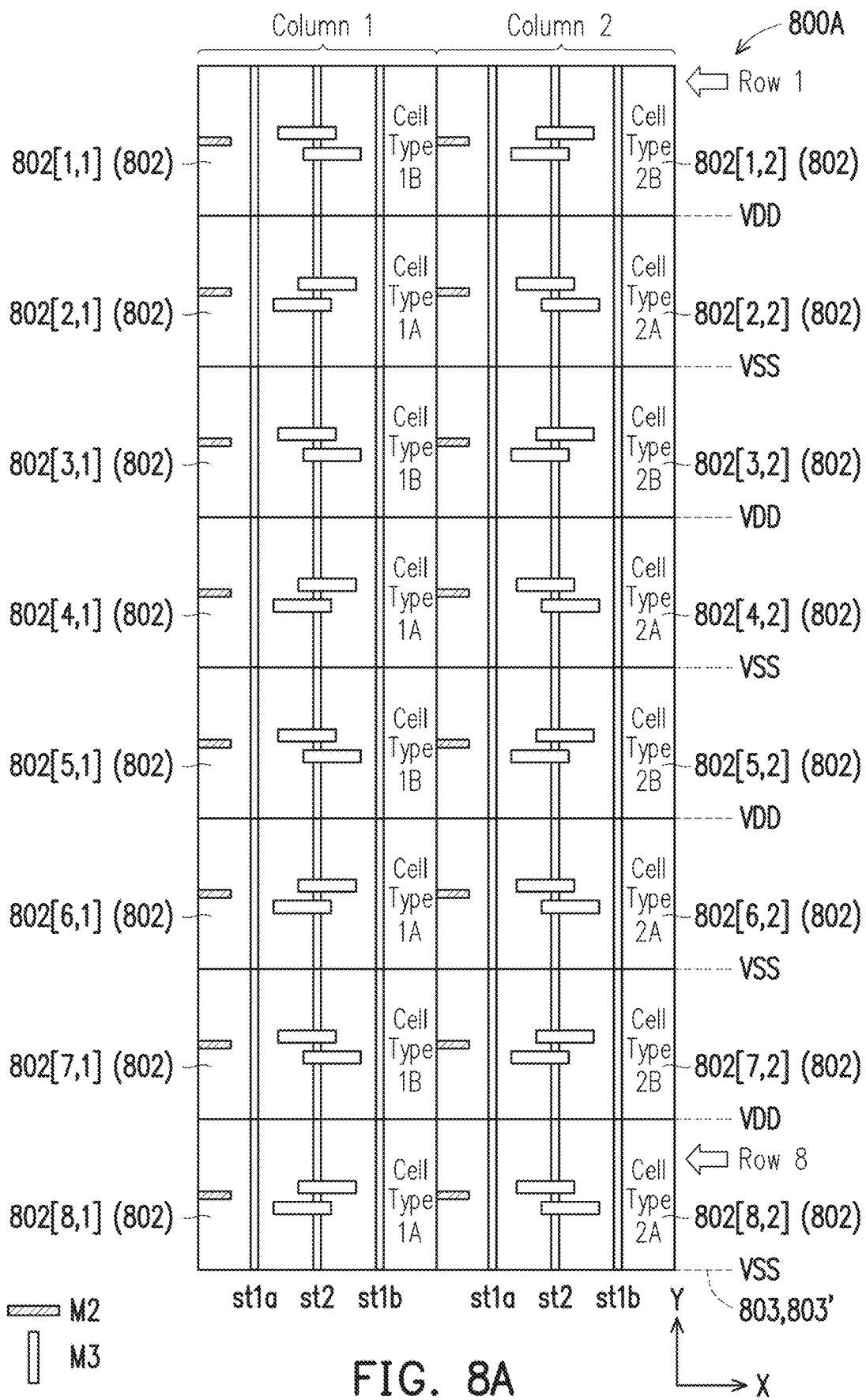
FIG. 8A is a schematic diagram of a PUF cell array, in accordance with some embodiments.
Figure 8B:
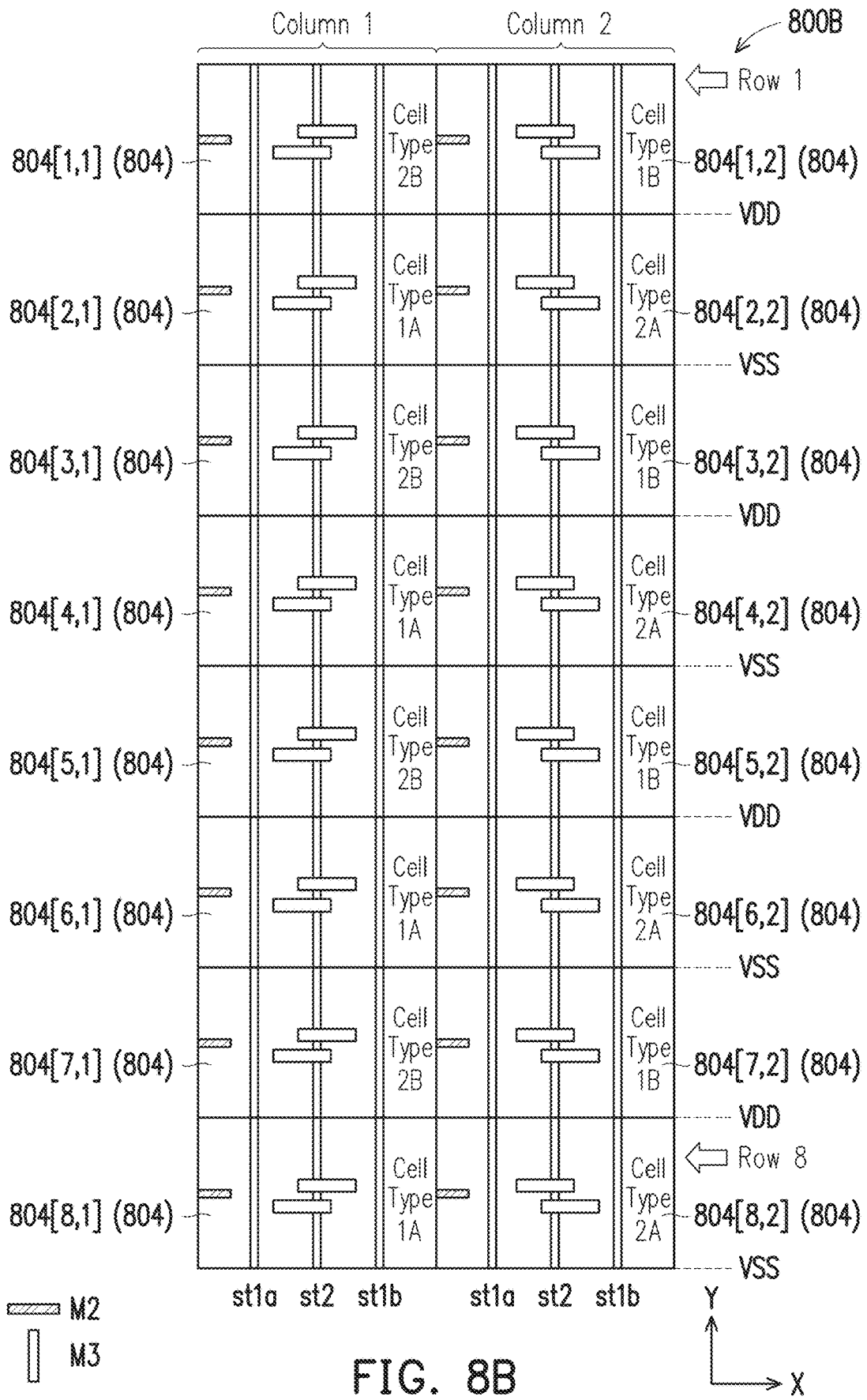
FIG. 8B is a schematic diagram of a PUF cell array, in accordance with some embodiments.

PUF cell 400A corresponds to an abstract view of layout design 200A of FIGS. 2A-2K. In some embodiments, PUF cell 400A is referred to as a "Cell Type 1" PUF cell (FIGS. 9A-9D) or a "Cell Type 1A" PUF cell (FIG. 8A-8B). PUF cell 400A includes at least a set of conductive feature layout patterns 422, a set of conductive feature layout patterns 412, a conductive feature layout pattern 450*a*, 450*b* or 450*c* (collectively referred to as a set of conductive feature layout patterns 450) or an output pin layout pattern 460*a*.

In some embodiments, set of conductive feature layout patterns 422, set of conductive feature layout patterns 412, conductive feature layout pattern 450*a*, 450*b* or 450*c* of the set of conductive feature layout patterns 450 or output pin layout pattern 460*a* are corresponding set of conductive feature layout patterns 222, set of conductive feature layout patterns 212, conductive feature layout pattern 250*a*, 250*b* or 250*c* of the set of conductive feature layout patterns 250 or output pin layout pattern 260*a* of corresponding layout design 200A (FIGS. 2A-2K), and similar detailed description is therefore omitted.

PUF cell 400A' corresponds to an abstract view of integrated circuit 300A of FIGS. 3A-3C. In some embodiments, PUF cell 400A' is referred to as a "Cell Type 1" PUF cell (FIGS. 9A-9D) or a "Cell Type 1A" PUF cell (FIG. 8A-8B). PUF cell 400A' includes at least a set of conductive structures 422', a set of conductive structures 412', a conductive structure 450*a*', 450*b*' or 450*c*' (collectively referred to as a set of conductive structures 450') or an output pin 460*a*'.

In some embodiments, set of conductive structures 422', set of conductive structures 412', conductive structure 450*a*', 450*b*', 450*c*' of the set of conductive structures 450' and output pin 460*a*' are corresponding set of conductive structures 322, corresponding set of conductive structures 312, corresponding conductive structure 350*a*, 350*b*, 350*c* of the corresponding set of conductive structures 350 and corresponding output pin 360*a* of integrated circuit 300A (FIGS. 3A-3C), and similar detailed description is therefore omitted.

Figure 4B:
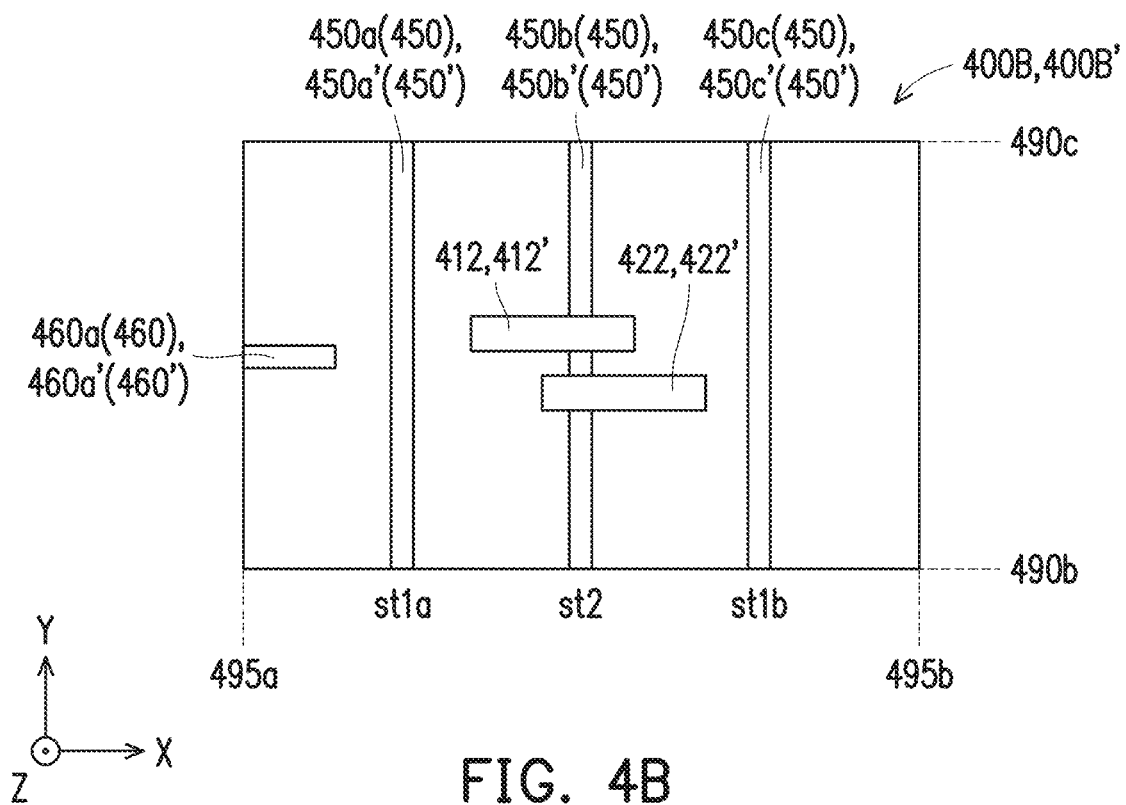
FIG. 4B is a schematic diagram of an abstract view of a PUF cell, in accordance with some embodiments.

FIG. 4B is a schematic diagram of an abstract view of a PUF cell 400B or 400B', in accordance with some embodiments.

PUF cell 400B corresponds to an abstract view of layout design 200L of FIG. 2L. In some embodiments, PUF cell 400B is referred to as a "Cell Type 1" PUF cell (FIGS. 9A-9D) or a "Cell Type 1B" PUF cell (FIG. 8A-8B). PUF cell 400B includes at least set of conductive feature layout patterns 422, set of conductive feature layout patterns 412, conductive feature layout pattern 450*a*, 450*b* or 450*c* or output pin layout pattern 460*a*.

PUF cell 400B is a variation of PUF cell 400A. In comparison with PUF cell 400A, PUF cell 400B is symmetric to PUF cell 400A with respect to edge 490*b* or 490*c* (e.g., the x-axis) in the first direction X.

PUF cell 400B' corresponds to an abstract view of an integrated circuit (not shown for brevity) symmetric to integrated circuit 300A of FIGS. 3A-3C. In some embodiments, PUF cell 400B' is referred to as a "Cell Type 1" PUF cell (FIGS. 9A-9D) or a "Cell Type 1B" PUF cell (FIG. 8A-8B). PUF cell 400B' includes at least set of conductive structures 422', set of conductive structures 412', conductive structure 450*a*', 450*b*' or 450*c*' or output pin 460*a*'.

PUF cell 400B' is a variation of PUF cell 400A'. In comparison with PUF cell 400A', PUF cell 400B' is symmetric to PUF cell 400A' with respect to edge 490*b* or 490*c* (e.g., the x-axis) in the first direction X.

Figure 5A:
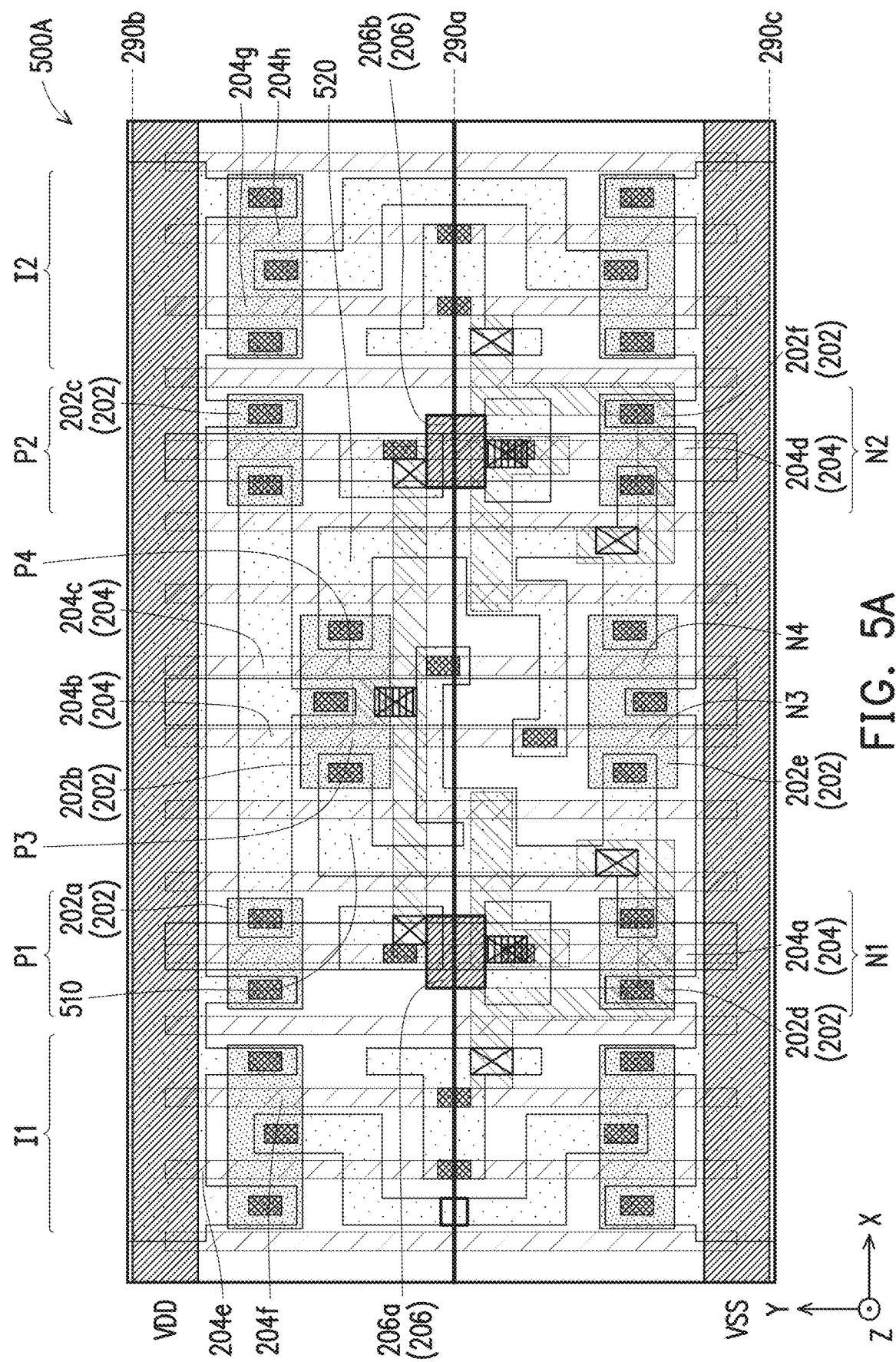
Figure 5B:
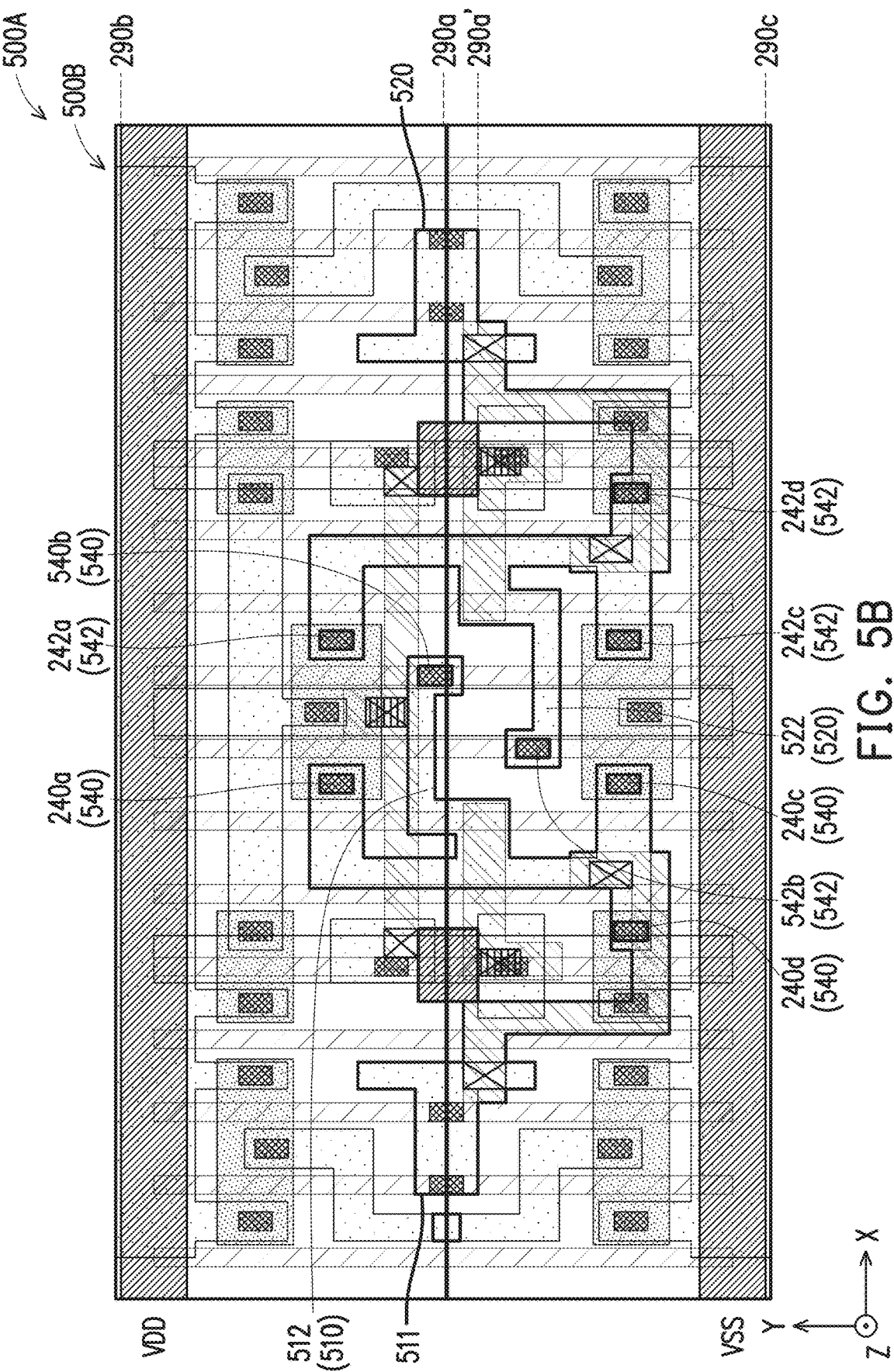
Figure 5C:
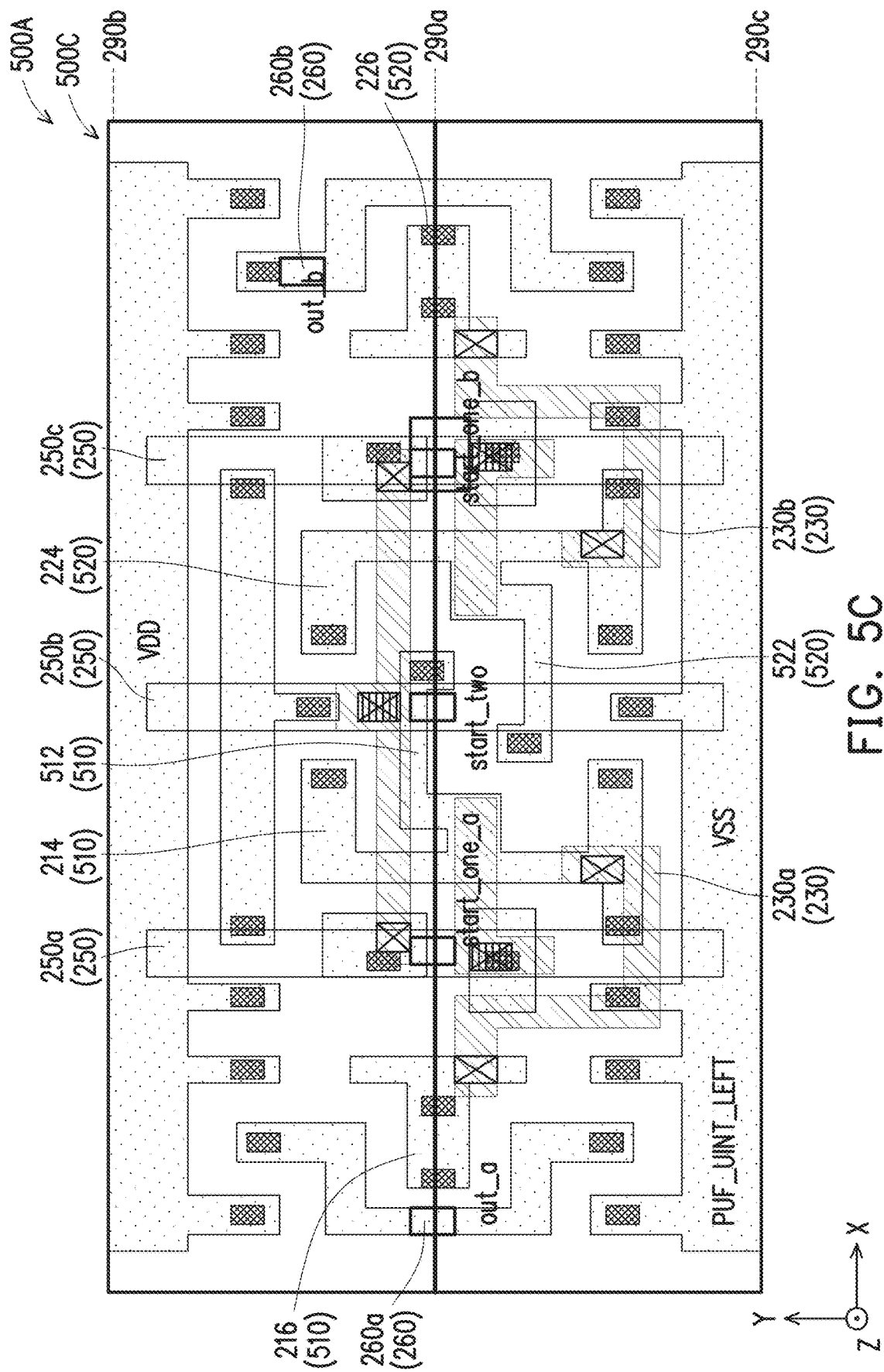
Figure 5G:
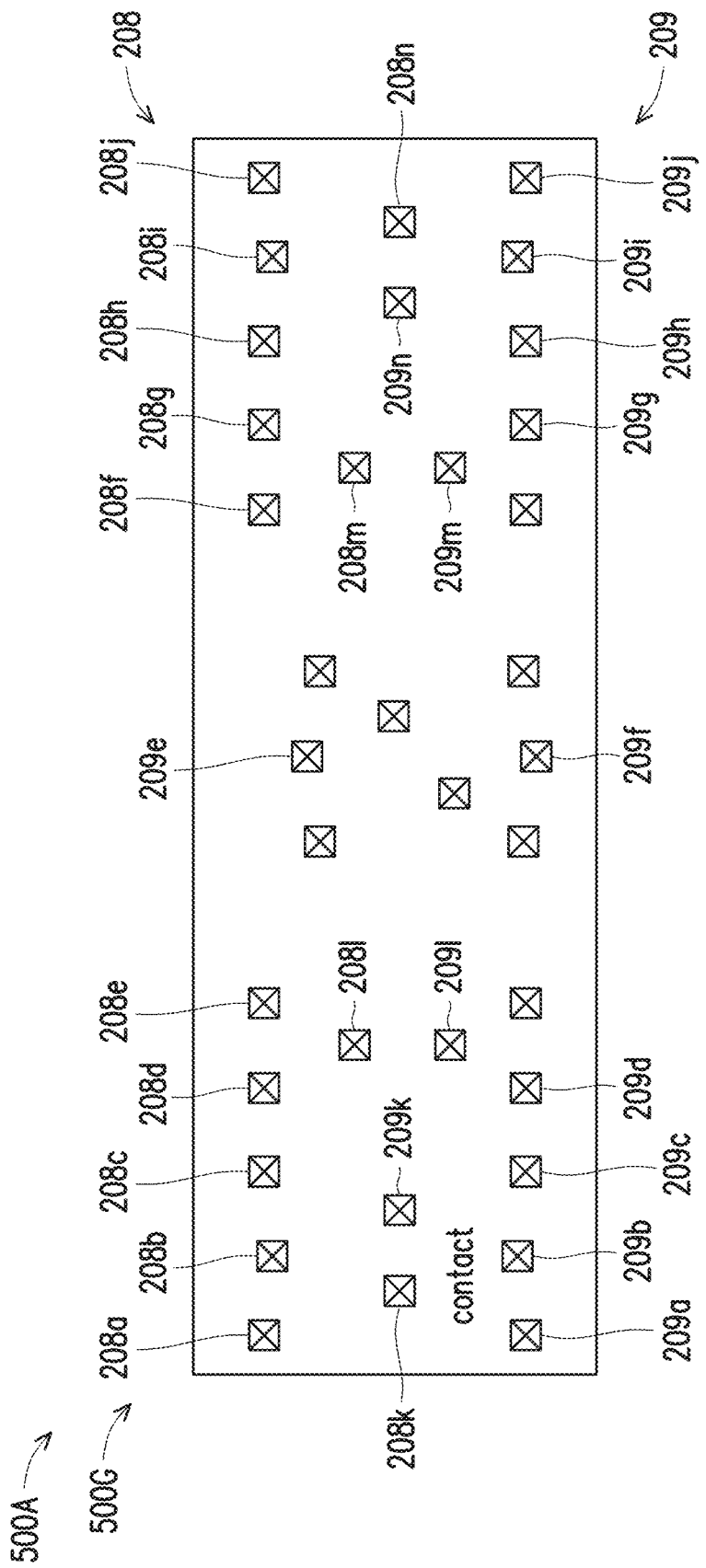
Figure 5H:
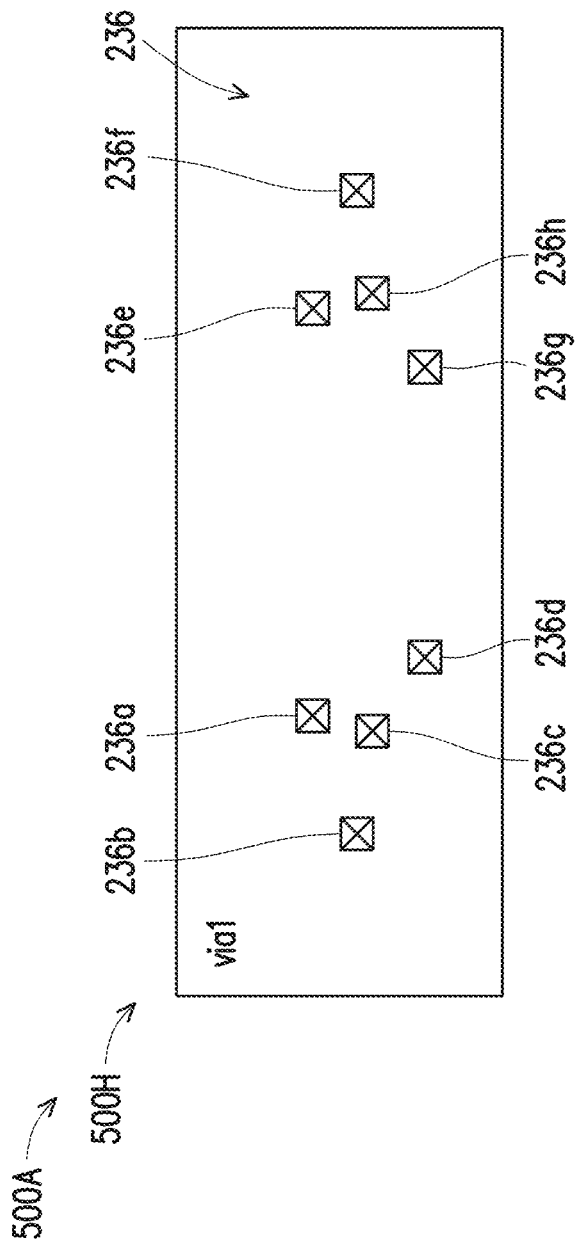
Figure 5I:
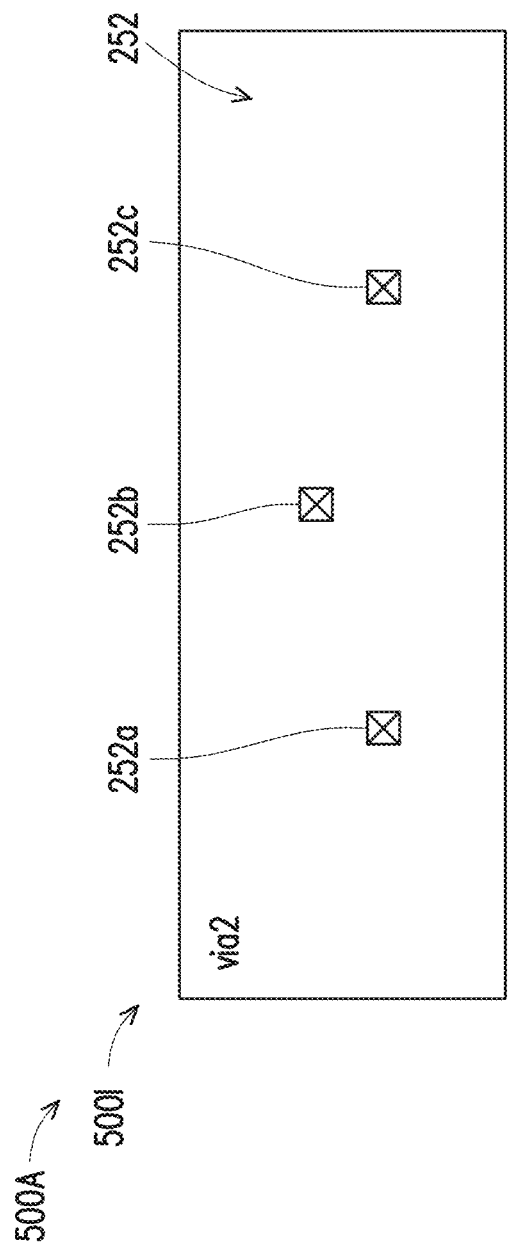
Figure 5J:
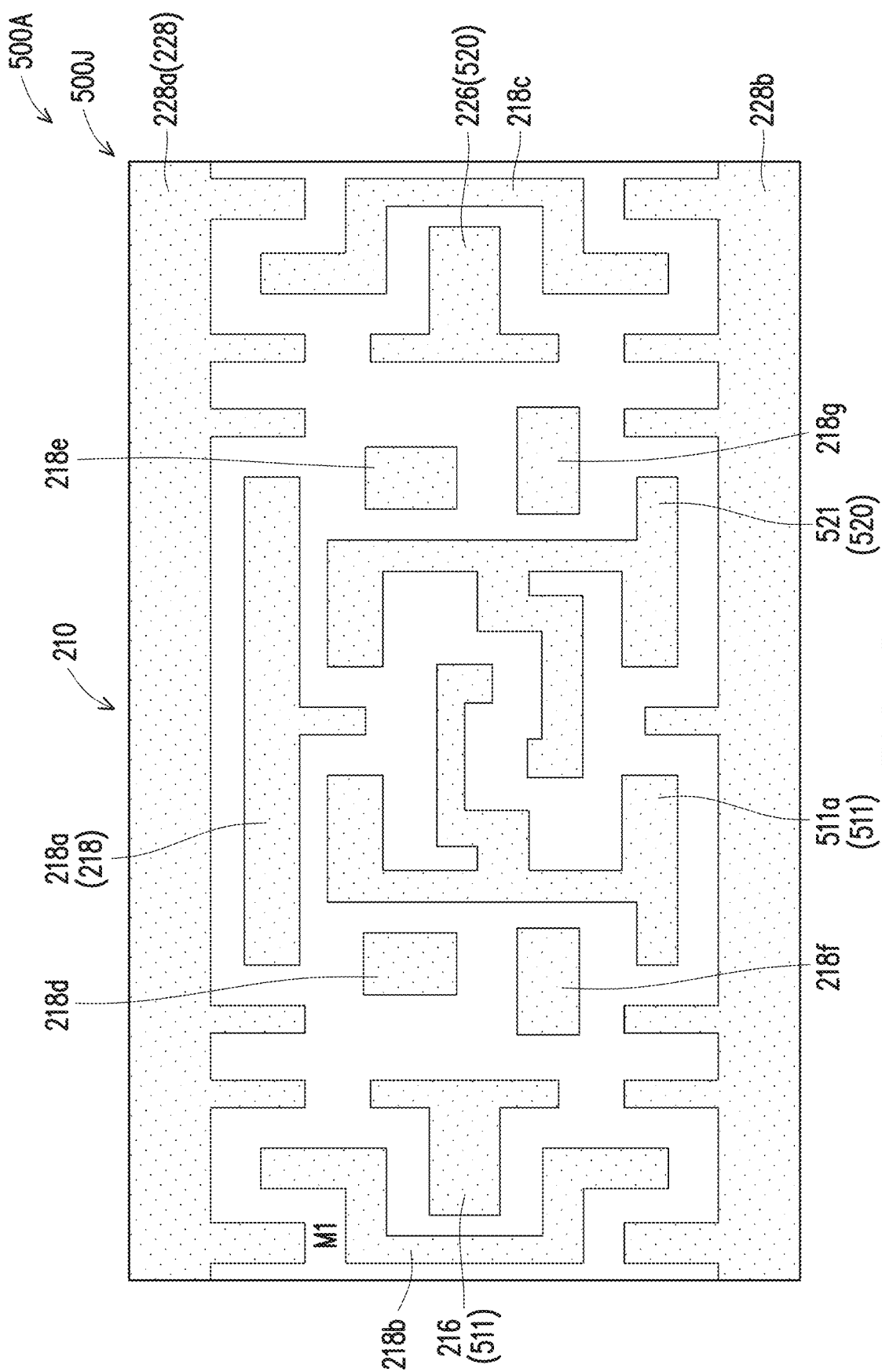
Figure 5K:
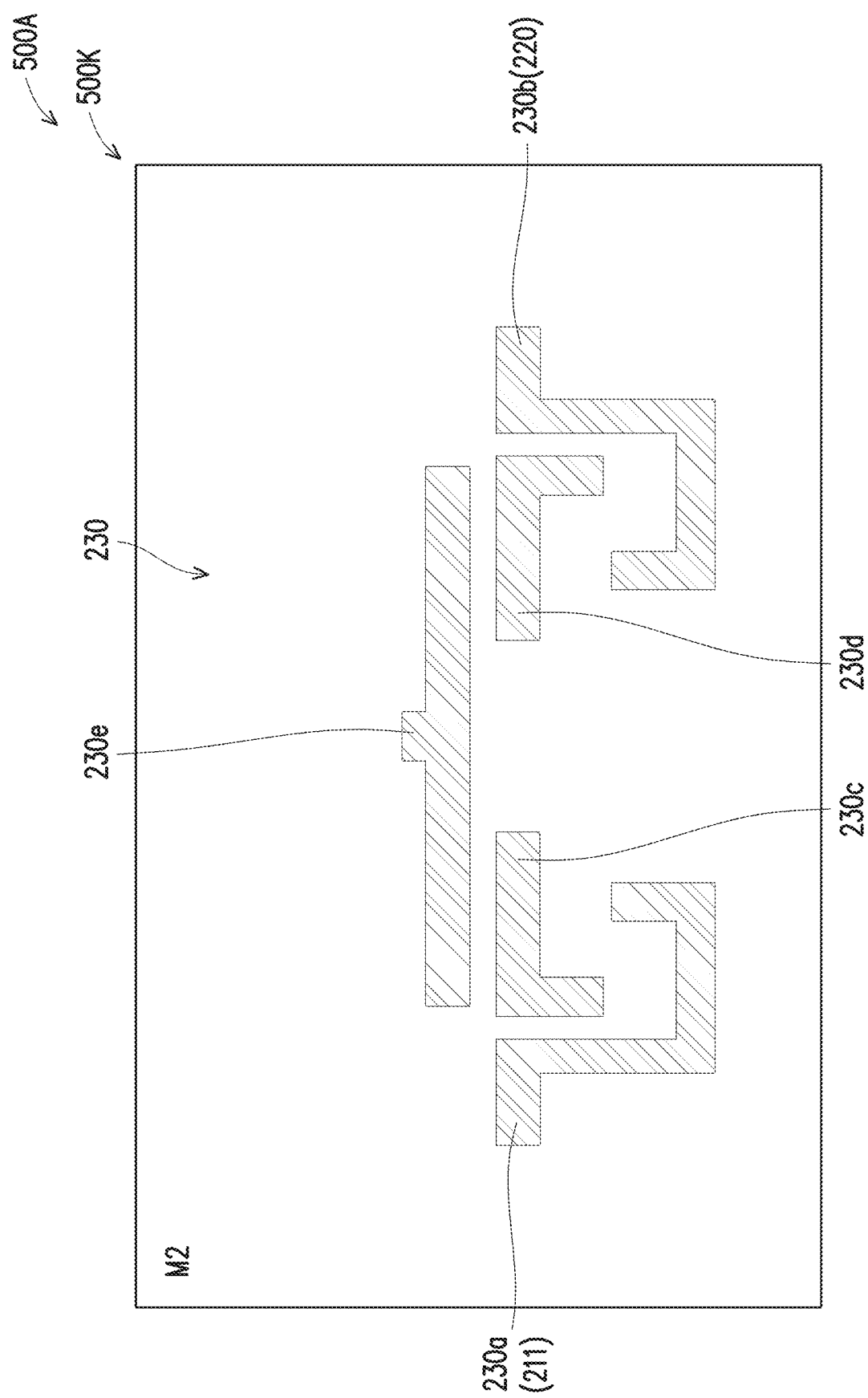

FIG. 5A is a diagram of a layout design 500A, in accordance with some embodiments. Layout design 500A corresponds to a layout diagram of a PUF cell 100A of FIG. 1A.

Layout design 500A is a variation of layout design 200A (FIGS. 2A-2K).

For example, layout design 500A illustrates an example where the set of conductive feature layout patterns 512 and 522 are symmetric to the corresponding set of conductive feature layout patterns 212 and 222 with respect to line 290*a*' of layout design 200A or 500A extending in the first direction X. In other words, the set of conductive feature layout patterns 512 and 522 are rotated with corresponding set of conductive feature layout patterns 212 and 222 with respect to line 290*a*', thereby changing the positions of the corresponding set of conductive feature layout patterns 512 and 522 when compared with the corresponding positions of the corresponding set of conductive feature layout patterns 212 and 222.

Layout design 500A is usable to manufacture PUF cell 100A (FIG. 1A) or an integrated circuit similar to integrated circuit 600A of FIGS. 6A-6C.

FIGS. 5B-5K are diagrams of a corresponding portion 500B-500K of layout design 500A of FIG. 5A, simplified for ease of illustration.

Portion 500B is layout design 500A of FIG. 5A, but further highlights the set of conductive feature layout patterns 511 and 520, for ease of illustration.

Portion 500C includes one or more features of layout design 500A of FIG. 5A from the VD level, the VG level, the V1 level, the V2 level, the M1 level, the M2 level and the M3 level of layout design 500A.

FIGS. 5D-5E are diagrams of a corresponding zoomed in portion 500D and 500E of conductive feature layout pattern 511*a* and 520 of layout design 500A, in accordance with some embodiments.

Portion 500F includes one or more features of layout design 500A of FIG. 5A from the active level or the OD level of layout design 500A. Portion 500G includes one or more features of layout design 500A of FIG. 5A from the VD level and the VG level of layout design 500A. Portion 500H includes one or more features of layout design 500A of FIG. 5A from the V1 level of layout design 500A. Portion 500I includes one or more features of layout design 500A of FIG. 5A from the V2 level of layout design 500A. Portion 500J includes one or more features of layout design 500A of FIG. 5A from the M1 level of layout design 500A. Portion 500K includes one or more features of layout design 500A of FIG. 5A from the M2 level of layout design 500A.

Layout design 500A includes the set of active region layout patterns 202, the set of gate layout patterns 204, the set of contact layout patterns 208, the set of contact layout patterns 209, a set of contact layout patterns 540, a set of contact layout patterns 542, a set of conductive feature layout patterns 510, the set of power rail layout patterns 228, the set of conductive feature layout patterns 230, the set of via layout patterns 236, the set of conductive feature layout patterns 250 and the set of via layout patterns 252.

In comparison with layout design 200A of FIGS. 2A-2K, the set of conductive feature layout patterns 510 of layout design 500A or 500L replaces the set of conductive feature layout patterns 210. The set of conductive feature layout patterns 510 are similar to the set of conductive feature layout patterns 210, and similar detailed description is therefore omitted. In some embodiments, the set of conductive feature layout patterns 510 is usable to manufacture the corresponding set of conductive structures 610 (FIGS. 6A-6C) of integrated circuit 600A.

In some embodiments, the set of conductive feature layout patterns 510 includes at least a conductive feature layout pattern 511a, the conductive feature layout pattern 216, the set of conductive feature layout patterns 218, a conductive feature layout pattern 521 or the conductive feature layout pattern 226.

In comparison with layout design 200A of FIGS. 2A-2K, conductive feature layout patterns 511a and 521 replace corresponding conductive feature layout patterns 211a and 221. Conductive feature layout patterns 511a and 521 are similar to corresponding conductive feature layout patterns 211a and 221, and similar detailed description is therefore omitted. In some embodiments, conductive feature layout patterns 511a and conductive feature layout pattern 521 are usable to manufacture corresponding conductive structures 611a and 621 (FIGS. 6A-6C) of integrated circuit 600A.

In some embodiments, conductive feature layout pattern 511a includes at least a set of conductive feature layout patterns 512, the conductive feature layout pattern 214 or the conductive feature layout pattern 215. In some embodiments, the set of conductive feature layout patterns 512 is usable to manufacture a corresponding set of conductive structures 612 (FIGS. 6A-6C) of integrated circuit 600A.

In comparison with layout design 200A of FIGS. 2A-2K, the set of conductive feature layout patterns 512 replaces the corresponding set of conductive feature layout patterns 212. The set of conductive feature layout patterns 512 are similar to the corresponding set of conductive feature layout patterns 212, and similar detailed description is therefore omitted. In some embodiments, the set of conductive feature layout patterns 512 is usable to manufacture a corresponding set of conductive structures 612 (FIGS. 6A-6C) of integrated circuit 600A.

In comparison with the set of conductive feature layout patterns 212, the set of conductive feature layout patterns 512 is symmetric to the set of conductive feature layout patterns 212 with respect to line 290a' of layout design 200A or 500A extending in the first direction X. In other words, in some embodiments, the set of conductive feature layout patterns 512 is rotated with the set of conductive feature layout patterns 212 with respect to line 290a', thereby changing the position of the set of conductive feature layout patterns 512 when compared with the position of the set of conductive feature layout patterns 212.

The set of conductive feature layout patterns 512 includes at least a conductive feature layout pattern 512a, a conductive feature layout pattern 512b or a conductive feature layout pattern 512c. In some embodiments, conductive feature layout patterns 512a, 512b and 512c are portions of a same continuous layout pattern (e.g., set of conductive feature layout patterns). In some embodiments, the set of conductive feature layout patterns 512 has a C-shape. In some embodiments, other shapes or configurations of the set of conductive feature layout patterns 512 are within the scope of the present disclosure. Conductive feature layout pattern 512 overlaps gate layout patterns 204b and 204c.

In some embodiments, conductive feature layout pattern 512a is separated from at least conductive feature layout pattern 214a or 224a in the second direction by a distance D3.

In some embodiments, conductive feature layout pattern 521 includes at least a set of conductive feature layout patterns 522, the conductive feature layout pattern 224 or the conductive feature layout pattern 225. In some embodiments, the set of conductive feature layout patterns 521 is usable to manufacture a corresponding set of conductive structures 621 (FIGS. 6A-6C) of integrated circuit 600A.

In comparison with layout design 200A of FIGS. 2A-2K, the set of conductive feature layout patterns 522 replaces the corresponding set of conductive feature layout patterns 222. The set of conductive feature layout patterns 522 are similar to the corresponding set of conductive feature layout patterns 222, and similar detailed description is therefore omitted. In some embodiments, the set of conductive feature layout patterns 522 is usable to manufacture a corresponding set of conductive structures 622 (FIGS. 6A-6C) of integrated circuit 600A.

In comparison with the set of conductive feature layout patterns 222, the set of conductive feature layout patterns 522 is symmetric to the set of conductive feature layout patterns 222 with respect to line 290a' of layout design 200A or 500A extending in the first direction X. In other words, in some embodiments, the set of conductive feature layout patterns 522 is rotated with the set of conductive feature layout patterns 222 with respect to line 290a', thereby changing the position of the set of conductive feature layout patterns 522 when compared with the position of the set of conductive feature layout patterns 222.

The set of conductive feature layout patterns 522 includes at least a conductive feature layout pattern 522a, a conductive feature layout pattern 522b or a conductive feature layout pattern 522c. In some embodiments, conductive feature layout patterns 522a, 522b and 522c are portions of a same continuous layout pattern (e.g., set of conductive feature layout patterns 522). In some embodiments, the set of conductive feature layout patterns 522 has a C-shape. In some embodiments, other shapes or configurations of the set of conductive feature layout patterns 522 are within the scope of the present disclosure. Conductive feature layout pattern 522 overlaps gate layout patterns 204b and 204c.

In some embodiments, the set of conductive feature layout patterns 522 and the set of conductive feature layout patterns 512 are symmetric to each other with respect to at least line 290a or 290a' of layout design 500A extending in the first direction X. In some embodiments, at least conductive feature layout pattern 522a, conductive feature layout pattern 522b or conductive feature layout pattern 522c is symmetric to at least corresponding conductive feature layout pattern 512a, conductive feature layout pattern 512b or conductive feature layout pattern 512c with respect to at least line 290a or 290a' of layout design 500A extending in the first direction X.

In some embodiments, conductive feature layout pattern 522a is separated from at least conductive feature layout pattern 214a or 224a in the second direction by a distance D4. In some embodiments, the distance D3 is different from the distance D4. In some embodiments, the distance D3 is the same as the distance D2. In some embodiments, the distance D4 is the same as the distance D1.

In some embodiments, distance D3 extends from where conductive feature layout pattern 214 overlaps contact layout pattern 240a or active region layout pattern 202a and where conductive feature layout pattern 512 overlaps contact layout pattern 540b or gate layout pattern 204c. In some embodiments, distance D4 extends from where conductive feature layout pattern 224 overlaps contact layout pattern 242a or active region layout pattern 202a and where conductive feature layout pattern 522 overlaps contact layout pattern 542b or gate layout pattern 204b.

In comparison with layout design 200A of FIGS. 2A-2K, the set of contact layout patterns 540 and 542 of layout design 500A or 500L replaces the corresponding set of contact layout patterns 240 and 242. The set of contact layout patterns 540 and 542 are similar to the corresponding set of contact layout patterns 240 and 242, and similar detailed description is therefore omitted.

In some embodiments, set of contact layout patterns 240 includes at least contact layout pattern 240a, 540b, 240c or 240d. In comparison with layout design 200A of FIGS. 2A-2K, contact layout pattern 540b replaces contact layout pattern 240b. Contact layout pattern 540b is similar to contact layout pattern 240b, and similar detailed description is therefore omitted. In comparison with contact layout pattern 240b, contact layout pattern 540b is now separated from at least contact layout pattern 240a or 242a or conductive feature layout pattern 214 or 224 in the second direction Y by the distance D4.

In some embodiments, set of contact layout patterns 242 includes at least contact layout pattern 242a, 542b, 242c or 242d. In comparison with layout design 200A of FIGS. 2A-2K, contact layout pattern 542b replaces contact layout pattern 242b. Contact layout pattern 542b is similar to contact layout pattern 242b, and similar detailed description is therefore omitted. In comparison with contact layout pattern 242b, contact layout pattern 542b is now separated from at least contact layout pattern 240a or 242a or conductive feature layout pattern 214 or 224 in the second direction Y by the distance D3.

In some embodiments, the set of conductive feature layout patterns 512 and 522 are symmetric with the corresponding set of conductive feature layout patterns 212 and 222 with respect to at least line 290a or 290a' of layout design 200A or 500A extending in the first direction X thereby changing the distance D1 and D2 (between corresponding conductive feature layout pattern 222a or 212a and corresponding conductive feature layout pattern 214a or 224a) to corresponding distance D3 or D4 (between corresponding conductive feature layout pattern 522a or 512a and corresponding conductive feature layout pattern 214a or 224a) in the second direction Y. In some embodiments, by changing the distance to D3 and D4 in layout design 500A or 500L, an array (e.g., FIGS. 8A-8B & 9A-9D) including each of layout design 500A or 500L and layout design 200A or 200L has a balanced layout with less systematic bias and better performance than other approaches.

Figure 5L:
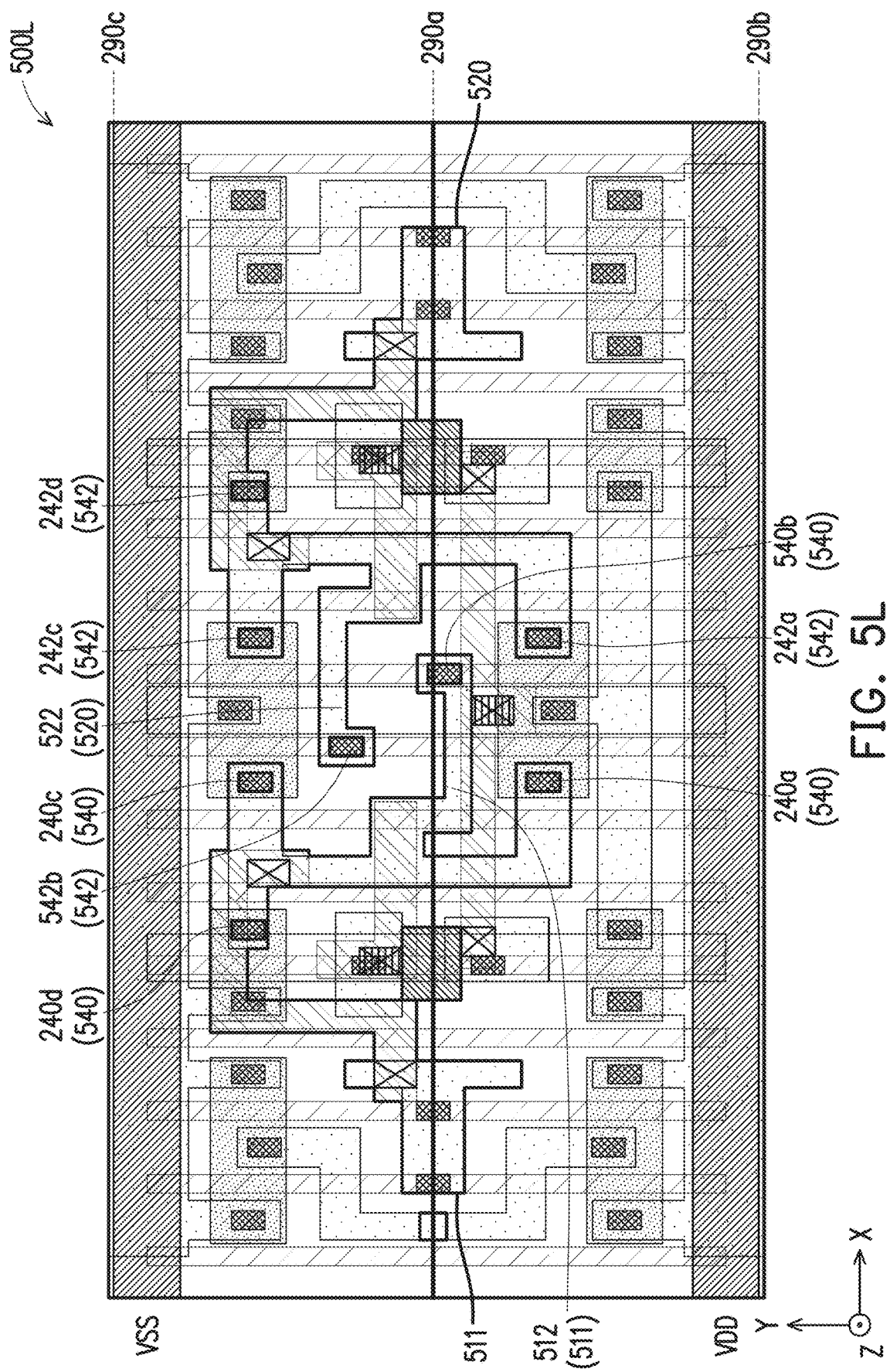
FIG. 5L is a diagram of a layout design, in accordance with some embodiments.

FIG. 5L is a diagram of a layout design 500L, in accordance with some embodiments.

Layout design 500L is a variation of layout design 500A. In comparison with layout design 500A of FIGS. 5A-5K, layout design 500L is symmetric to layout design 500A with respect to the edge 290c of layout design 200A in the first direction X (e.g., x-axis). Layout design 500L is usable to manufacture PUF cell 100A (FIG. 1A). In some embodiments, layout design 500L is usable to manufacture an integrated circuit (not shown for brevity) symmetric to integrated circuit 600A with respect to the edge 390c of integrated circuit 600A in the first direction X (e.g., x-axis). In some embodiments, the integrated circuit (not shown for brevity) symmetric to integrated circuit 600A is similar to layout design 500L, but is not shown for brevity.

FIGS. 6A, 6B and 6C are diagrams of an integrated circuit 600A, in accordance with some embodiments.

FIG. 6A is a top view of an integrated circuit 600A corresponding to layout design 500A, in accordance with some embodiments. FIG. 6B is a top view of a portion 600B of integrated circuit 600A corresponding to portion 500B of layout design 500A, in accordance with some embodiments. FIG. 6C is a top view of a portion 600C of an integrated circuit 600A corresponding to a portion 500C of layout design 500A, in accordance with some embodiments.

FIGS. 6B-6C are diagrams of a corresponding portion 600B-600C of integrated circuit 600A of FIG. 6A, simplified for ease of illustration.

Portion 600B is integrated circuit 600A of FIG. 6A, but further highlights the set of conductive structures 611 and 620, for ease of illustration.

Portion 600C includes one or more features of integrated circuit 600A of FIG. 6A from the VD level, the VG level, the V1 level, the V2 level, the M1 level, the M2 level and the M3 level of integrated circuit 600A.

Integrated circuit 600A is manufactured by layout design 500A or 500L. Integrated circuit 600A is an embodiment of PUF cell 100A of FIG. 1A. In some embodiments, integrated circuit 600A is modified to form an integrated circuit (not shown for brevity) symmetric to integrated circuit 600A with respect to the edge 390c of integrated circuit 600A in the first direction X (e.g., x-axis). In some embodiments, the integrated circuit (not shown for brevity) symmetric to integrated circuit 600A is similar to layout design 500L, but is not shown for brevity.

Structural relationships including alignment, lengths and widths, as well as configurations of integrated circuit 600A are similar to the structural relationships and configurations of layout design 500A or 500L of FIGS. 5A-5L, and similar detailed description will not be described in FIGS. 6A-6C for brevity.

Integrated circuit 600A includes the set of active regions 302, the set of gates 304, the set of contacts 308, the set of contacts 309, a set of contacts 640, a set of contacts 642, a set of conductive structures 610, the set of power rails 328, the set of conductive structures 330, the set of via 336, the set of conductive structures 350 and the set of vias 352.

In comparison with integrated circuit 300A of FIGS. 3A-3C, the set of conductive structures 610 of integrated circuit 600A replaces the set of conductive structures 310. The set of conductive structures 610 are similar to the set of conductive structures 310, and similar detailed description is therefore omitted.

In some embodiments, the set of conductive structures 610 includes at least a conductive structure 611a, the conductive feature structure 316, the set of conductive structures 318, a conductive structure 621 or the conductive structure 326.

In comparison with integrated circuit 300A of FIGS. 3A-3C, conductive structures 611a and 621 replace corresponding conductive structures 311a and 321. Conductive structures 611a and 621 are similar to corresponding conductive structures 311a and 321, and similar detailed description is therefore omitted.

In some embodiments, conductive structure 611a includes at least a set of conductive structures 612, the conductive structure 314 or the conductive structure 315.

In comparison with integrated circuit 300A of FIGS. 3A-3C, the set of conductive structures 612 replaces the corresponding set of conductive structures 312. The set of conductive structures 612 are similar to the corresponding set of conductive structures 312, and similar detailed description is therefore omitted.

In comparison with the set of conductive structures 312, the set of conductive structures 612 is symmetric to the set of conductive structures 312 with respect to line 390a' of integrated circuit 300A or 600A extending in the first direction X. In other words, in some embodiments, the set of conductive structures 612 is rotated with the set of conductive structures 312 with respect to line 390a', thereby changing the position of the set of conductive structures 612 when compared with the position of the set of conductive structures 312.

The set of conductive structures 612 includes at least a conductive structure 612a, a conductive structure 612b or a conductive structure 612c. In some embodiments, conductive structures 612a, 612b and 612c are portions of a same continuous structure (e.g., set of conductive structures).

In some embodiments, conductive structure 612a is separated from at least conductive structure 314a or 324a in the second direction by the distance D3.

In some embodiments, conductive structure 621 includes at least a set of conductive structures 622, the conductive structure 324 or the conductive structure 325.

In comparison with integrated circuit 300A of FIGS. 3A-3C, the set of conductive structures 622 replaces the corresponding set of conductive structures 322. The set of conductive structures 622 are similar to the corresponding set of conductive structures 322, and similar detailed description is therefore omitted.

In comparison with the set of conductive structures 322, the set of conductive structures 622 is symmetric to the set of conductive structures 322 with respect to line 390a' of integrated circuit 300A or 600A extending in the first direction X. In other words, in some embodiments, the set of conductive structures 622 is rotated with the set of conductive structures 322 with respect to line 390a', thereby changing the position of the set of conductive structures 622 when compared with the position of the set of conductive structures 322.

The set of conductive structures 622 includes at least a conductive structure 622a, a conductive structure 622b or a conductive structure 622c. In some embodiments, conductive structures 622a, 622b and 622c are portions of a same continuous structure (e.g., set of conductive structures 622).

In some embodiments, the set of conductive structures 622 and the set of conductive structures 612 are symmetric to each other with respect to at least line 390a or 390a' of integrated circuit 600A extending in the first direction X. In some embodiments, at least conductive structure 622a, conductive structure 622b or conductive structure 622c is symmetric to at least corresponding conductive structure 612a, conductive structure 612b, or conductive structure 612c with respect to at least line 390a or 390a' of integrated circuit 600A extending in the first direction X.

In some embodiments, conductive structure 622a is separated from at least conductive structure 314a or 324a in the second direction by the distance D4.

In some embodiments, distance D3 extends from where conductive structure 314 overlaps contact 340a or active region 302a and where conductive structure 612 overlaps contact 640b or gate 304c. In some embodiments, distance D4 extends from where conductive structure 324 overlaps contact 342a or active region 302a and where conductive structure 622 overlaps contact 642b or gate 304b.

In comparison with integrated circuit 300A of FIGS. 3A-3C, the set of contacts 640 and 642 of integrated circuit 600A replaces the corresponding set of contacts 340 and 342. The set of contacts 640 and 642 are similar to the corresponding set of contacts 340 and 342, and similar detailed description is therefore omitted.

In some embodiments, set of contacts 340 includes at least contact 340a, 640b, 340c or 340d. In comparison with integrated circuit 300A of FIGS. 3A-3C, contact 640b replaces contact 340b. Contact 640b is similar to contact 340b, and similar detailed description is therefore omitted. In comparison with contact 340b, contact 640b is now separated from at least contact 340a or 342a or conductive structure 314 or 324 in the second direction Y by the distance D4.

In some embodiments, set of contacts 342 includes at least contact 342a, 642b, 342c or 342d. In comparison with integrated circuit 300A of FIGS. 3A-3C, contact 642b replaces contact 342b. Contact 642b is similar to contact 342b, and similar detailed description is therefore omitted. In comparison with contact 342b, contact 642b is now separated from at least contact 340a or 342a or conductive structure 314 or 324 in the second direction Y by the distance D3.

In some embodiments, the set of conductive structures 612 and 622 are symmetric with the corresponding set of conductive structures 312 and 322 with respect to at least line 390a or 390a' of integrated circuit 300A or 600A extending in the first direction X thereby changing the distance D1 and D2 (between corresponding conductive structure 322a or 312a and corresponding conductive structure 314a or 324a) to corresponding distance D3 or D4 (between corresponding conductive structure 622a or 612a and corresponding conductive structure 314a or 324a) in the second direction Y. In some embodiments, by changing the distance to D3 and D4 in integrated circuit 600A, an array (e.g., FIGS. 8A-8B & 9A-9D) including each of integrated circuit 600A and integrated circuit 300A has a balanced arrangement with less systematic bias and better performance than other approaches.

Figure 7A:
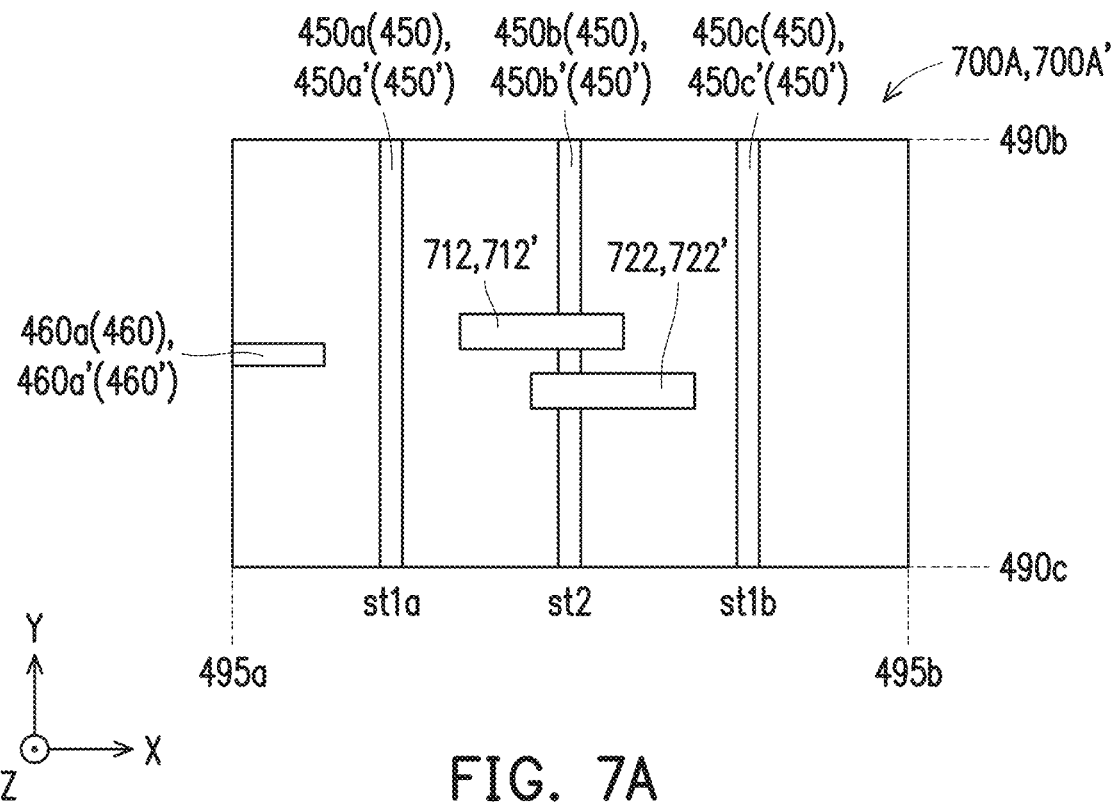
FIG. 7A is a schematic diagram of an abstract view of a PUF cell, in accordance with some embodiments.

FIG. 7A is a schematic diagram of an abstract view of a PUF cell 700A or 700A', in accordance with some embodiments.

PUF cell 700A corresponds to an abstract view of layout design 500A of FIGS. 5A-5K. In some embodiments, PUF cell 700A is referred to as a "Cell Type 2" PUF cell (FIGS. 9A-9D) or a "Cell Type 2A" PUF cell (FIG. 8A-8B). PUF cell 700A includes at least a set of conductive feature layout patterns 722, a set of conductive feature layout patterns 712, a conductive feature layout pattern 450a, 450b or 450c or output pin layout pattern 460a.

In some embodiments, set of conductive feature layout patterns 722, set of conductive feature layout patterns 712, conductive feature layout pattern 450a, 450b or 450c of the set of conductive feature layout patterns 450 or output pin layout pattern 460a are corresponding set of conductive feature layout patterns 522, set of conductive feature layout patterns 512, conductive feature layout pattern 250a, 250b or 250c of the set of conductive feature layout patterns 250 or output pin layout pattern 260a of corresponding layout design 500A (FIGS. 5A-5K), and similar detailed description is therefore omitted.

PUF cell 700A' corresponds to an abstract view of integrated circuit 600A of FIGS. 6A-6C. In some embodiments, PUF cell 700A' is referred to as a "Cell Type 2" PUF cell (FIGS. 9A-9D) or a "Cell Type 2A" PUF cell (FIG. 8A-8B). PUF cell 700A' includes at least a set of conductive structures 722', a set of conductive structures 712', a conductive structure 450a', 450b' or 450c' (collectively referred to as a set of conductive structures 450') or an output pin 460a'.

In some embodiments, set of conductive structures 722', set of conductive structures 712', conductive structure 450a', 450b', 450c' of the set of conductive structures 450' and output pin 460a' are corresponding set of conductive structures 622, corresponding set of conductive structures 612, corresponding conductive structure 350a, 350b, 350c of the corresponding set of conductive structures 350 and corresponding output pin 360a of integrated circuit 600A (FIGS. 6A-6C), and similar detailed description is therefore omitted.

Figure 7B:
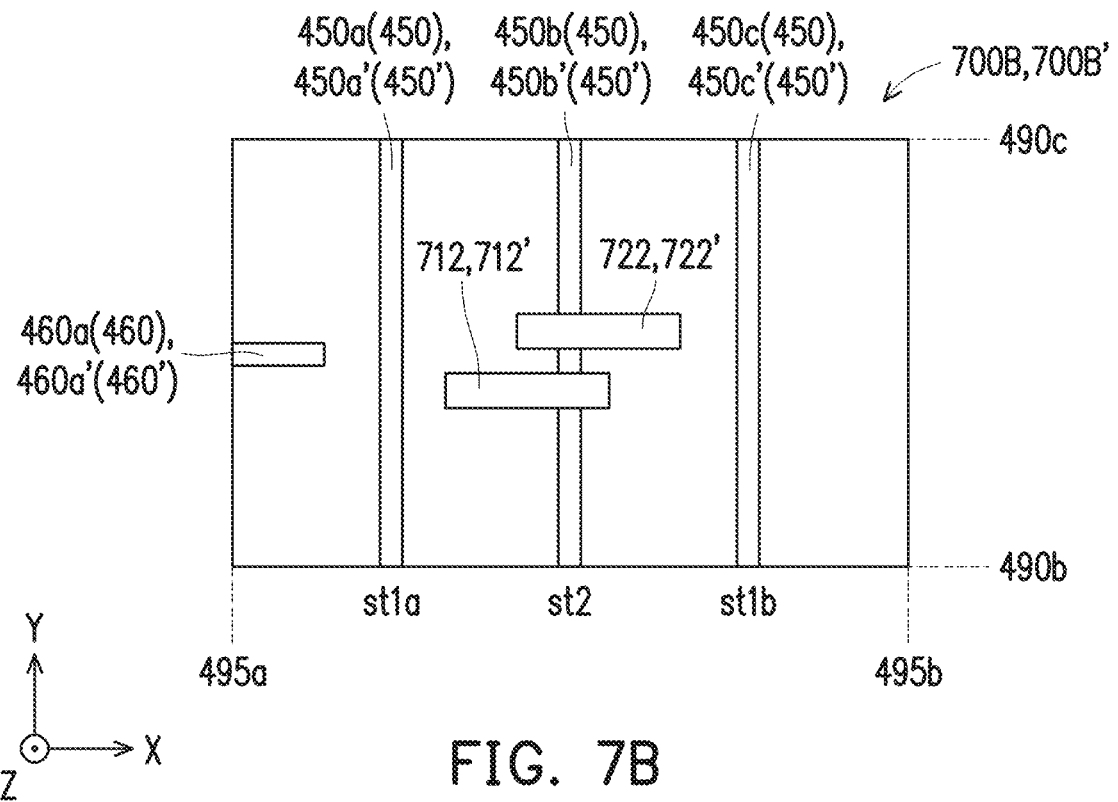
FIG. 7B is a schematic diagram of an abstract view of a PUF cell, in accordance with some embodiments.

FIG. 7B is a schematic diagram of an abstract view of a PUF cell 700B or 700B', in accordance with some embodiments.

PUF cell 700B corresponds to an abstract view of layout design 500L of FIG. 5L. In some embodiments, PUF cell 700B is referred to as a "Cell Type 2" PUF cell (FIGS. 9A-9D) or a "Cell Type 2B" PUF cell (FIG. 8A-8B). PUF cell 700B includes at least set of conductive feature layout patterns 722, set of conductive feature layout patterns 712, conductive feature layout pattern 450a, 450b or 450c or output pin layout pattern 460a.

PUF cell 700B is a variation of PUF cell 700A. In comparison with PUF cell 700A, PUF cell 700B is symmetric to PUF cell 700A with respect to edge 490b or 490c (e.g., the x-axis) in the first direction X.

PUF cell 700B' corresponds to an abstract view of an integrated circuit (not shown for brevity) symmetric to of integrated circuit 600A of FIGS. 6A-6C. In some embodiments, PUF cell 700B' is referred to as a "Cell Type 2" PUF cell (FIGS. 9A-9D) or a "Cell Type 2B" PUF cell (FIG. 8A-8B). PUF cell 700B' includes at least set of conductive structures 722', set of conductive structures 712', conductive structure 450a', 450b' or 450c' or output pin 460a'.

PUF cell 700B' is a variation of PUF cell 700A'. In comparison with PUF cell 700A', PUF cell 700B' is symmetric to PUF cell 700A' with respect to edge 490b or 490c (e.g., the x-axis) in the first direction X.

FIG. 8A is a schematic diagram of a PUF cell array 800A, in accordance with some embodiments.

PUF cell array 800A comprises an array of PUF cells 802[1,1], 802[1,2], . . . , 802[8,2], (collectively referred to as "array of PUF cells 802") having 8 rows and 2 columns. In some embodiments, at least other number of columns or other number of rows for PUF cell array 800A are within the contemplated scope of the present disclosure. The rows of PUF cells in PUF cell array 800A are arranged in the first direction X. The columns of PUF cells in PUF cell array 800A are arranged in the second direction Y. At least PUF cell 400A, 400B, 700A or 700B is usable as one or more PUF cells in PUF cell array 800A. PUF cell array 800A further comprises a set of power rails 803 alternating in the second direction Y. In some embodiments, the set of power rails corresponds to set of power rail layout patterns 228 or set of power rails 328.

In some embodiments, column 1 of PUF cell array 800A includes cell type 1A and cell type 1B alternating with each other in the second direction Y. In some embodiments, column 1 of PUF cell array 800A includes PUF cell 400A and PUF cell 400B alternating with each other in the second direction Y.

In some embodiments, column 2 of PUF cell array 800A includes cell type 2A and cell type 2B alternating with each other in the second direction Y. In some embodiments, column 2 of PUF cell array 800A includes PUF cell 700A and PUF cell 700B alternating with each other in the second direction Y.

In some embodiments, PUF cell array 800A is an array of layout designs, such as one or more of layout design 200A, 200L, 500A or 500L. For example, in these embodiments, PUF cell 400A is usable as PUF cells 802[8,1], 802[6,1], 802[4,1] and 802[2,1] in PUF cell array 800A.

In these embodiments, PUF cell 400B is usable as PUF cells 802[7,1], 802[5,1], 802[3,1] and 802[1,1] in PUF cell array 800A. In these embodiments, PUF cell 700A is usable as PUF cells 802[8,2], 802[6,2], 802[4,2] and 802[2,2] in PUF cell array 800A. In these embodiments, PUF cell 700B is usable as PUF cells 802[7,2], 802[5,2], 802[3,2] and 802[1,2] in PUF cell array 800A.

In some embodiments, PUF cell array 800A is an array of integrated circuits, such as one or more of integrated circuit 300A or 600A. For example, in these embodiments, PUF cell 400A' is usable as PUF cells 802[8,1], 802[6,1], 802[4,1] and 802[2,1] in PUF cell array 800A. In these embodiments, PUF cell 400B' is usable as PUF cells 802[7,1], 802[5,1], 802[3,1] and 802[1,1] in PUF cell array 800A. In these embodiments, PUF cell 700A' is usable as PUF cells 802[8,2], 802[6,2], 802[4,2] and 802[2,2] in PUF cell array 800A. In these embodiments, PUF cell 700B' is usable as PUF cells 802[7,2], 802[5,2], 802[3,2] and 802[1,2] in PUF cell array 800A.

In some embodiments, signals st1a, st2, and st1b are received from edge 803' in the second direction Y. In some embodiments, by having each of signals st1a and st1b received from edge 803' in the same direction, a delay associated with the corresponding path for corresponding signals st1a and st1b is similar reducing possible systematic bias in PUF cell array 800A.

In some embodiments, for PUF cell array 800A, at least a number of PUF cells 400A, a number of PUF cells 400B, a number of PUF cells 700A or a number of PUF cells 700B is equal to at least another of a number of PUF cells 400A, a number of PUF cells 400B, a number of PUF cells 700A or a number of PUF cells 700B.

In some embodiments, for PUF cell array 800A, at least a number of PUF cells 400A', a number of PUF cells 400B', a number of PUF cells 700A' or a number of PUF cells 700B' is equal to at least another of a number of PUF cells 400A', a number of PUF cells 400B', a number of PUF cells 700A' or a number of PUF cells 700B'.

In some embodiments, by having a same number of PUF cells 400A, 400B, 700A and 700B in PUF cell array 800A, a delay associated with the corresponding path for corresponding signals st1a and st1b is similar resulting in less systematic bias and resulting in PUF cell array 800A having better performance than other approaches.

Other configurations, arrangements or different types of PUF cells in PUF cell array 800A are within the contemplated scope of the present disclosure.

FIG. 8B is a schematic diagram of a PUF cell array 800B, in accordance with some embodiments.

PUF cell array 800B is a variation of PUF cell array 800A. In comparison with PUF cell array 800A, array of PUF cells 804[1,1], 804[1,2], . . . , 804[8,2] (collectively referred to as "array of PUF cells 804") replaces array of PUF cells 802.

PUF cell array 800B comprises an array of PUF cells 804[1,1], 804[1,2], . . . , 804[8,2], (collectively referred to as "array of PUF cells 804") having 8 rows and 2 columns. In some embodiments, at least other number of columns or other number of rows for PUF cell array 800B are within the contemplated scope of the present disclosure.

At least PUF cell 400A, 400B, 700A or 700B is usable as one or more PUF cells in PUF cell array 800B.

In some embodiments, column 1 of PUF cell array 800B includes cell type 1A and cell type 2B alternating with each other in the second direction Y. In some embodiments, column 1 of PUF cell array 800B includes PUF cell 400A and PUF cell 700B alternating with each other in the second direction Y.

In some embodiments, column 2 of PUF cell array 800B includes cell type 2A and cell type 1B alternating with each other in the second direction Y. In some embodiments, column 2 of PUF cell array 800B includes PUF cell 700A and PUF cell 400B alternating with each other in the second direction Y.

In some embodiments, PUF cell array 800B is an array of layout designs, such as one or more of layout design 200A, 200L, 500A or 500L. For example, in these embodiments, PUF cell 400A is usable as PUF cells 804[8,1], 804[6,1], 804[4,1] and 804[2,1] in PUF cell array 800B.

In these embodiments, PUF cell 400B is usable as PUF cells 804[7,2], 804[5,2], 804[3,2] and 804[1,2] in PUF cell array 800B. In these embodiments, PUF cell 700A is usable as PUF cells 804[8,2], 804[6,2], 804[4,2] and 804[2,2] in PUF cell array 800B. In these embodiments, PUF cell 700B is usable as PUF cells 804[7,1], 804[5,1], 804[3,1] and 804[1,1] in PUF cell array 800B.

In some embodiments, PUF cell array 800B is an array of integrated circuits, such as one or more of integrated circuit 300A or 600A. For example, in these embodiments, PUF cell 400A' is usable as PUF cells 804[8,1], 804[6,1], 804[4,1] and 804[2,1] in PUF cell array 800B.

In these embodiments, PUF cell 400B' is usable as PUF cells 804[7,2], 804[5,2], 804[3,2] and 804[1,2] in PUF cell array 800B. In these embodiments, PUF cell 700A' is usable as PUF cells 804[8,2], 804[6,2], 804[4,2] and 804[2,2] in PUF cell array 800B. In these embodiments, PUF cell 700B' is usable as PUF cells 804[7,1], 804[5,1], 804[3,1] and 804[1,1] in PUF cell array 800B.

In some embodiments, signals st1a, st2, and st1b are received from edge 803' in the second direction Y. In some embodiments, by having each of signals st1a and st1b received from edge 803' in the same direction, a delay associated with the corresponding path for corresponding signals st1a and st1b is similar reducing possible systematic bias in PUF cell array 800B.

In some embodiments, for PUF cell array 800B, at least a number of PUF cells 400A, a number of PUF cells 400B, a number of PUF cells 700A or a number of PUF cells 700B is equal to at least another of a number of PUF cells 400A, a number of PUF cells 400B, a number of PUF cells 700A or a number of PUF cells 700B.

In some embodiments, for PUF cell array 800B, at least a number of PUF cells 400A', a number of PUF cells 400B', a number of PUF cells 700A' or a number of PUF cells 700B' is equal to at least another of a number of PUF cells 400A', a number of PUF cells 400B', a number of PUF cells 700A' or a number of PUF cells 700B'.

In some embodiments, by having a same number of PUF cells 400A, 400B, 700A and 700B in PUF cell array 800B, a delay associated with the corresponding path for corresponding signals st1a and st1b is similar resulting in less systematic bias and resulting in PUF cell array 800B having better performance than other approaches.

Other configurations, arrangements or different types of PUF cells in PUF cell array 800B are within the contemplated scope of the present disclosure.

Figure 9A:
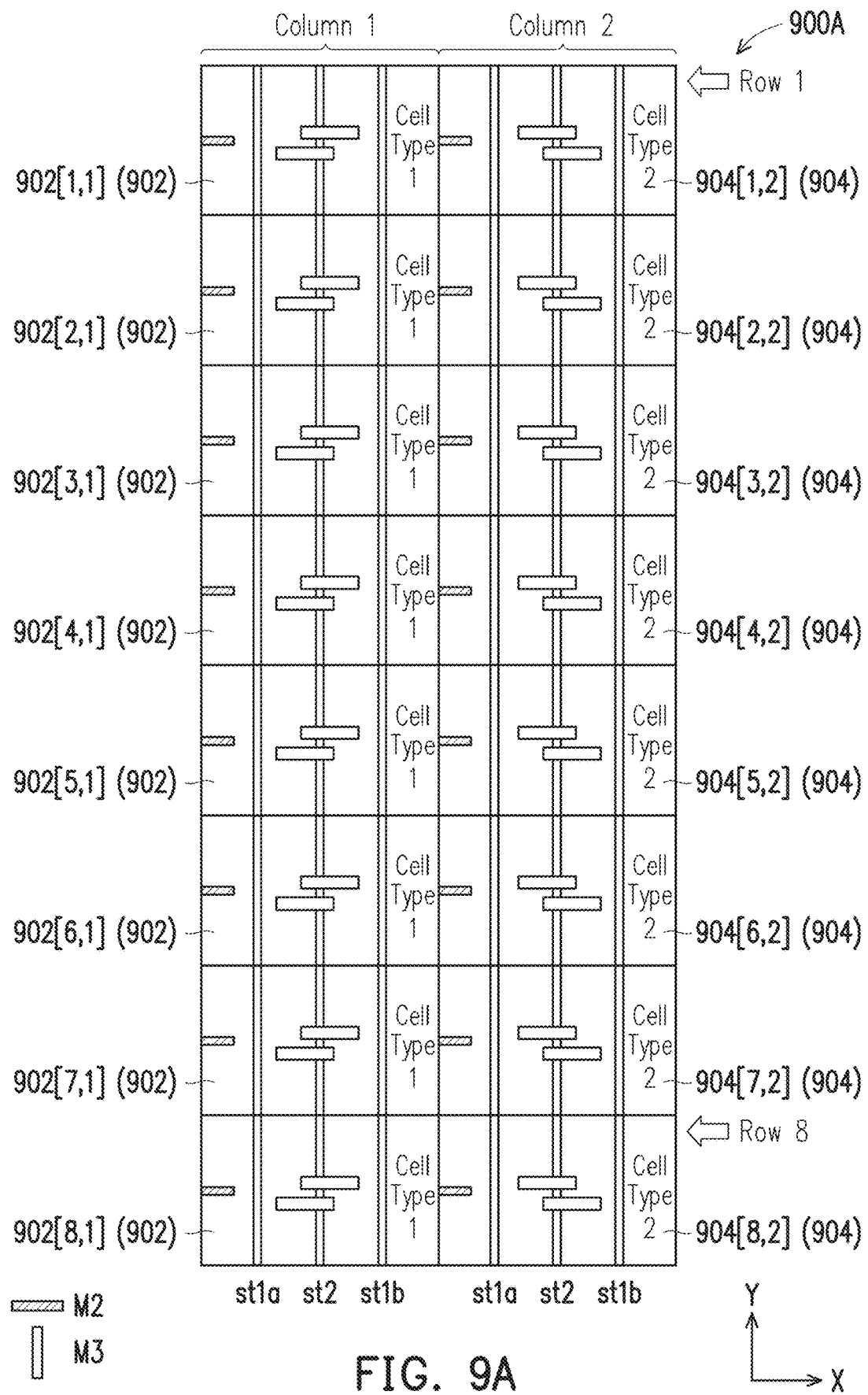
FIG. 9A is a schematic diagram of a PUF cell array, in accordance with some embodiments.

FIG. 9A is a schematic diagram of a PUF cell array 900A, in accordance with some embodiments.

PUF cell array 900A is a variation of PUF cell array 800A. In comparison with PUF cell array 800A, array of PUF cells 902[1,1], 902[1,2], . . . , 902[8,2] (collectively referred to as "array of PUF cells 902") replaces array of PUF cells 802.

PUF cell array 900A comprises an array of PUF cells 902[1,1], 902[1,2], . . . , 902[8,2], (collectively referred to as "array of PUF cells 902") having 8 rows and 2 columns. In some embodiments, at least other number of columns or other number of rows for PUF cell array 900A are within the contemplated scope of the present disclosure.

At least PUF cell 400A, 400B, 700A or 700B is usable as one or more PUF cells in PUF cell array 900A.

In some embodiments, column 1 of PUF cell array 900A includes cell type 1A or cell type 1B arranged in the second direction Y. In some embodiments, column 1 of PUF cell array 900A includes PUF cell 400A or PUF cell 400B arranged in the second direction Y.

In some embodiments, column 2 of PUF cell array 900A includes cell type 2A or cell type 2B arranged in the second direction Y. In some embodiments, column 2 of PUF cell array 900A includes PUF cell 700A or PUF cell 400B arranged in the second direction Y.

In some embodiments, PUF cell array 900A is an array of layout designs, such as one or more of layout design 200A, 200L, 500A or 500L. For example, in these embodiments, PUF cell 400A or 400B is usable as PUF cells 902[8,1], 902[7,1], 902[6,1], 902[5,1], 902[4,1], 902[3,1], 902[2,1] and 902[1,1] in PUF cell array 900A. In these embodiments, PUF cell 700A or 700B is usable as PUF cells 902[8,2], 902[7,2], 902[6,2], 902[5,2], 902[4,2], 902[3,2], 902[2,2] and 902[1,2] in PUF cell array 900A.

In some embodiments, PUF cell array 900A is an array of integrated circuits, such as one or more of integrated circuit 300A or 600A. For example, in these embodiments, PUF cell 400A' or 400B' is usable as PUF cells 902[8,1], 902[7,1], 902[6,1], 902[5,1], 902[4,1], 902[3,1], 902[2,1] and 902[1,1] in PUF cell array 900A. In these embodiments, PUF cell 700A' or 700B' is usable as PUF cells 902[8,2], 902[7,2], 902[6,2], 902[5,2], 902[4,2], 902[3,2], 902[2,2] and 902[1,2] in PUF cell array 900A.

Figure 9B:
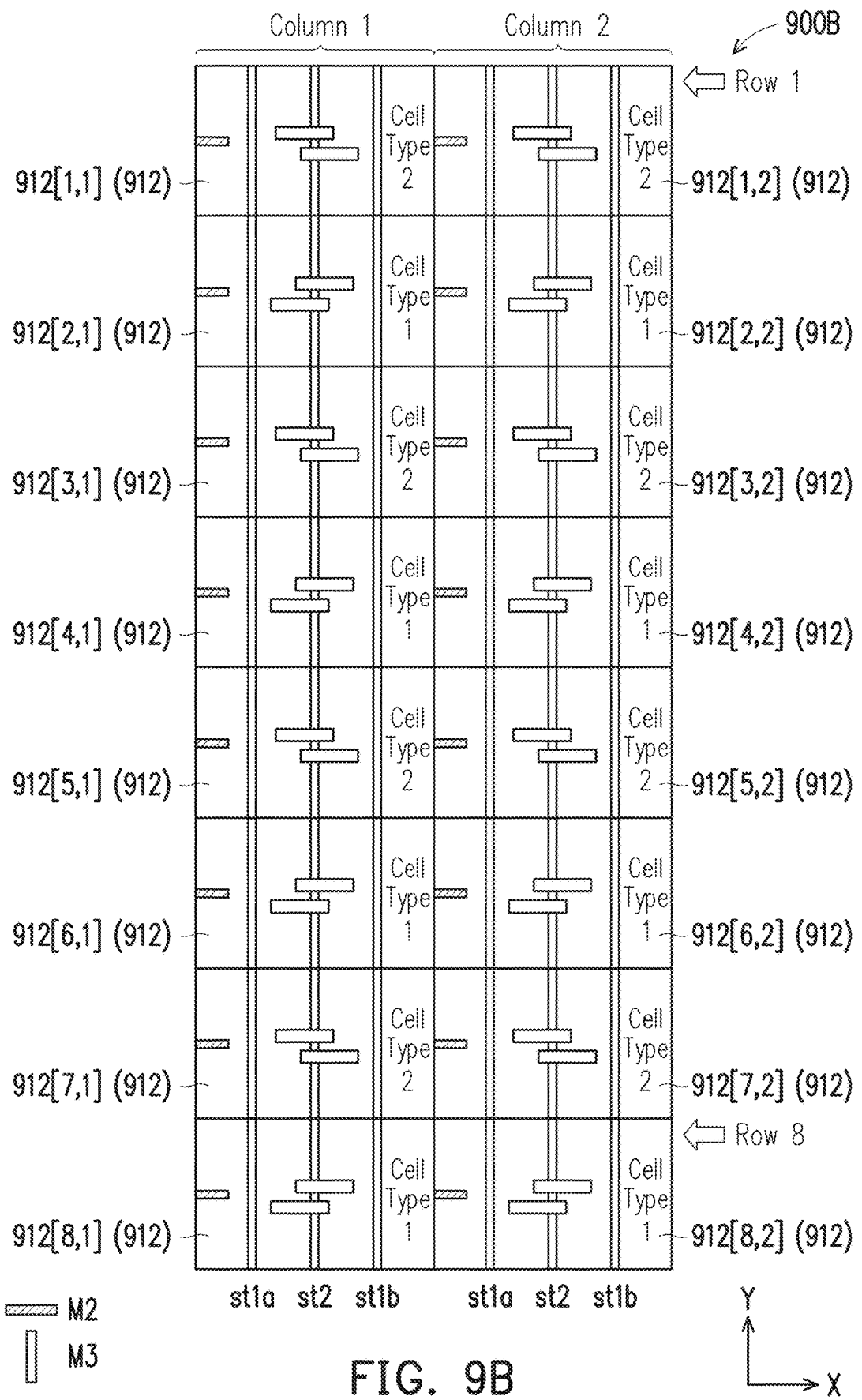
FIG. 9B is a schematic diagram of a PUF cell array, in accordance with some embodiments.

FIG. 9B is a schematic diagram of a PUF cell array 900B, in accordance with some embodiments.

PUF cell array 900B is a variation of PUF cell array 800A. In comparison with PUF cell array 800A, array of PUF cells 912[1,1], 912[1,2], . . . , 912[8,2] (collectively referred to as "array of PUF cells 902") replaces array of PUF cells 802.

PUF cell array 900B comprises an array of PUF cells 912[1,1], 912[1,2], . . . , 912[8,2], (collectively referred to as "array of PUF cells 902") having 8 rows and 2 columns. In some embodiments, at least other number of columns or other number of rows for PUF cell array 900B are within the contemplated scope of the present disclosure.

At least PUF cell 400A, 400B, 700A or 700B is usable as one or more PUF cells in PUF cell array 900B.

In some embodiments, PUF cell array 900B includes cell type 1A or cell type 1B interleaved row by row with cell type 2A or cell type 2B.

In some embodiments, rows 2, 4, 6 and 8 of PUF cell array 900B includes cell type 1A or cell type 1B arranged in the first direction X. In some embodiments, rows 2, 4, 6 and 8 of PUF cell array 900B includes PUF cell 400A or PUF cell 400B arranged in the first direction X.

In some embodiments, rows 1, 3, 5 and 7 of PUF cell array 900B includes cell type 2A or cell type 2B arranged in the first direction X. In some embodiments, rows 1, 3, 5 and 7 of PUF cell array 900B includes PUF cell 700A or PUF cell 400B arranged in the first direction X.

In some embodiments, PUF cell array 900B is an array of layout designs, such as one or more of layout design 200A, 200L, 500A or 500L. For example, in these embodiments, PUF cell 400A or 400B is usable as PUF cells 912[8,1], 912[8,2], 912[6,1], 912[6,2], 912[4,1], 912[4,2], 912[2,1] and 912[2,2] in PUF cell array 900B. In these embodiments, PUF cell 700A or 700B is usable as PUF cells 912[7,1], 912[7,2], 912[5,1], 912[5,2], 912[3,1], 912[3,2], 912[1,1] and 912[1,2] in PUF cell array 900B.

In some embodiments, PUF cell array 900B is an array of integrated circuits, such as one or more of integrated circuit 300A or 600A. For example, in these embodiments, PUF cell 400A' or 400B' is usable as PUF cells 912[8,1], 912[8,2], 912[6,1], 912[6,2], 912[4,1], 912[4,2], 912[2,1] and 912[2,2] in PUF cell array 900B. In these embodiments, PUF cell 700A' or 700B' is usable as PUF cells 912[7,1], 912[7,2], 912[5,1], 912[5,2], 912[3,1], 912[3,2], 912[1,1] and 912[1,2] in PUF cell array 900B.

Figure 9C:
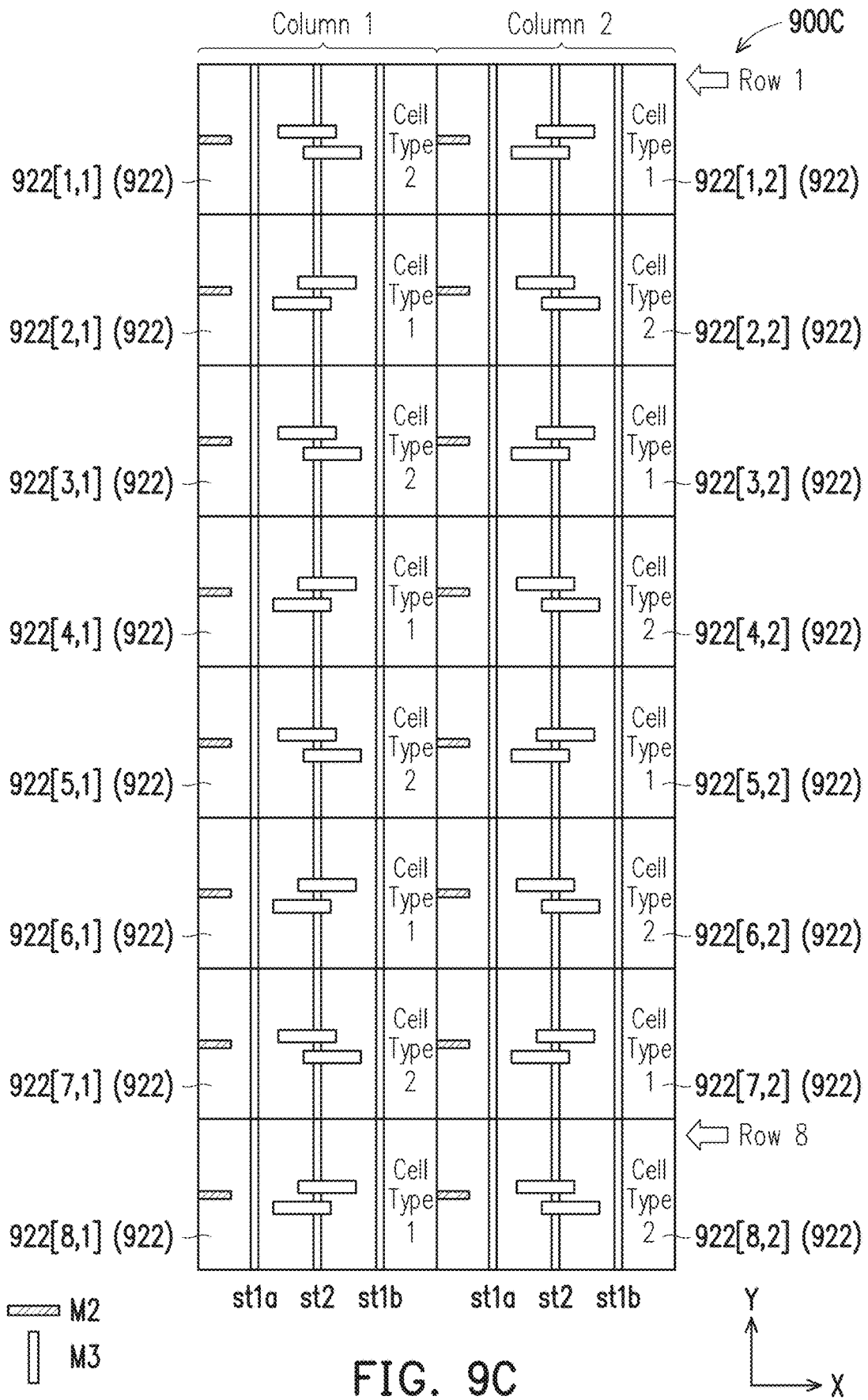
FIG. 9C is a schematic diagram of a PUF cell array, in accordance with some embodiments.

FIG. 9C is a schematic diagram of a PUF cell array 900C, in accordance with some embodiments.

PUF cell array 900C is a variation of PUF cell array 800B. In comparison with PUF cell array 800A, array of PUF cells 922[1,1], 922[1,2], . . . , 922[8,2] (collectively referred to as "array of PUF cells 922") replaces array of PUF cells 804.

PUF cell array 900C comprises an array of PUF cells 922[1,1], 922[1,2], . . . , 922[8,2], (collectively referred to as "array of PUF cells 922") having 8 rows and 2 columns. In some embodiments, at least other number of columns or other number of rows for PUF cell array 900C are within the contemplated scope of the present disclosure.

At least PUF cell 400A, 400B, 700A or 700B is usable as one or more PUF cells in PUF cell array 900C.

In some embodiments, PUF cell array 900C includes cell type 1A or cell type 1B interleaved row by row and column by column with cell type 2A or cell type 2B.

In some embodiments, column 1 of PUF cell array 900C includes cell type 1 and cell type 2 alternating with each other in the second direction Y. In some embodiments, column 1 of PUF cell array 900C includes PUF cell 400A and PUF cell 700A alternating with each other in the second direction Y. In some embodiments, column 1 of PUF cell array 900C includes PUF cell 400B and PUF cell 700B alternating with each other in the second direction Y.

In some embodiments, column 2 of PUF cell array 900C includes cell type 2 and cell type 1 alternating with each other in the second direction Y. In some embodiments, column 2 of PUF cell array 900C includes PUF cell 700A and PUF cell 400A alternating with each other in the second direction Y. In some embodiments, column 2 of PUF cell array 900C includes PUF cell 700B and PUF cell 400B alternating with each other in the second direction Y.

In some embodiments, PUF cell array 900C is an array of layout designs, such as one or more of layout design 200A, 200L, 500A or 500L. For example, in these embodiments, PUF cell 400A or 400B is usable as PUF cells 922[8,1], 922[7,2], 922[6,1], 922[5,2], 922[4,1], 922[3,2], 922[2,1] and 922[1,2] in PUF cell array 900C. In these embodiments, PUF cell 700A or 700B is usable as PUF cells 922[7,1], 922[7,2], 922[5,1], 922[5,2], 922[3,1], 922[3,2], 922[1,1] and 922[1,2] in PUF cell array 900C.

In some embodiments, PUF cell array 900C is an array of integrated circuits, such as one or more of integrated circuit 300A or 600A. For example, in these embodiments, PUF cell 400A' or 400B' is usable as PUF cells 922[8,1], 922[7,2], 922[6,1], 922[5,2], 922[4,1], 922[3,2], 922[2,1] and 922[1,2] in PUF cell array 900C. In these embodiments, PUF cell 700A' or 700B' is usable as PUF cells 922[7,1], 922[7,2], 922[5,1], 922[5,2], 922[3,1], 922[3,2], 922[1,1] and 922[1,2] in PUF cell array 900C.

Figure 9D:
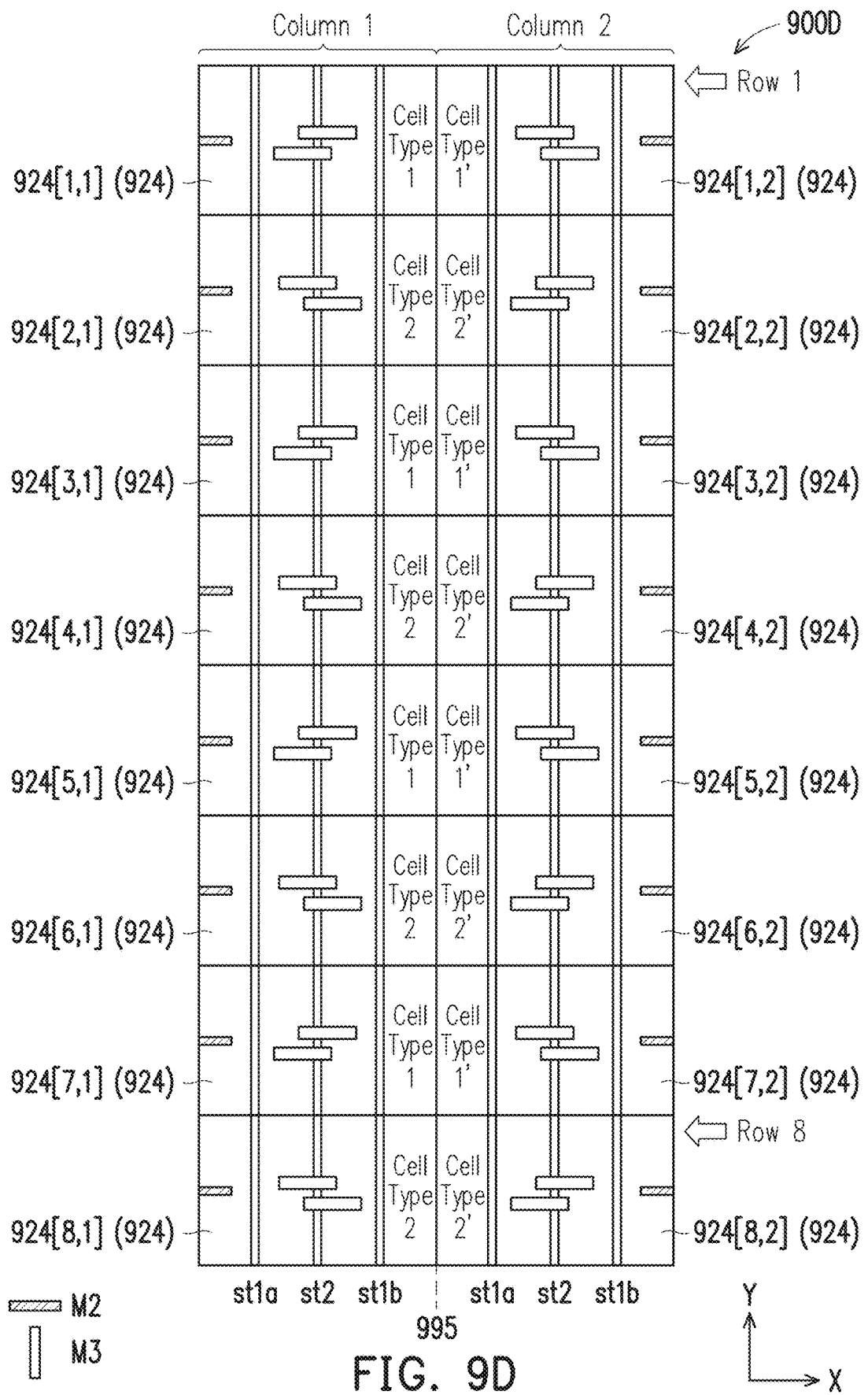
FIG. 9D is a schematic diagram of a PUF cell array, in accordance with some embodiments.

FIG. 9D is a schematic diagram of a PUF cell array 900D, in accordance with some embodiments.

PUF cell array 900D is a variation of PUF cell array 900B. In comparison with PUF cell array 800A, array of PUF cells 924[1,1], 924[1,2], . . . , 924[8,2] (collectively referred to as "array of PUF cells 924") replaces array of PUF cells 912.

PUF cell array 900D comprises an array of PUF cells 924[1,1], 924[1,2], . . . , 924[8,2], (collectively referred to as "array of PUF cells 924") having 8 rows and 2 columns. In some embodiments, at least other number of columns or other number of rows for PUF cell array 900D are within the contemplated scope of the present disclosure.

At least PUF cell 400A, 400B, 700A or 700B is usable as one or more PUF cells in PUF cell array 900D.

In some embodiments, column 2 of PUF cell array 900D is symmetric to column 1 of PUF cell array 900D with respect to a line 995 in the second direction Y.

In some embodiments, column 1 of PUF cell array 900D includes cell type 1 and cell type 2 alternating with each other in the second direction Y. In some embodiments, column 1 of PUF cell array 900D includes PUF cell 400A and PUF cell 700A alternating with each other in the second direction Y. In some embodiments, column 1 of PUF cell array 900D includes PUF cell 400B and PUF cell 700B alternating with each other in the second direction Y.

In some embodiments, column 2 of PUF cell array 900D includes a cell type 2' and a cell type 1' alternating with each other in the second direction Y. In some embodiments, cell type 2' is symmetric to cell type 2 with respect to line 995 in the second direction Y. In some embodiments, cell type 1' is symmetric to cell type 1 with respect to line 995 in the second direction Y.

In some embodiments, column 2 of PUF cell array 900D includes a first PUF cell (e.g., cell type 1' or cell type 2') symmetric to PUF cell 400A with respect to line 995 and a second PUF cell (e.g., cell type 2' or cell type 1') symmetric to PUF cell 700A with respect to line 995 alternating with each other in the column direction (e.g., second direction Y). In some embodiments, column 2 of PUF cell array 900D includes a first PUF cell (e.g., cell type 1' or cell type 2') symmetric to PUF cell 400A' with respect to line 995 and a second PUF cell (e.g., cell type 2' or cell type 1') symmetric to PUF cell 700A' with respect to line 995 alternating with each other in the column direction (e.g., second direction Y).

In some embodiments, PUF cell array 900D is an array of layout designs, such as one or more of layout design 200A, 200L, 500A or 500L. For example, in these embodiments, PUF cell 400A or 400B is usable as PUF cells 924[7,1], 924[5,1], 924[3,1] and 924[1,1] in PUF cell array 900D. In these embodiments, a PUF cell symmetric to PUF cell 400A or 400B with respect to at least line 495a or 495b in the second direction Y is usable as PUF cells 924[7,2], 924[5,2], 924[3,2] and 924[1,2] in PUF cell array 900D. In these embodiments, PUF cell 700A or 700B is usable as PUF cells 924[8,1], 924[6,1], 924[4,1] and 924[2,1] in PUF cell array 900D. In these embodiments, a PUF cell symmetric to PUF cell 700A or 700B with respect to at least line 495a or 495b in the second direction Y is usable as PUF cells 924[8,2], 924[6,2], 924[4,2] and 924[2,2] in PUF cell array 900D.

In some embodiments, PUF cell array 900D is an array of integrated circuits, such as one or more of integrated circuit 300A or 600A. For example, in these embodiments, PUF cell 400A' or 400B' is usable as PUF cells 924[7,1], 924[5,1], 924[3,1] and 924[1,1] in PUF cell array 900D. In these embodiments, a PUF cell symmetric to PUF cell 400A' or 400B' with respect to at least line 495a or 495b in the second direction Y is usable as PUF cells 924[7,2], 924[5,2], 924[3,2] and 924[1,2] in PUF cell array 900D. In these embodiments, PUF cell 700A' or 700B' is usable as PUF cells 924[8,1], 924[6,1], 924[4,1] and 924[2,1] in PUF cell array 900D. In these embodiments, a PUF cell symmetric to PUF cell 700A' or 700B' with respect to at least line 495a or 495b in the second direction Y is usable as PUF cells 924[8,2], 924[6,2], 924[4,2] and 924[2,2] in PUF cell array 900D.

In some embodiments, signals st1a, st2, and st1b are received from edge 803' in the second direction Y. In some embodiments, by having each of signals st1a and st1b received from edge 803' in the same direction, a delay associated with the corresponding path for corresponding signals st1a and st1b is similar reducing possible systematic bias in each of PUF cell array 900A, 900B, 900C or 900D.

In some embodiments, for at least PUF cell array 900A, 900B, 900C or 900D, at least a number of PUF cells 400A, a number of PUF cells 400B, a number of PUF cells 700A or a number of PUF cells 700B is equal to at least another of a number of PUF cells 400A, a number of PUF cells 400B, a number of PUF cells 700A or a number of PUF cells 700B.

In some embodiments, for at least PUF cell array 900A, 900B, 900C or 900D, at least a number of PUF cells 400A', a number of PUF cells 400B', a number of PUF cells 700A' or a number of PUF cells 700B' is equal to at least another of a number of PUF cells 400A', a number of PUF cells 400B', a number of PUF cells 700A' or a number of PUF cells 700B'.

In some embodiments, by having a same number of PUF cells 400A, 400B, 700A and 700B in PUF cell array such as at least PUF cell array 900A, 900B, 900C or 900D, a delay associated with the corresponding path for corresponding signals st1a and st1b is similar resulting in less systematic bias and resulting in at least PUF cell array 900A, 900B, 900C or 900D having better performance than other approaches.

Other configurations, arrangements or different types of PUF cells in at least PUF cell array 900A, 900B, 900C or 900D are within the contemplated scope of the present disclosure.

Figure 10:
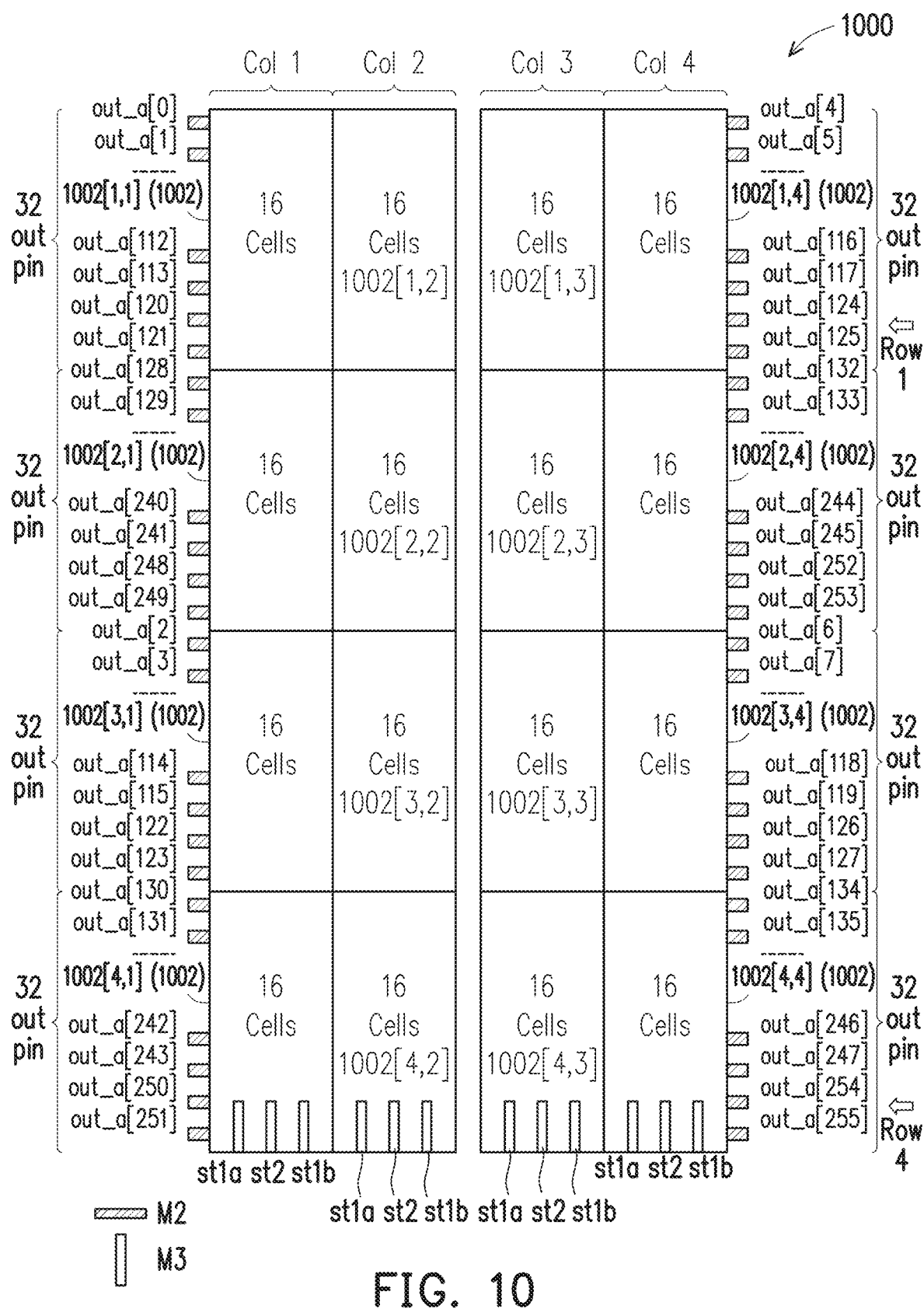
FIG. 10 is a schematic diagram of a PUF cell array, in accordance with some embodiments.

FIG. 10 is a schematic diagram of a PUF cell array 1000, in accordance with some embodiments.

PUF cell array 1000 comprises an array of a group of PUF cells 1002[1,1], 1002[1,2], . . . , 1002[4,4], (collectively referred to as "array of a group of PUF cells 1002") having 4 rows and 4 columns. In some embodiments, at least other number of columns or other number of rows for PUF cell array 1000 are within the contemplated scope of the present disclosure. The rows of PUF cells in PUF cell array 1000 are arranged in the first direction X. The columns of PUF cells in PUF cell array 1000 are arranged in the second direction Y.

At least PUF cell array 800A, 800B, 900A, 900B, 900C or 900D is usable as one or more groups of PUF cells 1002 in PUF cell array 1000. In some embodiments, each PUF cell in the group of PUF cells 1002 includes a corresponding output pin (e.g., output pin 460a) and a corresponding address out_a[0], . . . , out[255]. In some embodiments, the addresses of the corresponding output pins in the group of PUF cells 1002 is randomly arranged. Each group of PUF cells 1002 includes 16 PUF cells. In some embodiments, at least one group of PUF cells 1002 includes other numbers of PUF cells, addresses, or output pins and is within the contemplated scope of the present disclosure.

In some embodiments, the output pins of columns 1 and 2 are located along the edge 1020 of PUF cell array 1000, and the output pins of columns 3 and 4 are located along the edge 1022 of PUF cell array 1000. Other arrangements for the positions of output pins are within the scope of the present disclosure.

In some embodiments, each row of group of PUF cells 1002 includes output pins and corresponding addresses out_a[0], . . . , out[255] from 2 columns. For example, row 1 and columns 1 and 2 include 32 total PUF cells from group of PUF cells 1002[1,1] and 1002[1,2], and 32 output pins and 32 addresses (e.g., out_a[0], out_a[1], . . . , out_a[112], out_a[113], out_a[120], out_a[121], and out_a[128].) In some embodiments, the addresses out_a[0], out_a[1], . . . , out_a[112], out_a[113], out_a[120], out_a[121], and out_a[128] of each corresponding output pin is randomly arranged. Similarly, for example, row 1 and columns 3 and 4 includes 32 total PUF cells from group of PUF cells 1002[1,3] and 1002[1,4], and 32 output pins and 32 addresses (e.g., out_a[4], out_a[5], . . . , out_a[116], out_a[117], out_a[124], out_a[125], and out_a[132].) In some embodiments, the addresses out_a[4], out_a[5], . . . , out_a[116], out_a[117], out_a[124], out_a[125], and out_a[132] of each corresponding output pin is randomly arranged.

In some embodiments, by randomly arranging the address of each PUF cell in the group of PUF cells 1002 or PUF cell array 1000 thereby results in PUF cell array 1000 having less systematic bias and better performance than other approaches.

Other configurations, arrangements or different types of PUF cells in PUF cell array 1000 are within the contemplated scope of the present disclosure.

Figure 11:
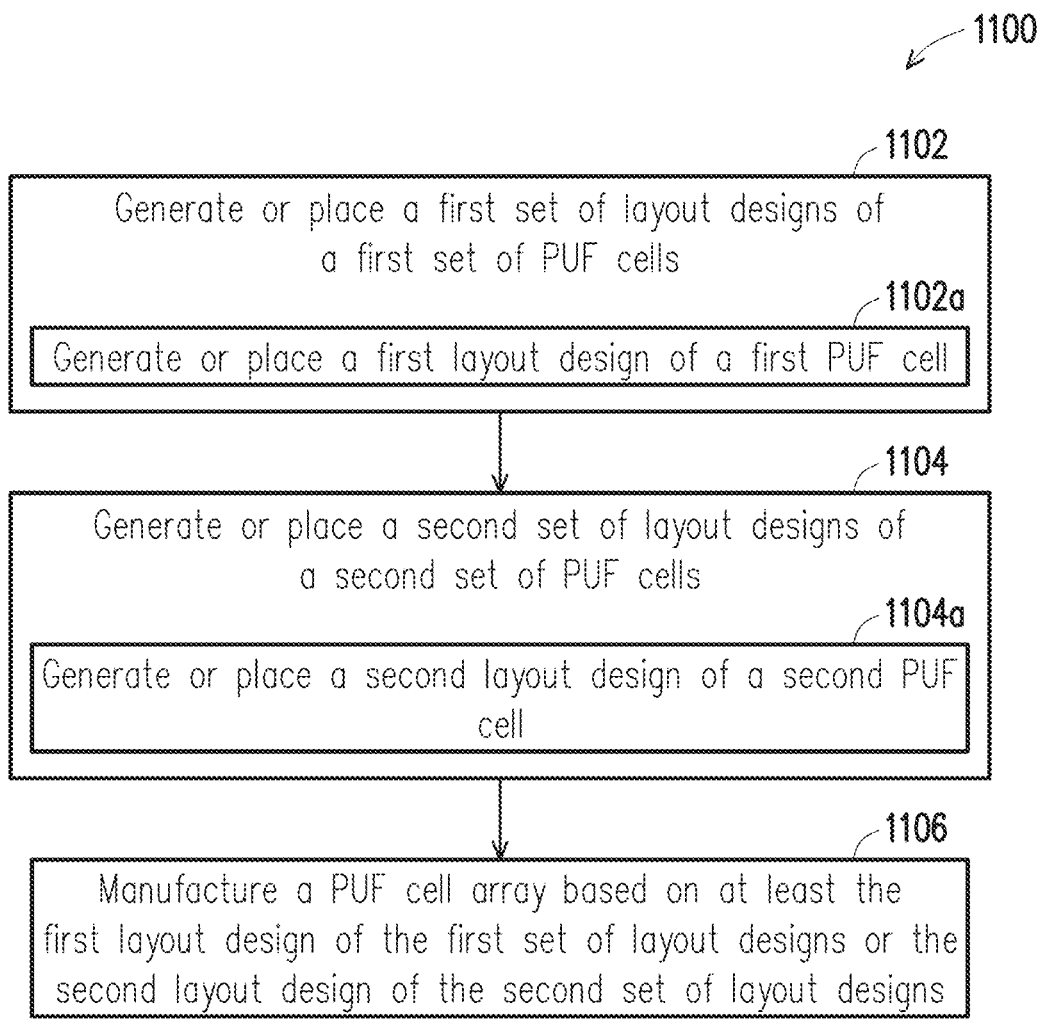
FIG. 11 is a flowchart of a method of forming or manufacturing an integrated circuit, in accordance with some embodiments.

FIG. 11 is a flowchart of a method 1100 of forming or manufacturing an integrated circuit in accordance with some embodiments. It is understood that additional operations may be performed before, during, and/or after the method 1100 depicted in FIG. 11, and that some other operations may only be briefly described herein. In some embodiments, the method 1100 is usable to form integrated circuits, such as at least integrated circuit 300A or 600A (FIGS. 3A-3C & 6A-6C), a PUF cell 1A (FIG. 1A), a PUF cell similar to PUF cell 400A' or 400B' (FIGS. 4A-4B) or PUF cell 700A' or 700B' (FIGS. 7A-7B), PUF cell arrays 800A-800B (FIGS. 8A-8B), PUF cell arrays 900A-900D (FIGS. 9A-9B) or PUF cell array 1000 (FIG. 10). In some embodiments, the method 1100 is usable to form integrated circuits having similar structural relationships as one or more of at least layout design 200A, 200L, 500A, 500L (FIGS. 2A-2L & 5A-5L), PUF cell 400A or 400B (FIGS. 4A-4B) or PUF cell 700A or 700B (FIGS. 7A-7B), PUF cell arrays 800A-800B (FIGS. 8A-8B), PUF cell arrays 900A-900D (FIGS. 9A-9B) or PUF cell array 1000 (FIG. 10).

In operation 1102 of method 1100, a first set of layout designs of a first set of PUF cells is generated or placed. Operation 1102 is performed by a processing device (e.g., processor 1302 (FIG. 13)) configured to execute instructions for generating a layout design. In some embodiments, placing the first set of layout designs of operation 1102 includes placing the first set of layout designs in at least column 1 or column 2, in the second direction Y.

In some embodiments, the first set of layout designs of method 1100 includes one or more of at least layout design 200A, 200L, 500A or 500L, PUF cell 400A, 400B, 700A or 700B or PUF cell array 800A, 800B, 900A, 900B, 900C, 900D or 1000.

In some embodiments, generating or placing the first set of layout designs of operation 1102 includes operation 1102a. In some embodiments, operation 1102a includes generating or placing a first layout design of a first PUF cell. In some embodiments, placing the first layout design of operation 1102a includes placing the first layout design in at least column 1 or column 2, in the second direction Y.

In some embodiments, the first layout design of method 1100 includes one or more of at least layout design 200A, 200L, 500A or 500L, PUF cell 400A, 400B, 700A or 700B or PUF cell array 800A, 800B, 900A, 900B, 900C, 900D or 1000.

In operation 1104 of method 1100, a second set of layout designs of a second set of PUF cells is generated or placed. Operation 1104 is performed by a processing device (e.g., processor 1302 (FIG. 13)) configured to execute instructions for generating a layout design. In some embodiments, placing the second set of layout designs of operation 1104 includes placing the second set of layout designs in at least column 1 or column 2, in the second direction Y.

In some embodiments, the second set of layout designs of method 1100 includes one or more of at least layout design 200A, 200L, 500A or 500L, PUF cell 400A, 400B, 700A or 700B or PUF cell array 800A, 800B, 900A, 900B, 900C, 900D or 1000.

In some embodiments, generating or placing the second set of layout designs of operation 1104 includes operation 1104a. In some embodiments, operation 1104a includes generating or placing a second layout design of a second PUF cell. In some embodiments, placing the second layout design of operation 1104a includes placing the second layout design in at least column 1 or column 2, in the second direction Y.

In some embodiments, the second layout design of method 1100 includes one or more of at least layout design 200A, 200L, 500A or 500L, PUF cell 400A, 400B, 700A or 700B or PUF cell array 800A, 800B, 900A, 900B, 900C, 900D or 1000.

In some embodiments, at least the first or second set of PUF cells or the first or second PUF cell of method 1100 includes one or more of at least PUF cell 100A, PUF cell 400A, 400B, 700A or 700B, PUF cell array 800A, 800B, 900A, 900B, 900C or 900D or PUF cell array 1000.

In some embodiments, at least layout design 200A, 200L, 500A or 500L, PUF cell 400A, 400B, 700A or 700B, PUF cell arrays 800A-800B or 900A-900D or PUF cell array 1000 is a graphic database system (GDSII) file format.

In operation 1106 of method 1100, the integrated circuit is manufactured based on the layout design. In some embodiments, the integrated circuit of method 1100 includes one or more of integrated circuit 300A or 600A (FIGS. 3A-3C & 6A-6C), a PUF cell 1A (FIG. 1A), a PUF cell similar to PUF cell 400A' or 400B' (FIGS. 4A-4B) or PUF cell 700A' or 700B' (FIGS. 7A-7B), PUF cell arrays 800A-800B (FIGS. 8A-8B), PUF cell arrays 900A-900D (FIGS. 9A-9B) or PUF cell array 1000 (FIG. 10). In some embodiments, operation 1106 of method 1100 comprises manufacturing at least one mask based on at least the first layout design of the first set of layout designs or the second layout design of the second set of layout designs, and manufacturing the integrated circuit based on the at least one mask.

In some embodiments, one or more of operations 1102, 1102a, 1104, 1104a or 1106 is not performed.

Figure 12:
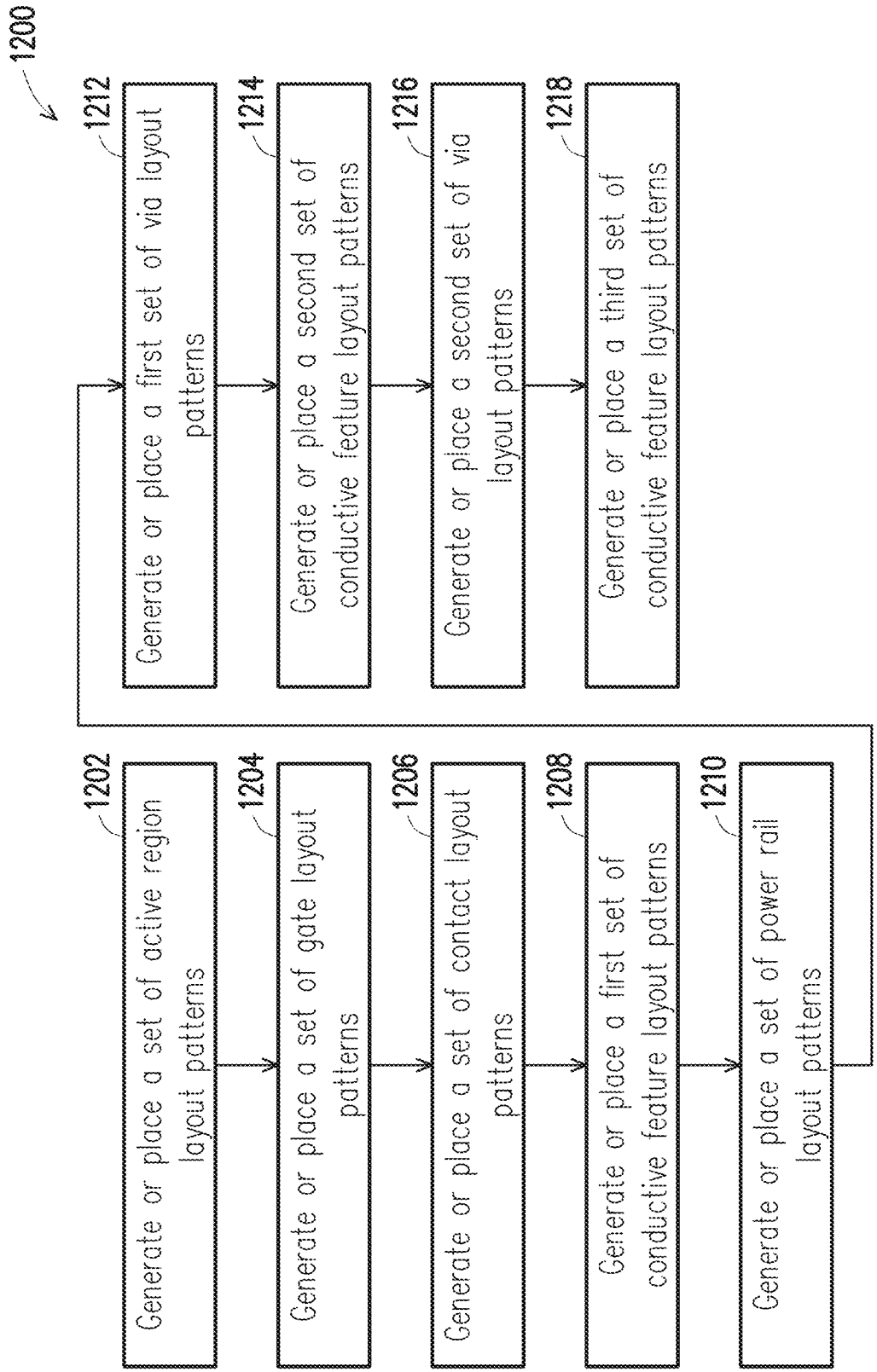
FIG. 12 is a flowchart of a method of generating a layout design of an integrated circuit, in accordance with some embodiments.

FIG. 12 is a flowchart of a method 1200 of generating a layout design of an integrated circuit, in accordance with some embodiments. It is understood that additional operations may be performed before, during, and/or after the method 1200 depicted in FIG. 12, and that some other processes may only be briefly described herein. In some embodiments, method 1200 is an embodiment of at least operation 1102a or 1104a of method 1100. In some embodiments, the method 1200 is usable to generate one or more layout patterns of at least layout design 200A, 200L, 500A, 500L (FIGS. 2A-2L & 5A-5L), PUF cell 400A or 400B (FIGS. 4A-4B) or PUF cells 700A or 700B (FIGS. 7A-7B), PUF cell arrays 800A-800B (FIGS. 8A-8B), PUF cell arrays 900A-900D (FIGS. 9A-9B) or PUF cell array 1000 (FIG. 10) of an integrated circuit. In some embodiments, the layout patterns of method 1200 are usable to manufacture an integrated circuit, such as at least integrated circuit 300A or 600A (FIGS. 3A-3C & 6A-6C), a PUF cell 1A (FIG. 1A), a PUF cell similar to PUF cell 400A' or 400B' (FIGS. 4A-4B) or PUF cells 700A' or 700B' (FIGS. 7A-7B), PUF cell arrays 800A-800B (FIGS. 8A-8B), PUF cell arrays 900A-900D (FIGS. 9A-9B) or PUF cell array 1000 (FIG. 10).

In operation 1202 of method 1200, a set of active region layout patterns is generated or placed on layout design 200A, 200L, 500A or 500L. In some embodiments, the set of active region layout patterns of method 1200 includes at least portions of one or more layout patterns of the set of active region layout patterns 202.

In some embodiments, operation 1202 includes generating or placing a set of active region layout patterns corresponding to fabricating a set of active regions of the integrated circuit. In some embodiments, the set of active region layout patterns of method 1200 includes at least portions of one or more layout patterns of the set of active region layout patterns 202. In some embodiments, least the set of active regions of method 1200 includes at least portions of one or more active regions of the set of active regions 302.

In operation 1204 of method 1200, a set of gate layout patterns is generated or placed on layout design 200A, 200L, 500A or 500L. In some embodiments, the set of gate layout patterns of method 1200 includes at least portions of one or more layout patterns of the set of gate layout patterns 204. In some embodiments, the set of gate layout patterns of method 1200 correspond to fabricating a set of gates 304.

In operation 1206 of method 1200, a set of contact layout patterns is generated or placed on layout design 200A, 200L, 500A or 500L. In some embodiments, the set of contact layout patterns of method 1200 includes at least portions of one or more layout patterns of the set of contact layout patterns 208, 209, 240, 242, 540 or 542. In some embodiments, the set of contact layout patterns of method 1200 correspond to fabricating a set of contacts 308, 309, 340, 342, 640 or 642. In some embodiments, the set of contact layout patterns of method 1200 includes via layout patterns located on VD or VG of layout design 200A, 200L, 500A or 500L.

In operation 1208 of method 1200, a first set of conductive feature layout patterns is generated or placed on layout design 200A, 200L, 500A or 500L. In some embodiments, the first set of conductive feature layout patterns of method 1200 includes at least portions of one or more layout patterns of the set of conductive feature layout patterns 210 or 510. In some embodiments, the first set of conductive feature layout patterns of method 1200 corresponds to fabricating a first set of conductive structures 310 or 610. In some embodiments, the first set of conductive feature layout patterns of method 1200 includes at least portions of one or more layout patterns of conductive feature layout patterns 211*a*, 221, 511*a* or 521. In some embodiments, the first set of conductive structures of method 1200 includes at least portions of one or more of conductive structure 311*a*, 321, 611*a* or 621.

In operation 1210 of method 1200, a set of power rail layout patterns is generated or placed on layout design 200A, 200L, 500A or 500L. In some embodiments, the set of power rail layout patterns of method 1200 includes at least portions of one or more layout patterns of the set of power rail layout patterns 228. In some embodiments, the set of power rail layout patterns of method 1200 corresponds to fabricating a set of power rails 328.

In operation 1212 of method 1200, a first set of via layout patterns is generated or placed on layout design 200A, 200L, 500A or 500L. In some embodiments, the first set of via layout patterns of method 1200 includes at least portions of one or more layout patterns of the set of via layout patterns 236. In some embodiments, the first set of via layout patterns of method 1200 correspond to fabricating a first set of vias 336.

In operation 1214 of method 1200, a second set of conductive feature layout patterns is generated or placed on layout design 200A, 200L, 500A or 500L. In some embodiments, the second set of conductive feature layout patterns of method 1200 includes at least portions of one or more layout patterns of the set of conductive feature layout patterns 230. In some embodiments, the second set of conductive feature layout patterns of method 1200 corresponds to fabricating a second set of conductive structures 330.

In operation 1216 of method 1200, a second set of via layout patterns is generated or placed on layout design 200A, 200L, 500A or 500L. In some embodiments, the second set of via layout patterns of method 1200 includes at least portions of one or more layout patterns of the set of via layout patterns 252. In some embodiments, the second set of via layout patterns of method 1200 correspond to fabricating a second set of vias 352.

In operation 1218 of method 1200, a third set of conductive feature layout patterns is generated or placed on layout design 200A, 200L, 500A or 500L. In some embodiments, the third set of conductive feature layout patterns of method 1200 includes at least portions of one or more layout patterns of the set of conductive feature layout patterns 250. In some embodiments, the third set of conductive feature layout patterns of method 1200 corresponds to fabricating a third set of conductive structures 350.

In some embodiments, one or more of operations 1202, 1204, 1206, 1208, 1210, 1212, 1214, 1216 or 1218 is not performed. In some embodiments, one or more of operations 1202, 1204, 1206, 1208, 1210, 1212, 1214, 1216 or 1218 is performed multiple times. One or more of the operations of methods 1100-1200 is performed by a processing device configured to execute instructions for manufacturing an integrated circuit, such as at least integrated circuit 300A, 600A, PUF cell 1A, a PUF cell similar to PUF cell 400A' or 400B' (FIGS. 4A-4B) or PUF cells 700A' or 700B' (FIGS. 7A-7B), PUF cell arrays 800A-800B, PUF cell arrays 900A-900D or PUF cell array 1000.

In some embodiments, one or more operations of methods 1100-1200 is performed using a same processing device as that used in a different one or more operations of methods 1100-1200. In some embodiments, a different processing device is used to perform one or more operations of methods 1100-1200 from that used to perform a different one or more operations of methods 1100-1200.

Figure 13:
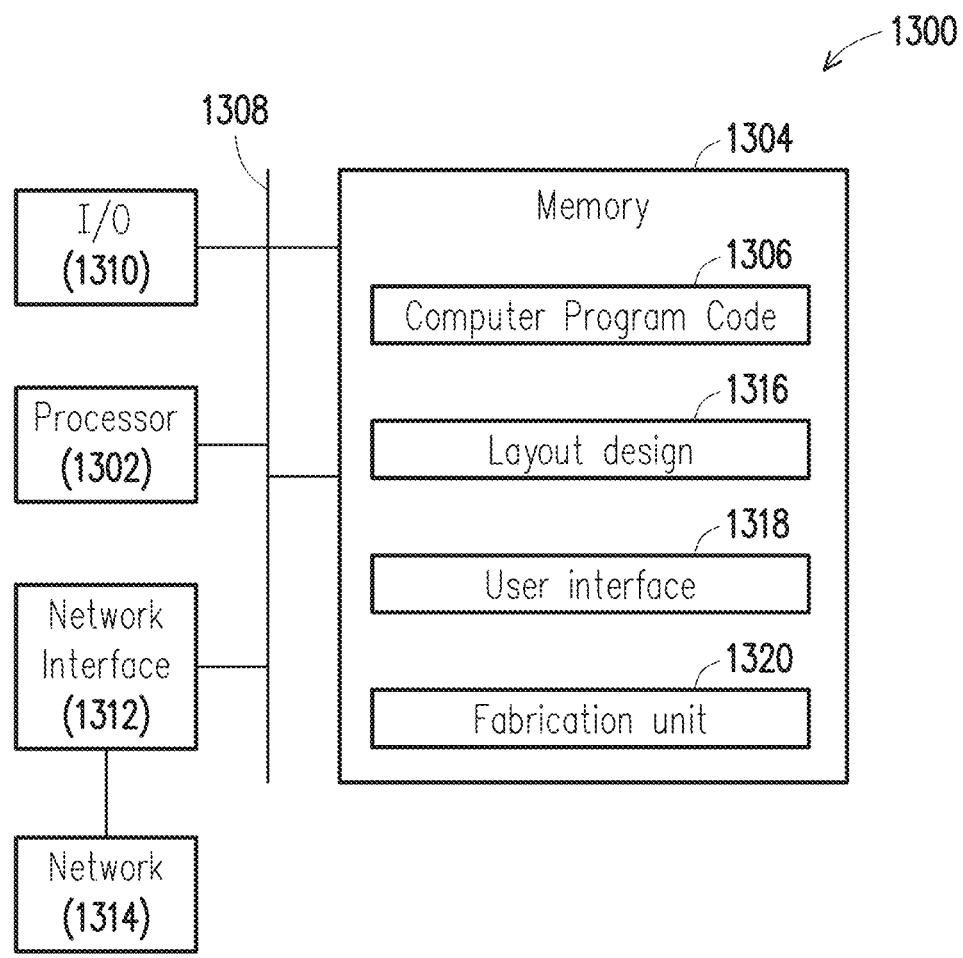
FIG. 13 is a block diagram of a system for designing and manufacturing an IC layout design, in accordance with some embodiments.

FIG. 13 is a block diagram of a system 1300 for designing and manufacturing an IC layout design, in accordance with some embodiments. In some embodiments, system 1300 generates or places one or more IC layout designs described herein. In some embodiments, system 1300 manufactures one or more ICs based on the one or more IC layout designs described herein. System 1300 includes a hardware processor 1302 and a non-transitory, computer readable storage medium 1304 encoded with, i.e., storing, the computer program code 1306, i.e., a set of executable instructions. Computer readable storage medium 1304 is configured for interfacing with manufacturing machines for producing the integrated circuit. The processor 1302 is electrically coupled to the computer readable storage medium 1304 by a bus 1308. The processor 1302 is also electrically coupled to an I/O interface 1310 by bus 1308. A network interface 1312 is also electrically connected to the processor 1302 by bus 1308. Network interface 1312 is connected to a network 1314, so that processor 1302 and computer readable storage medium 1304 are capable of connecting to external elements via network 1314. The processor 1302 is configured to execute the computer program code 1306 encoded in the computer readable storage medium 1304 in order to cause system 1300 to be usable for performing a portion or all of the operations as described in method 1100 or 1200.

In some embodiments, the processor 1302 is a central processing unit (CPU), a multi-processor, a distributed processing system, an application specific integrated circuit (ASIC), and/or a suitable processing unit.

In some embodiments, the computer readable storage medium 1304 is an electronic, magnetic, optical, electromagnetic, infrared, and/or a semiconductor system (or apparatus or device). For example, the computer readable storage medium 1304 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1304 includes a compact disk-read only memory (CD-ROM), a compact disk-read/write (CD-R/W), and/or a digital video disc (DVD).

In some embodiments, the storage medium 1304 stores the computer program code 1306 configured to cause system 1300 to perform method 1100 or 1200. In some embodiments, the storage medium 1304 also stores information needed for performing method 1100 or 1200 as well as information generated during performance of method 1100 or 1200, such as layout design 1316 and user interface 1318 and fabrication unit 1320, and/or a set of executable instructions to perform the operation of method 1100 or 1200. In some embodiments, layout design 1316 comprises one or more layout patterns of at least layout design 200A, 200L, 500A or 500L, PUF cell 400A or 400B (FIGS. 4A-4B) or PUF cell 700A or 700B (FIGS. 7A-7B), PUF cell arrays 800A-800B, PUF cell arrays 900A-900D or PUF cell array 1000.

In some embodiments, the storage medium 1304 stores instructions (e.g., computer program code 1306) for interfacing with manufacturing machines. The instructions (e.g., computer program code 1306) enable processor 1302 to generate manufacturing instructions readable by the manufacturing machines to effectively implement method 1100 or 1200 during a manufacturing process.

System 1300 includes I/O interface 1310. I/O interface 1310 is coupled to external circuitry. In some embodiments, I/O interface 1310 includes a keyboard, keypad, mouse, trackball, trackpad, and/or cursor direction keys for communicating information and commands to processor 1302.

System 1300 also includes network interface 1312 coupled to the processor 1302. Network interface 1312 allows system 1300 to communicate with network 1314, to which one or more other computer systems are connected. Network interface 1312 includes wireless network interfaces such as BLUETOOTH, WIFI, WIMAX, GPRS, or WCDMA; or wired network interface such as ETHERNET, USB, or IEEE-13134. In some embodiments, method 1100 or 1200 is implemented in two or more systems 1300, and information such as layout design, user interface and fabrication unit are exchanged between different systems 1300 by network 1314.

System 1300 is configured to receive information related to a layout design through I/O interface 1310 or network interface 1312. The information is transferred to processor 1302 by bus 1308 to determine a layout design for producing an IC (e.g., integrated circuit 300A or 600A, PUF cell 1A, a PUF cell similar to PUF cell 400A', 400B', 700A' or 700B', PUF cell arrays 800A-800B, PUF cell arrays 900A-900D or PUF cell array 1000). The layout design is then stored in computer readable medium 1304 as layout design 1316. System 1300 is configured to receive information related to a user interface through I/O interface 1310 or network interface 1312. The information is stored in computer readable medium 1304 as user interface 1318. System 1300 is configured to receive information related to a fabrication unit through I/O interface 1310 or network interface 1312. The information is stored in computer readable medium 1304 as fabrication unit 1320. In some embodiments, the fabrication unit 1320 includes fabrication information utilized by system 1300.

In some embodiments, method 1100 or 1200 is implemented as a standalone software application for execution by a processor. In some embodiments, method 1100 or 1200 is implemented as a software application that is a part of an additional software application. In some embodiments, method 1100 or 1200 is implemented as a plug-in to a software application. In some embodiments, method 1100 or 1200 is implemented as a software application that is a portion of an EDA tool. In some embodiments, method 1100 or 1200 is implemented as a software application that is used by an EDA tool. In some embodiments, the EDA tool is used to generate a layout design of the integrated circuit device. In some embodiments, the layout design is stored on a non-transitory computer readable medium. In some embodiments, the layout design is generated using a tool such as VIRTUOSO® available from CADENCE DESIGN SYSTEMS, Inc., or another suitable layout generating tool. In some embodiments, the layout design is generated based on a netlist which is created based on the schematic design. In some embodiments, method 1100 or 1200 is implemented by a manufacturing device to manufacture an integrated circuit using a set of masks manufactured based on one or more layout designs generated by system 1300. In some embodiments, system 1300 is a manufacturing device to manufacture an integrated circuit using a set of masks manufactured based on one or more layout designs of the present disclosure. In some embodiments, system 1300 of FIG. 13 generates layout designs of an IC that are smaller than other approaches. In some embodiments, system 1300 of FIG. 13 generates layout designs of an IC (e.g., integrated circuit 300A or 600A, PUF cell 1A, a PUF cell similar to PUF cell 400A, 400B, 700A or 700B, PUF cell arrays 800A-800B, PUF cell arrays 900A-900D or PUF cell array 1000) that occupy less area than other approaches.

Figure 14:
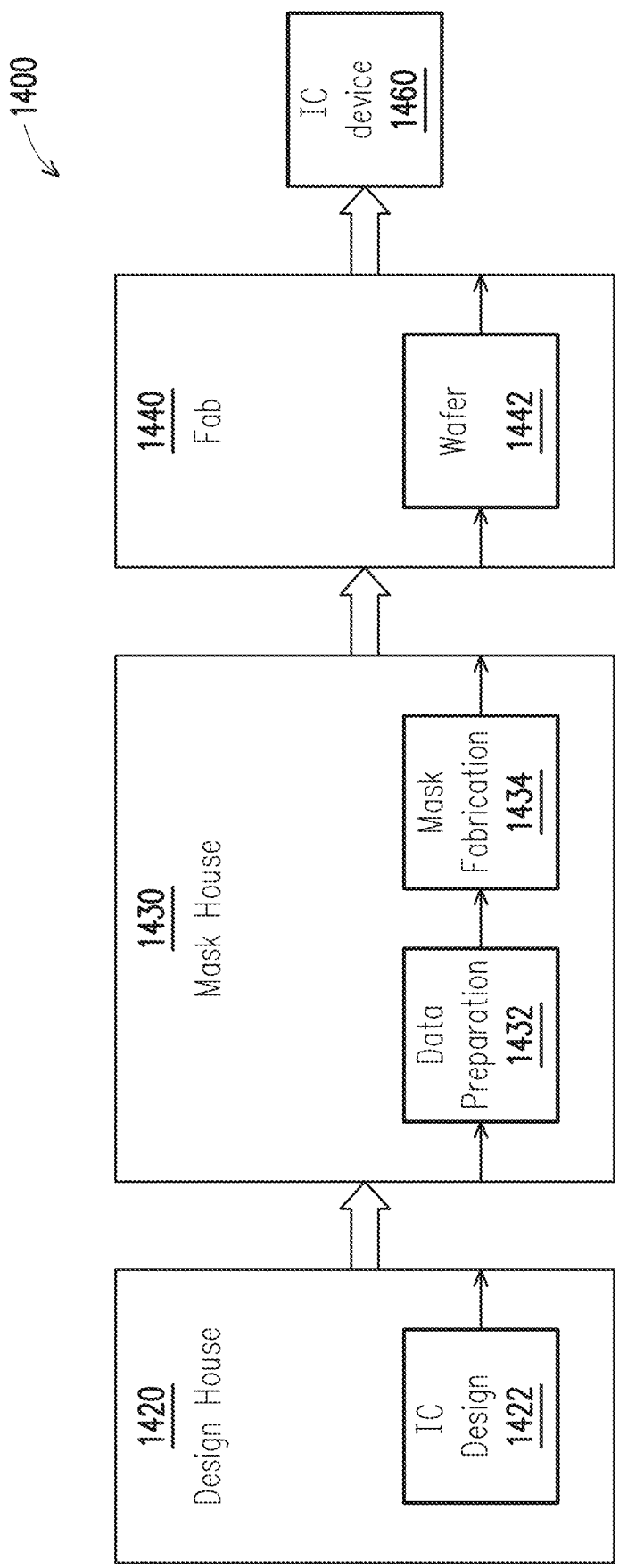
FIG. 14 is a block diagram of an IC manufacturing system, and an IC manufacturing flow associated therewith, in accordance with some embodiments.

FIG. 14 is a block diagram of an IC manufacturing system 1400, and an IC manufacturing flow associated therewith, in accordance with some embodiments.

In FIG. 14, IC manufacturing system 1400 includes entities, such as a design house 1420, a mask house 1430, and an IC manufacturer/fabricator ("fab") 1440, that interact with one another in the design, development, and manufacturing cycles and/or services related to manufacturing an IC device 1460. The entities in system 1400 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, one or more of design house 1420, mask house 1430, and IC fab 1440 is owned by a single larger company. In some embodiments, one or more of design house 1420, mask house 1430, and IC fab 1440 coexist in a common facility and use common resources.

Design house (or design team) 1420 generates an IC design layout 1422. IC design layout 1422 includes various geometrical patterns designed for an IC device 1460. The geometrical patterns correspond to patterns of metal, oxide, or semiconductor layers that make up the various components of IC device 1460 to be fabricated. The various layers combine to form various IC features. For example, a portion of IC design layout 1422 includes various IC features, such as an active region, gate electrode, source electrode and drain electrode, metal lines or vias of an interlayer interconnection, and openings for bonding pads, to be formed in a semiconductor substrate (such as a silicon wafer) and various material layers disposed on the semiconductor substrate. Design house 1420 implements a proper design procedure to form IC design layout 1422. The design procedure includes one or more of logic design, physical design or place and route. IC design layout 1422 is presented in one or more data files having information of the geometrical patterns. For example, IC design layout 1422 can be expressed in a GDSII file format or DFII file format.

Mask house 1430 includes data preparation 1432 and mask fabrication 1434. Mask house 1430 uses IC design layout 1422 to manufacture one or more masks to be used for fabricating the various layers of IC device 1460 according to IC design layout 1422. Mask house 1430 performs mask data preparation 1432, where IC design layout 1422 is translated into a representative data file ("RDF"). Mask data preparation 1432 provides the RDF to mask fabrication 1434. Mask fabrication 1434 includes a mask writer. A mask writer converts the RDF to an image on a substrate, such as a mask (reticle) or a semiconductor wafer. The design layout is manipulated by mask data preparation 1432 to comply with particular characteristics of the mask writer and/or requirements of IC fab 1440. In FIG. 14, mask data preparation 1432 and mask fabrication 1434 are illustrated as separate elements. In some embodiments, mask data preparation 1432 and mask fabrication 1434 can be collectively referred to as mask data preparation.

In some embodiments, mask data preparation 1432 includes optical proximity correction (OPC) which uses lithography enhancement techniques to compensate for image errors, such as those that can arise from diffraction, interference, other process effects and the like. OPC adjusts IC design layout 1422. In some embodiments, mask data preparation 1432 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1432 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 1434, which may undo part of the modifications performed by OPC in order to meet mask creation rules.

In some embodiments, mask data preparation 1432 includes lithography process checking (LPC) that simulates processing that will be implemented by IC fab 1440 to fabricate IC device 1460. LPC simulates this processing based on IC design layout 1422 to create a simulated manufactured device, such as IC device 1460. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 1422.

It should be understood that the above description of mask data preparation 1432 has been simplified for the purposes of clarity. In some embodiments, data preparation 1432 includes additional features such as a logic operation (LOP) to modify the IC design layout according to manufacturing rules. Additionally, the processes applied to IC design layout 1422 during data preparation 1432 may be executed in a variety of different orders.

After mask data preparation 1432 and during mask fabrication 1434, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM.

The mask(s) generated by mask fabrication 1434 is used in a variety of processes. For example, such a mask(s) is used in an ion implantation process to form various doped regions in the semiconductor wafer, in an etching process to form various etching regions in the semiconductor wafer, and/or in other suitable processes.

IC fab 1440 is an IC fabrication entity that includes one or more manufacturing facilities for the fabrication of a variety of different IC products. In some embodiments, IC Fab 1440 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry entity.

IC fab 1440 uses the mask (or masks) fabricated by mask house 1430 to fabricate IC device 1460. Thus, IC fab 1440 at least indirectly uses IC design layout 1422 to fabricate IC device 1460. In some embodiments, a semiconductor wafer 1442 is fabricated by IC fab 1440 using the mask (or masks) to form IC device 1460. Semiconductor wafer 1442 includes a silicon substrate or other proper substrate having material layers formed thereon. Semiconductor wafer further includes one or more of various doped regions, dielectric features, multilevel interconnects, and the like (formed at subsequent manufacturing steps).

System 1400 is shown as having design house 1420, mask house 1430 or IC fab 1440 as separate components or entities. However, it is understood that one or more of design house 1420, mask house 1430 or IC fab 1440 are part of the same component or entity.

Details regarding an integrated circuit (IC) manufacturing system (e.g., system 1400 of FIG. 14), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20100040838, published Feb. 6, 2014, and U.S. Pat. No. 7,260,442, granted Aug. 21, 2007, the entireties of each of which are hereby incorporated by reference.

One aspect of this description relates to a physically unclonable function (PUF) cell array. In some embodiments, the PUF cell array includes a first PUF cell arranged in a first column in a first direction. In some embodiments, the first PUF cell includes a first set of conductive structures extending in at least the first direction or a second direction different from the first direction, the first set of conductive structures being on a first metal layer, and including a first conductive structure extending in at least the second direction and a second conductive structure extending in at least the first direction and being separated from the first conductive structure in the first direction. In some embodiments, the PUF cell array further includes a second PUF cell arranged in a second column in the first direction. In some embodiments, the second PUF cell includes a second set of conductive structures extending in at least the first direction or the second direction, being on the first metal layer and including a third conductive structure extending in at least the second direction and a fourth conductive structure extending in at least the first direction and being separated from the third conductive structure in the first direction. In some embodiments, the PUF cell array further includes a first power rail overlapping a first boundary of the first PUF cell and the second PUF cell, the first power rail being configured to supply one of a supply voltage or a reference supply voltage to at least the first PUF cell or the second PUF cell, the first power rail extending in the second direction, and being on the first metal layer. In some embodiments, at least the first conductive structure and the third conductive structure, or the second conductive structure and the fourth conductive structure are symmetric to each other with respect to a central line of at least the first PUF cell or the second PUF cell extending in the first direction.

Another aspect of this description relates to a method of forming a physically unclonable function (PUF) cell array. In some embodiments, the method includes placing a first layout design of a first PUF cell, the first layout design being arranged in a first column in a first direction. In some embodiments, the placing the first layout design includes placing a first set of conductive feature layout patterns extending in the first direction and a second direction different from the first direction, the first set of conductive feature layout patterns being on a first layout level, and including a first conductive feature layout pattern extending in at least the second direction and a second conductive feature layout pattern extending in at least the second direction and being separated from the first conductive feature layout pattern in the first direction. In some embodiments, the method further includes placing a second layout design of a second PUF cell, the second layout design being arranged in a second column in the first direction. In some embodiments, the placing the second layout design includes placing a second set of conductive feature layout patterns extending in the first direction and the second direction, the second set of conductive feature layout patterns being on the first layout level, and including a third conductive feature layout pattern extending in at least the second direction and a fourth conductive feature layout pattern extending in at least the second direction and being separated from the third conductive feature layout pattern in the first direction. In some embodiments, the method further includes placing a first power rail layout pattern over a first boundary of the first PUF cell and the second PUF cell, the first power rail layout pattern corresponding to a first power rail being configured to supply a supply voltage to at least the first PUF cell or the second PUF cell, the first power rail layout pattern extending in the second direction, and being on the first layout level. In some embodiments, the method further includes placing a second power rail layout pattern over a second boundary of the first PUF cell and the second PUF cell, the second power rail layout pattern corresponding to a second power rail being configured to supply a reference supply voltage to at least the first PUF cell or the second PUF cell, the second power rail layout pattern extending in the second direction, and being on the first layout level. In some embodiments, at least the first conductive feature layout pattern and the third conductive feature layout pattern, or the second conductive feature layout pattern and the fourth conductive feature layout pattern are symmetric to each other with respect to a central line of at least the first layout design or the second layout design extending in the first direction, at least one of the above placing operations is performed by a hardware processor, and at least the first layout design or the second layout design is stored in a non-transitory computer-readable medium. In some embodiments, the method further includes manufacturing the PUF cell array based on at least the first layout design or the second layout design.

Still another aspect of this description relates to a system for manufacturing a physically unclonable function (PUF) cell array. In some embodiments, the system includes a non-transitory computer readable medium configured to store non-transitory instructions, and a processor coupled to the non-transitory computer readable medium. In some embodiments, the processor is configured to execute the non-transitory instructions for generating a first layout design of a first PUF cell, the first layout design being arranged in a first column in a first direction. In some embodiments, the generating the first layout design includes generating a first set of conductive feature layout patterns extending in the first direction and a second direction different from the first direction, the first set of conductive feature layout patterns being on a first layout level. In some embodiments, the generating the first layout design further includes generating a second set of conductive feature layout patterns extending in the first direction and the second direction, the second set of conductive feature layout patterns being on the first layout level, and being separated from the first set of conductive feature layout patterns in the second direction. In some embodiments, the generating the first layout design further includes generating a first conductive feature layout pattern extending in the second direction, and being on the first layout level. In some embodiments, the generating the first layout design further includes generating a second conductive feature layout pattern extending in the second direction, being on the first layout level, and being separated from the first conductive feature layout pattern in the first direction. In some embodiments, at least the first set of conductive feature layout patterns and the second set of conductive feature layout patterns are symmetric to each other with respect to a central line of the first layout design extending in the first direction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A physically unclonable function (PUF) cell array comprising:
   a first PUF cell arranged in a first column in a first direction, the first PUF cell comprising:
      a first set of conductive structures extending in at least the first direction or a second direction different from the first direction, the first set of conductive structures being on a first metal layer, and including a first conductive structure extending in at least the second direction and a second conductive structure extending in at least the first direction and being separated from the first conductive structure in the first direction;
   a second PUF cell arranged in a second column in the first direction, the second PUF cell comprising:
      a second set of conductive structures extending in at least the first direction or the second direction, being on the first metal layer and including a third conductive structure extending in at least the second direction and a fourth conductive structure extending in at least the first direction and being separated from the third conductive structure in the first direction; and a first power rail overlapping a first boundary of the first PUF cell and the second PUF cell, the first power rail being configured to supply one of a supply voltage or a reference supply voltage to at least the first PUF cell or the second PUF cell, the first power rail extending in the second direction, and being on the first metal layer;

wherein at least the first conductive structure and the third conductive structure, or the second conductive structure and the fourth conductive structure are symmetric to each other with respect to a central line of at least the first PUF cell or the second PUF cell extending in the first direction.

2. The PUF cell array of claim 1, further comprising:
a second power rail overlapping a second boundary of the first PUF cell and the second PUF cell, the second power rail being configured to supply another of the supply voltage or the reference supply voltage to at least the first PUF cell or the second PUF cell, the second power rail extending in the second direction, and being on the first metal layer, and being separated from the first power rail in the second direction.

3. The PUF cell array of claim 2, further comprising:
a third PUF cell arranged in the first column in the first direction, the third PUF cell and the first PUF cell are symmetric to each other with respect to the first boundary or the second boundary in the second direction, the third PUF cell comprising:
a third set of conductive structures extending in at least the first direction or the second direction different from the first direction, the third set of conductive structures being on the first metal layer, and including a fifth conductive structure extending in at least the second direction and a sixth conductive structure extending in at least the first direction and being separated from the fifth conductive structure in the first direction; and a fourth PUF cell arranged in the second column in the first direction, the fourth PUF cell and the second PUF cell are symmetric to each other with respect to the first boundary or the second boundary in the second direction, the fourth PUF cell comprising:
a fourth set of conductive structures extending in at least the first direction or the second direction, being on the first metal layer and including a seventh conductive structure extending in at least the second direction and an eighth conductive structure extending in at least the first direction and being separated from the seventh conductive structure in the first direction; and wherein at least the fifth conductive structure and the seventh conductive structure, or the sixth conductive structure and the eighth conductive structure are symmetric to each other with respect to a central line of at least the third PUF cell or the fourth PUF cell extending in the first direction.

4. The PUF cell array of claim 3, wherein
the first PUF cell and the second PUF cell are in a first row extending in the second direction, and
the third PUF cell and the fourth PUF cell are in a second row extending in the second direction.

5. The PUF cell array of claim 4, wherein the first row is adjacent to the second row.

6. The PUF cell array of claim 4, wherein the first PUF cell and the third PUF cell are symmetric to each other with respect to the first boundary or the second boundary in the second direction, the first boundary or the second boundary being between the first row and the second row.

7. The PUF cell array of claim 4, wherein the second PUF cell and the fourth PUF cell are symmetric to each other with respect to the first boundary or the second boundary in the second direction, the first boundary or the second boundary being between the first row and the second row.

8. The PUF cell array of claim 1, further comprising:
a first set of PUF cells having a first number of PUF cells, the first set of PUF cells including the first PUF cell; and
a second set of PUF cells having a second number of PUF cells equal to the first number of PUF cells, the second set of PUF cells including the second PUF cell.

9. The PUF cell array of claim 8, wherein
each PUF cell of the first set of PUF cells and the second set of PUF cells has a corresponding output pin having a corresponding address, and
each address of each corresponding output pin of each PUF cell in the first set of PUF cells and the second set of PUF cells is randomly arranged.

10. The PUF cell array of claim 1, wherein
the first PUF cell further comprises:
a first inverter; and
a second inverter, the second inverter being cross-coupled to the first inverter;
the second PUF cell further comprises:
a third inverter; and
a fourth inverter, the fourth inverter being cross-coupled to the third inverter.

11. The PUF cell array of claim 10, wherein
the first set of conductive structures cross-couple the first inverter to the second inverter; and
the second set of conductive structures cross-couple the third inverter to the fourth inverter.

12. A method of forming a physically unclonable function (PUF) cell array, the method comprising:
placing a first layout design of a first PUF cell, the first layout design being arranged in a first column in a first direction, the placing the first layout design comprising:
placing a first set of conductive feature layout patterns extending in the first direction and a second direction different from the first direction, the first set of conductive feature layout patterns being on a first layout level, and including a first conductive feature layout pattern extending in at least the second direction and a second conductive feature layout pattern extending in at least the second direction and being separated from the first conductive feature layout pattern in the first direction;
placing a second layout design of a second PUF cell, the second layout design being arranged in a second column in the first direction, the placing the second layout design comprising:
placing a second set of conductive feature layout patterns extending in the first direction and the second direction, the second set of conductive feature layout patterns being on the first layout level, and including a third conductive feature layout pattern extending in at least the second direction and a fourth conductive feature layout pattern extending in at least the second direction and being separated from the third conductive feature layout pattern in the first direction;
placing a first power rail layout pattern over a first boundary of the first PUF cell and the second PUF cell, the first power rail layout pattern corresponding to a first power rail being configured to supply a supply voltage to at least the first PUF cell or the second PUF cell, the first power rail layout pattern extending in the second direction, and being on the first layout level; and placing a second power rail layout pattern over a second boundary of the first PUF cell and the second PUF cell, the second power rail layout pattern corresponding to a second power rail being configured to supply a reference supply voltage to at least the first PUF cell or the second PUF cell, the second power rail layout pattern extending in the second direction, and being on the first layout level;

wherein at least the first conductive feature layout pattern and the third conductive feature layout pattern, or the second conductive feature layout pattern and the fourth conductive feature layout pattern are symmetric to each other with respect to a central line of at least the first layout design or the second layout design extending in the first direction, at least one of the above placing operations is performed by a hardware processor, and at least the first layout design or the second layout design is stored in a non-transitory computer-readable medium; and manufacturing the PUF cell array based on at least the first layout design or the second layout design.

13. The method of claim 12, further comprising:
placing a third layout design of a third PUF cell, the third layout design being arranged in a first row in the second direction, the third layout design and the first layout design are symmetric to each other with respect to a first line in the second direction, the placing the third layout design comprising:
  placing a third set of conductive feature layout patterns extending in the first direction and the second direction, the third set of conductive feature layout patterns being on the first layout level, and including a fifth conductive feature layout pattern extending in at least the second direction and a sixth conductive feature layout pattern extending in at least the second direction and being separated from the fifth conductive feature layout pattern in the first direction;
placing a fourth layout design of a fourth PUF cell, the fourth layout design being arranged in the first row, the fourth layout design and the second layout design are symmetric to each other with respect to a second line in the second direction, the placing the fourth layout design comprising:
  placing a fourth set of conductive feature layout patterns extending in the first direction and the second direction, the fourth set of conductive feature layout patterns being on the first layout level and including a seventh conductive feature layout pattern extending in at least the second direction and an eighth conductive feature layout pattern extending in at least the second direction and being separated from the seventh conductive feature layout pattern in the first direction;
wherein at least the fifth conductive feature layout pattern and the seventh conductive feature layout pattern, or the sixth conductive feature layout pattern and the eighth conductive feature layout pattern are symmetric to each other with respect to a central line of at least the third layout design or the fourth layout design extending in the first direction; and
the first layout design and the second layout design are arranged in a second row in the second direction.

14. The method of claim 13, wherein
the third layout design is arranged in the first column;
the fourth layout design is arranged in the second column;
the first row is adjacent to the second row; and
the first column is adjacent to the second column.

15. The method of claim 13, wherein
the first row is adjacent to the second row; and
the first column is adjacent to the second column.

16. The method of claim 12, further comprising:
placing a first set of layout designs of a first set of PUF cells, the first set of layout designs including the first layout design, the first set of PUF cells including the first PUF cell, the first set of layout designs having a first number of first layout designs; and
placing a second set of layout designs of a second set of PUF cells, the second set of layout designs including the second layout design, the second set of PUF cells including the second PUF cell, the second set of layout designs having a second number of second layout designs equal to the first number of first layout designs.

17. The method of claim 12, wherein
the placing the first layout design further comprises:
  placing a third set of conductive feature layout patterns extending in the first direction, overlapping at least the first set of conductive feature layout patterns, being located on a second layout level different from the first layout level, and each conductive feature layout pattern of the third set of conductive feature layout patterns being separated from an adjacent layout pattern of the third set of conductive feature layout patterns in at least the second direction; and
the placing the second layout design further comprises:
  placing a fourth set of conductive feature layout patterns extending in the first direction, overlapping at least the second set of conductive feature layout patterns, being located on the second layout level, and each conductive feature layout pattern of the fourth set of conductive feature layout patterns being separated from an adjacent layout pattern of the fourth set of conductive feature layout patterns in at least the second direction.

18. A system for manufacturing a physically unclonable function (PUF) cell array, the system comprises:
a non-transitory computer readable medium configured to store non-transitory instructions; and
a processor coupled to the non-transitory computer readable medium, wherein the processor is configured to execute the non-transitory instructions for:
generating a first layout design of a first PUF cell, the first layout design being arranged in a first column in a first direction, the generating the first layout design comprising:
  generating a first set of conductive feature layout patterns extending in the first direction and a second direction different from the first direction, the first set of conductive feature layout patterns being on a first layout level;
  generating a second set of conductive feature layout patterns extending in the first direction and the second direction, the second set of conductive feature layout patterns being on the first layout level, and being separated from the first set of conductive feature layout patterns in the second direction;
  generating a first conductive feature layout pattern extending in the second direction, and being on the first layout level; and
  generating a second conductive feature layout pattern extending in the second direction, being on the first layout level, and being separated from the first conductive feature layout pattern in the first direction;

generating a second layout design of a second PUF cell, the second layout design being arranged in a second column in the first direction;

wherein at least the first set of conductive feature layout patterns and the second set of conductive feature layout patterns are symmetric to each other with respect to a central line of the first layout design extending in the first direction; and manufacturing the PUF cell array based on at least the first layout design or the second layout design.

19. The system of claim 18, wherein the processor configured to execute instructions for generating the first layout design further comprises:

generating a third conductive feature layout pattern extending in the first direction, being on the first layout level, and being coupled to a first end of the first conductive feature layout pattern; and generating a fourth conductive feature layout pattern extending in the first direction, being on the first layout level, being separated from the third conductive feature layout pattern in the second direction, and being coupled to a second end of the first conductive feature layout pattern opposite from the first end of the first conductive feature layout pattern.

20. The system of claim 19, wherein the processor configured to execute instructions for generating the first layout design further comprises:

generating a fifth conductive feature layout pattern extending in the first direction, being on the first layout level, and being coupled to a first end of the second conductive feature layout pattern; and generating a sixth conductive feature layout pattern extending in the first direction, being on the first layout level, being separated from the fifth conductive feature layout pattern in the second direction, and being coupled to a second end of the second conductive feature layout pattern opposite from the first end of the second conductive feature layout pattern.

* * * * *